(12) United States Patent
Seyffert et al.

(10) Patent No.: US 6,325,216 B1
(45) Date of Patent: *Dec. 4, 2001

(54) SCREEN APPARATUS FOR VIBRATORY SEPARATOR

(75) Inventors: Kenneth W. Seyffert, Houston; Thomas C. Adams, Hockley; David Largent, Cleveland, all of TX (US); David L. Schulte, Jr., Broussar, LA (US); Charles N. Grichar; Vincent D. Leone, both of Houston, TX (US); Jeffrey Walker, Lafayette, LA (US); Guy L. McClung, III, Spring, TX (US)

(73) Assignee: Tuboscope I/P, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/390,231

(22) Filed: Sep. 3, 1999

Related U.S. Application Data

(63) Continuation-in-part of application No. 09/276,267, filed on Mar. 25, 1999, now Pat. No. 6,032,806, which is a division of application No. 08/786,515, filed on Jan. 21, 1997, now Pat. No. 5,971,159, which is a continuation-in-part of application No. 29/048,575, filed on Jan. 4, 1996, now Pat. No. Des. 377,656, which is a continuation of application No. 29/014,571, filed on Oct. 25, 1993, now Pat. No. Des. 366,040, which is a continuation-in-part of application No. 08/598,566, filed on Feb. 12, 1996, which is a continuation-in-part of application No. 08/220,101, filed on Mar. 30, 1994, now Pat. No. 5,490,598, said application No. 29/014,571, is a continuation-in-part of application No.08/504,495, filed on Jul. 20, 1995, now Pat. No. 5,598,930, and a continuation-in-part of application No. 08/105,696, filed on Aug. 12, 1993, now Pat. No. 5,392,925, and a continuation-in-part of application No. 08/056,123, filed on Apr. 30, 1993, now Pat. No. 5,385,669, application No. 09/390,231, which is a continuation-in-part of application No. 09/296,975, filed on Apr. 22, 1999, which is a continuation-in-part of application No. 09/228,572, filed on Jan. 11, 1999, which is a continuation-in-part of application No. 09/183,005, filed on Oct. 30, 1998, which is a continuation-in-part of application No. 09/090,554, filed on Jun. 4, 1998, which is a continuation-in-part of application No. 08/895,976, filed on Jul. 17, 1997, which is a continuation-in-part of application No. 08/786,515, filed on Jan. 21, 1997, and a continuation-in-part of application No. 08/598,566, filed on Feb. 12, 1996, said application No. 08/786,515, application No. 09/390, 231, which is a continuation-in-part of application No. 29/102,627, filed on Mar. 29, 1999, which is a division of application No. 09/183,003, filed on Oct. 30, 1998, which is a continuation-in-part of application No. 09/090,554, filed on Jun. 4, 1998.

(51) Int. Cl.$^7$ ............................................... B07B 1/46
(52) U.S. Cl. ........................ 209/408; 209/399; 209/403; 209/405
(58) Field of Search ................................... 209/392, 397, 209/401, 409, 411, 412, 405, 408, 403, 399

(56) References Cited

U.S. PATENT DOCUMENTS

| H1481 | 9/1995 | Ray | 428/98 |
|---|---|---|---|
| 40,242 | 10/1863 | Capell . | |

(List continued on next page.)

FOREIGN PATENT DOCUMENTS

| 269877 | 4/1928 | (GB) | 8794/27 |
|---|---|---|---|
| 519680 | 2/1939 | (GB) . | |

(List continued on next page.)

OTHER PUBLICATIONS

Mud Equipment Manual Handbook 3: Shale Shakers, Brandt & Love, Gulf Pub. Co., Oct. 1982.

(List continued on next page.)

Primary Examiner—Donald P. Walsh
Assistant Examiner—Daniel K Schlak
(74) Attorney, Agent, or Firm—Guy McClung

(57) ABSTRACT

A screen assembly for a vibratory separator, the screen assembly including at least one lower coarse screen member, at least one upper fine screen member above the at least one lower coarse screen member and fused with plastic to the at least one lower coarse screen member, and a strip member beneath and adhered to the at least one lower coarse screen member. In one aspect the strip member includes two side strips, two end pieces, and a plurality of spaced-apart strips parallel to the two side strips each with an end terminating at, in, or on each of the end pieces.

18 Claims, 50 Drawing Sheets

U.S. PATENT DOCUMENTS

| | | | |
|---|---|---|---|
| 236,416 | 1/1881 | Bourne . | |
| 246,144 | 8/1881 | Keeler . | |
| 268,491 | 12/1882 | Hubbell . | |
| 275,190 | 4/1883 | Gilbert . | |
| 275,340 | 4/1883 | Kimball . | |
| 500,302 | 6/1893 | Stoecket et al. . | |
| 516,673 | 3/1894 | Wilson . | |
| 526,562 | 9/1894 | Cross . | |
| 560,858 | 5/1896 | Missroon . | |
| 583,981 | 6/1897 | Plaisted . | |
| 607,598 | 7/1898 | Closz . | |
| 777,317 | 12/1904 | Traylor . | |
| 865,185 | 9/1907 | Kerrigan . | |
| 948,222 | 2/1910 | Honabach . | |
| 964,897 | 7/1910 | Bryant . | |
| 966,578 | 8/1910 | Murphy et al. | 209/401 X |
| 984,866 | 2/1911 | Tate . | |
| 1,098,979 | 6/1914 | Schuchard . | |
| 1,132,667 | 3/1915 | Milliot . | |
| 1,139,041 | 5/1915 | Larson . | |
| 1,242,982 | 10/1917 | Reynolds . | |
| 1,248,081 | 11/1917 | Couch . | |
| 1,250,768 | 12/1917 | Baumgartner | 209/392 |
| 1,344,747 | 6/1920 | Wright . | |
| 1,397,339 | 11/1921 | Sturtevant . | |
| 1,423,021 | 7/1922 | Reyolds . | |
| 1,462,804 | 7/1923 | Evans . | |
| 1,505,735 | 8/1924 | Stebbins . | |
| 1,561,632 | 11/1925 | Woodward . | |
| 1,614,586 | 10/1927 | Anderson et al. . | |
| 1,626,774 | 5/1927 | Allan . | |
| 1,678,941 | 7/1928 | Helman . | |
| 1,713,143 | 5/1929 | Overstrom . | |
| 1,716,758 | 6/1929 | Bland . | |
| 1,785,195 | 12/1930 | Hoes et al. . | |
| 1,879,377 | 9/1932 | McNeely . | |
| 1,947,307 | 2/1934 | Rafton . | |
| 1,950,861 | 3/1934 | O'Toole, Sr. . | |
| 1,997,713 | 4/1935 | Boehm . | |
| 1,997,740 | 4/1935 | Nickerson . | |
| 2,052,467 | 8/1936 | Hermann | 209/401 |
| 2,061,850 | 11/1936 | Roberts . | |
| 2,082,513 | 6/1937 | Roberts . | |
| 2,089,548 | 8/1937 | Frantz et al. . | |
| 2,104,785 | 1/1938 | Akeyson | 210/384 |
| 2,190,262 | 2/1940 | Geist . | |
| 2,251,909 | 8/1941 | Lindsay | 210/149 |
| 2,274,700 | 3/1942 | Jenks . | |
| 2,335,084 | 11/1943 | Rice | 209/408 |
| 2,406,051 | 8/1946 | Weiss . | |
| 2,462,878 | 3/1949 | Logue . | |
| 2,480,320 | 8/1949 | Carrier | 210/388 |
| 2,511,239 | 6/1950 | Behnke et al. | 209/403 |
| 2,648,441 | 8/1953 | Soldan . | |
| 2,667,975 | 2/1954 | Seaholm | 210/152 |
| 2,670,079 | 2/1954 | Betts | 209/405 |
| 2,677,462 | 5/1954 | Conkling | 209/403 |
| 2,723,032 | 11/1955 | Gisler et al. . | |
| 2,726,184 | 12/1955 | Cox et al. . | |
| 2,774,477 | 12/1956 | Pollitz | 209/403 |
| 2,800,227 | 7/1957 | Kiger | 209/412 X |
| 2,813,629 | 11/1957 | Brugmann | 209/403 |
| 3,165,473 | 1/1965 | Pall et al. | 210/510 |
| 3,176,843 | 4/1965 | Hoskins et al. | 209/403 |
| 3,243,943 | 4/1966 | Getzin | 55/499 |
| 3,255,885 | 6/1966 | Burls | 209/314 |
| 3,285,413 | 11/1966 | Taylor-Smith . | |
| 3,458,978 | 8/1969 | Davis | 55/499 |
| 3,465,413 | 9/1969 | Rosaen et al. | 29/428 |
| 3,542,636 | 11/1970 | Wandel | 161/114 |
| 3,574,103 | 4/1971 | Latkin | 428/72 |
| 3,655,060 | 4/1972 | Hagdahl | 210/493 |
| 3,679,057 | 7/1972 | Perez | 210/223 |
| 3,716,138 | 2/1973 | Lumsden | 209/401 |
| 3,747,770 | 7/1973 | Zentis | 210/402 |
| 3,747,772 | 7/1973 | Brown | 210/493 |
| 3,789,498 | 2/1974 | Cole | 29/470.9 |
| 3,793,692 | 2/1974 | Tate et al. | 29/163.5 |
| 3,853,529 | 12/1974 | Boothe et al. | 55/499 |
| 3,900,628 | 8/1975 | Stewart . | |
| 3,929,642 | 12/1975 | Ennis et al. | 210/113 |
| 3,970,549 | 7/1976 | Ennis et al. | 209/341 |
| 4,019,987 | 4/1977 | Krashow | 210/232 |
| 4,022,596 | 5/1977 | Pedersen | 55/528 |
| 4,033,865 | 7/1977 | Derrick, Jr. | 209/275 |
| 4,062,769 | 12/1977 | Simonson | 209/399 |
| 4,065,382 | 12/1977 | Derrick, Jr. | 209/313 |
| 4,075,106 | 2/1978 | Yamazaki | 210/487 |
| 4,138,303 | 2/1979 | Taylor | 156/264 |
| 4,380,494 | 4/1983 | Wilson | 209/319 |
| 4,410,427 | 10/1983 | Wydeven | 210/317 |
| 4,464,242 | 8/1984 | Boulton | 204/253 |
| 4,472,473 | 9/1984 | Davis et al. | 428/184 |
| 4,546,783 | 10/1985 | Lott | 134/109 |
| 4,575,421 | 3/1986 | Derrick et al. | 209/397 |
| 4,582,597 | 4/1986 | Huber | 204/313 |
| 4,589,983 | 5/1986 | Wydevan | 210/317 |
| 4,617,122 | 10/1986 | Kruse et al. | 210/493.3 |
| 4,634,535 | 1/1987 | Lott | 210/780 |
| 4,678,578 | 7/1987 | Nodes et al. | 210/445 |
| 4,696,751 | 9/1987 | Eifling | 210/780 |
| 4,728,422 | 3/1988 | Bailey | 210/314 |
| 4,769,968 | 9/1988 | Davis et al. | 52/814 |
| 4,819,809 | 4/1989 | Derrick | 209/275 |
| 4,820,407 | 4/1989 | Lilie | 209/397 |
| 4,832,834 | 5/1989 | Baird, Jr. | 209/397 |
| 4,857,176 | 8/1989 | Derrick et al. | 209/392 |
| 4,882,054 | 11/1989 | Derrick et al. | 210/389 |
| 4,940,500 | 7/1990 | Tado Koro et al. | 156/204 |
| 4,954,249 | 9/1990 | Gero et al. | 209/273 |
| 5,028,474 | 7/1991 | Czaplicki | 428/178 |
| 5,084,178 | 1/1992 | Miller et al. | 210/493.5 |
| 5,137,622 | 8/1992 | Souter | 209/403 |
| 5,139,154 | 8/1992 | Gero et al. | 209/273 |
| 5,162,143 | 11/1992 | Porter et al. | 428/179 |
| 5,167,740 | 12/1992 | Michaelis et al. | 156/73.1 |
| 5,211,291 | 5/1993 | Kelley et al. | 209/680 |
| 5,221,008 | 6/1993 | Derrick, Jr. et al. | 209/269 |
| 5,256,292 | 10/1993 | Cagle | 210/499 |
| 5,312,508 | 5/1994 | Chisholm | 156/292 |
| 5,330,057 | 7/1994 | Schiller et al. | 209/392 |
| 5,385,669 | 1/1995 | Leone, Sr. | 210/488 |
| 5,392,925 | 2/1995 | Seyffert | 209/405 |
| 5,417,793 | 5/1995 | Bakula | 156/308.2 |
| 5,417,858 | 5/1995 | Derrick et al. | 210/388 |
| 5,417,859 | 5/1995 | Bakula | 210/388 |
| 5,490,598 | 2/1996 | Adams | 209/403 X |
| 5,614,094 | 3/1997 | Deister et al. | 210/388 |
| 5,636,749 | 6/1997 | Wojciechowski | 209/403 |
| 5,720,881 | 2/1998 | Derrick et al. | 210/388 |
| 5,783,077 | 7/1998 | Bakula | 210/388 |
| 5,814,218 | 9/1998 | Cagle | 210/388 |
| 5,851,393 | 12/1998 | Carr et al. | 204/489 |
| 2,827,169 | 3/1958 | Cusi . | |
| 2,902,165 | 9/1959 | Imershein . | |
| 2,929,464 | 3/1960 | Sprouse . | |
| 2,973,865 | 3/1961 | Cibula | 209/392 X |
| 2,980,208 | 4/1961 | Neumann . | |
| 2,985,303 | 5/1961 | Wright . | |
| 3,057,481 | 10/1962 | Pale | 210/493 |
| 3,070,231 | 12/1962 | McCorkel et al. | 209/319 |

| | | | | | | |
|---|---|---|---|---|---|---|
| 3,092,573 | 6/1963 | Lambert et al. | 209/403 | 2124099A | 6/1983 | (GB) . |
| 5,868,929 | 9/1999 | Derrick et al. | 210/388 | 2161715B | 7/1983 | (GB) . |
| 5,876,552 | 3/1999 | Bakula | 156/308.2 | 2161715A | 5/1984 | (GB) . |
| 5,921,399 | 7/1999 | Bakula et al. | 209/272 | 59-142818 | 6/1984 | (JP) . |
| 5,944,993 | 8/1999 | Derrick et al. | 210/388 | PCT/EP96/ | | |
| 5,950,841 | 9/1999 | Knox et al. | 209/315 | 03103 | of 0000 | (WO) . |
| 5,958,236 | 9/1999 | Bakula | 210/388 | PCT/GB91/ | | |
| 5,967,336 | 10/1999 | Baltzer et al. | 209/403 | 00957 | of 0000 | (WO) . |
| 5,984,107 | 11/1999 | Bleh | 209/320 | PCT/US94/ | | |
| 5,992,641 | 11/1999 | Caldwell, Jr. | 209/273 | 00243 | of 0000 | (WO) . |
| 6,000,556 | 12/1999 | Bakula | 210/388 | WO 95/23655 | 3/1994 | (WO) ............ B07B/1/46 |
| 6,000,558 | 12/1999 | Proulx et al. | 210/486 | | | |
| 6,006,923 | 12/1999 | Helmy et al. | 209/397 | | | |
| 6,019,228 | 2/2000 | Duggan | 209/408 | | | |
| 6,053,331 | 4/2000 | Cravello | 210/388 | | | |
| 6,053,332 | 4/2000 | Bakula | 210/388 | | | |

FOREIGN PATENT DOCUMENTS

| | | |
|---|---|---|
| 823648 | 10/1957 | (GB) . |
| 1412975 | 12/1971 | (GB) . |

OTHER PUBLICATIONS

An Innovative Method of ranking Shale Shaker Screens, STC05, Shale Shaker Technology Conference, Feb. 1991.

Pending U.S. Application 08/220,101 filed Mar. 30, 1994 entitled "Screen For Vibrating Separator."

Official Gazette Entry for U.S. Patent 5,626,234, May 6, 1997.

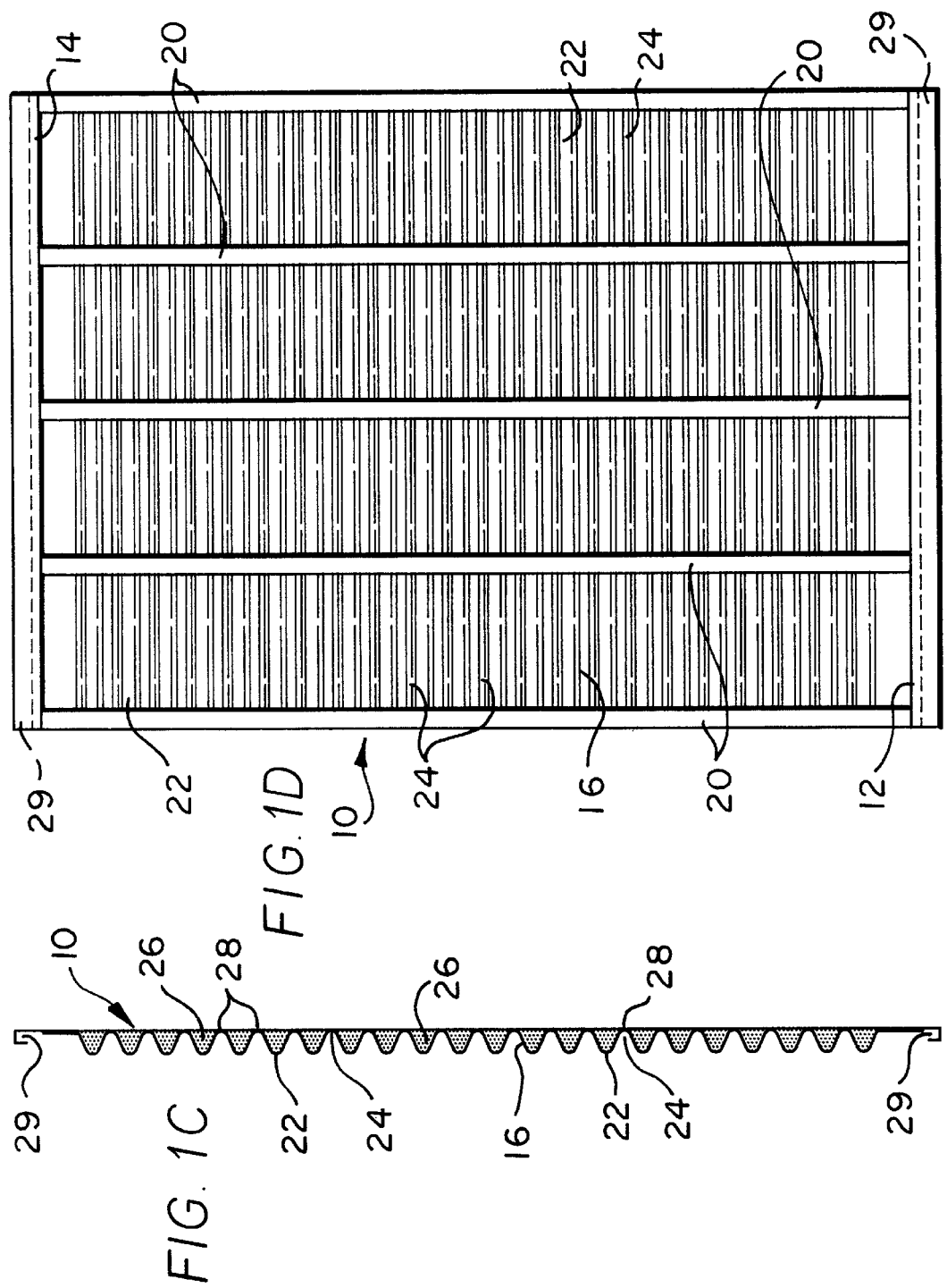

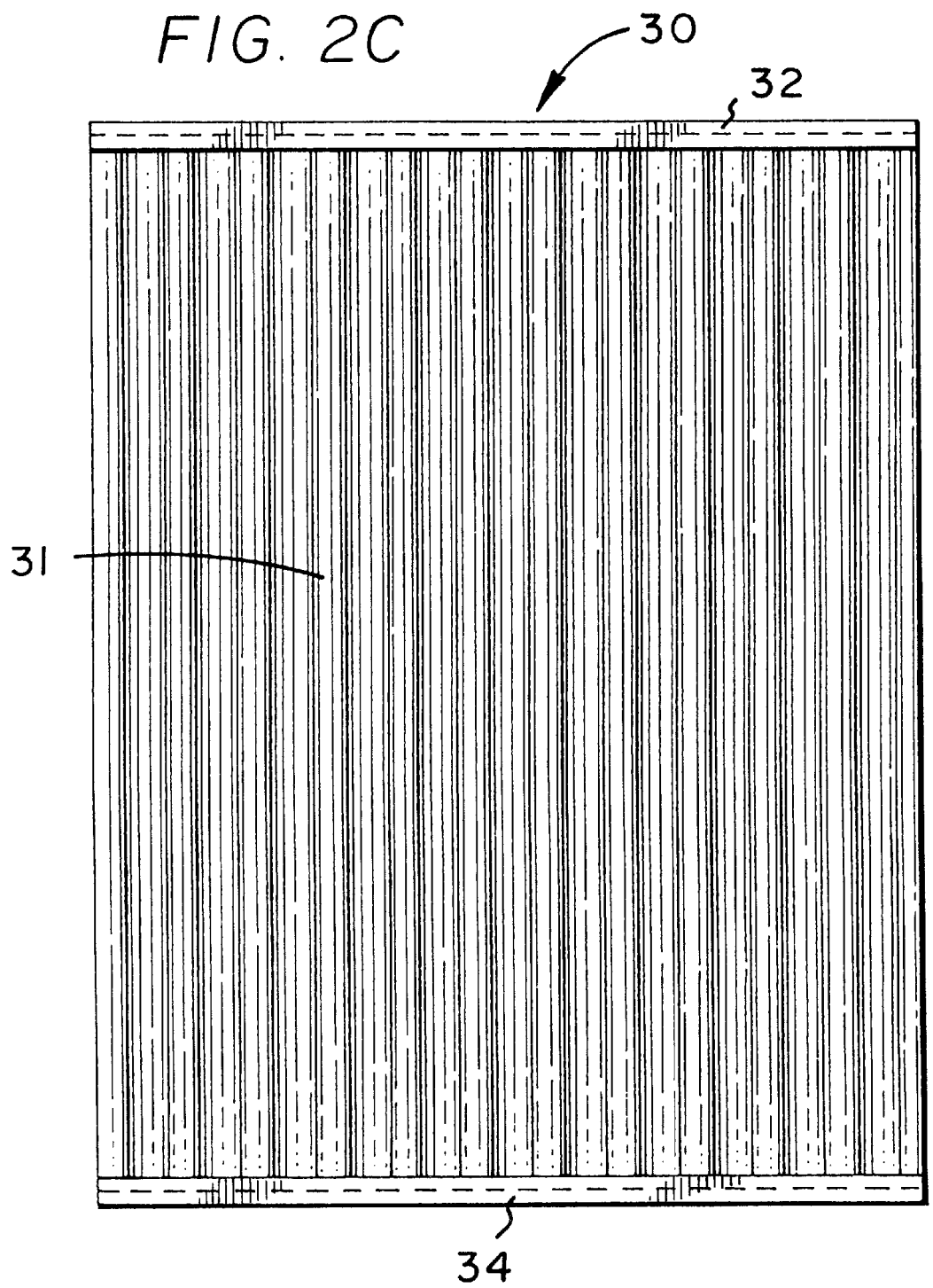

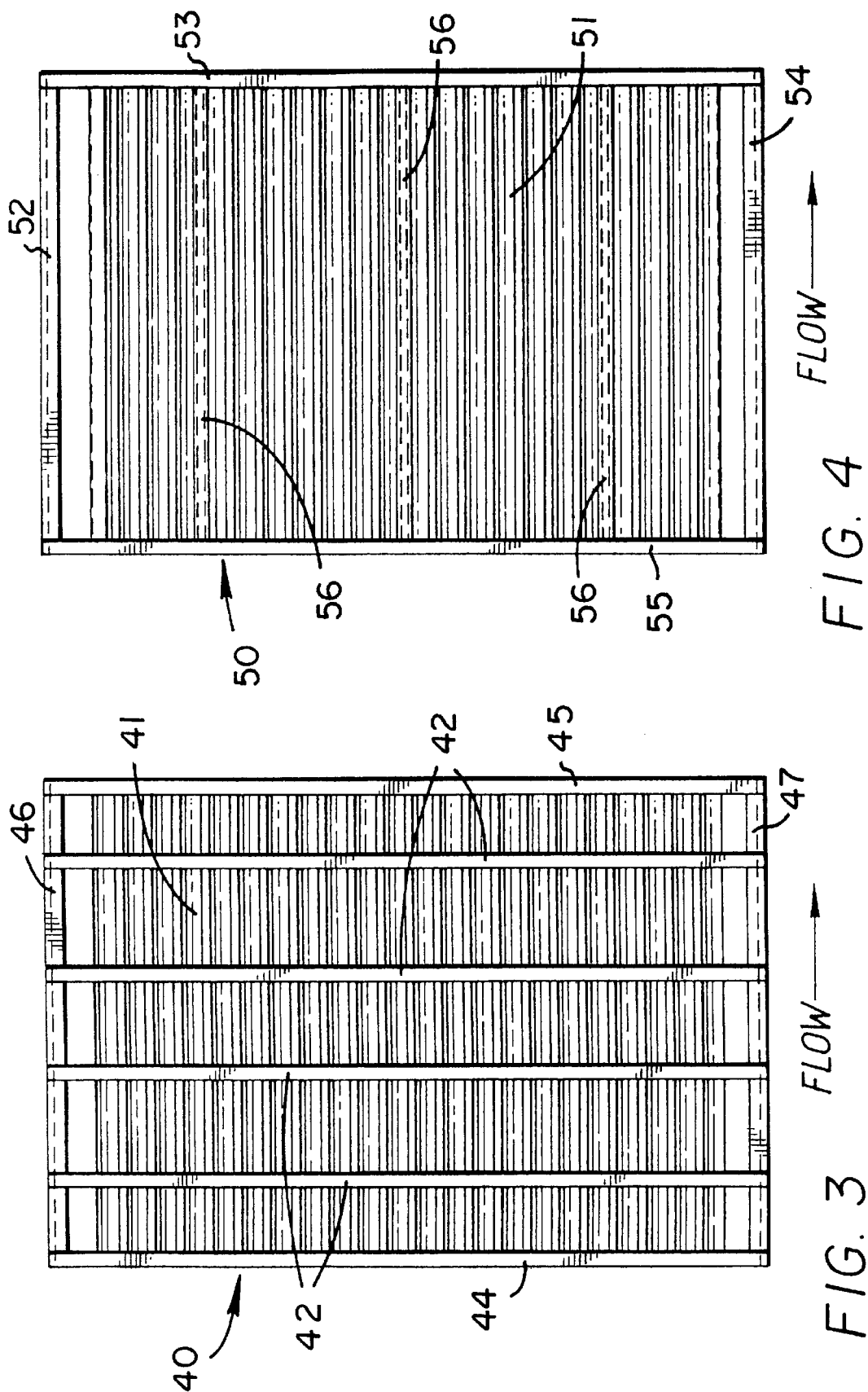

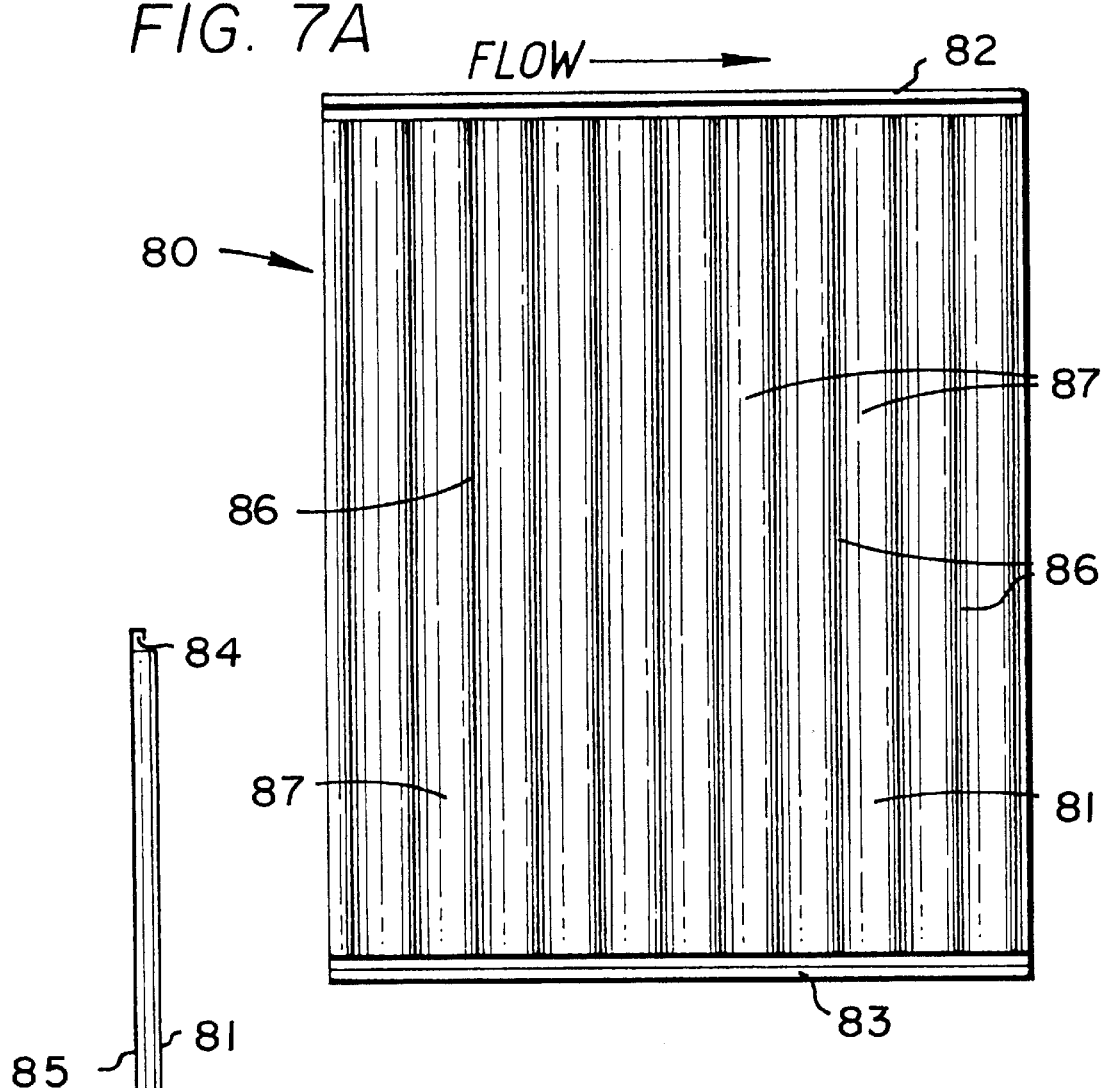
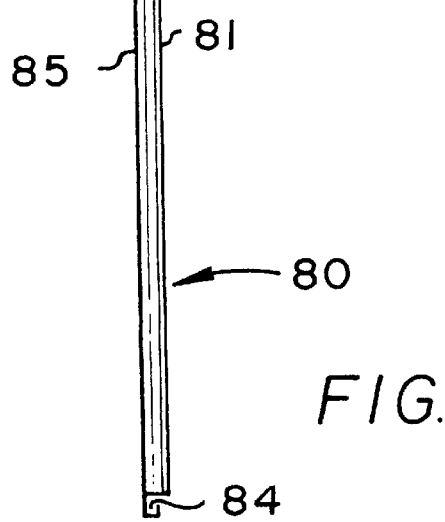

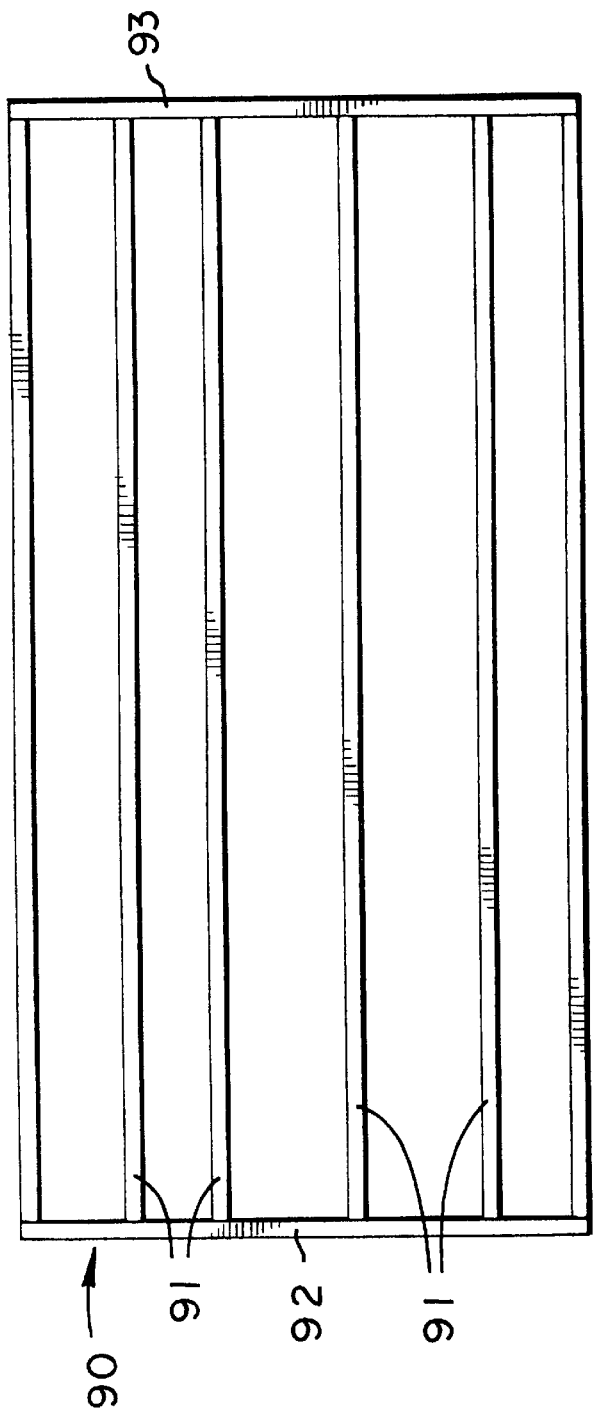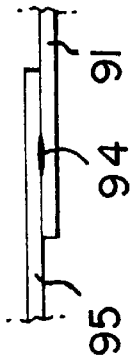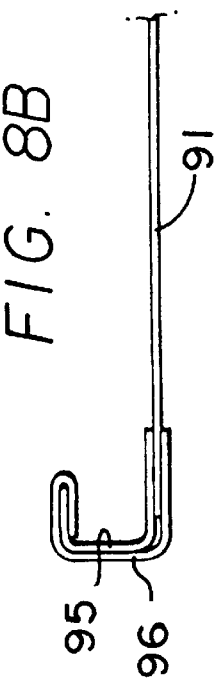

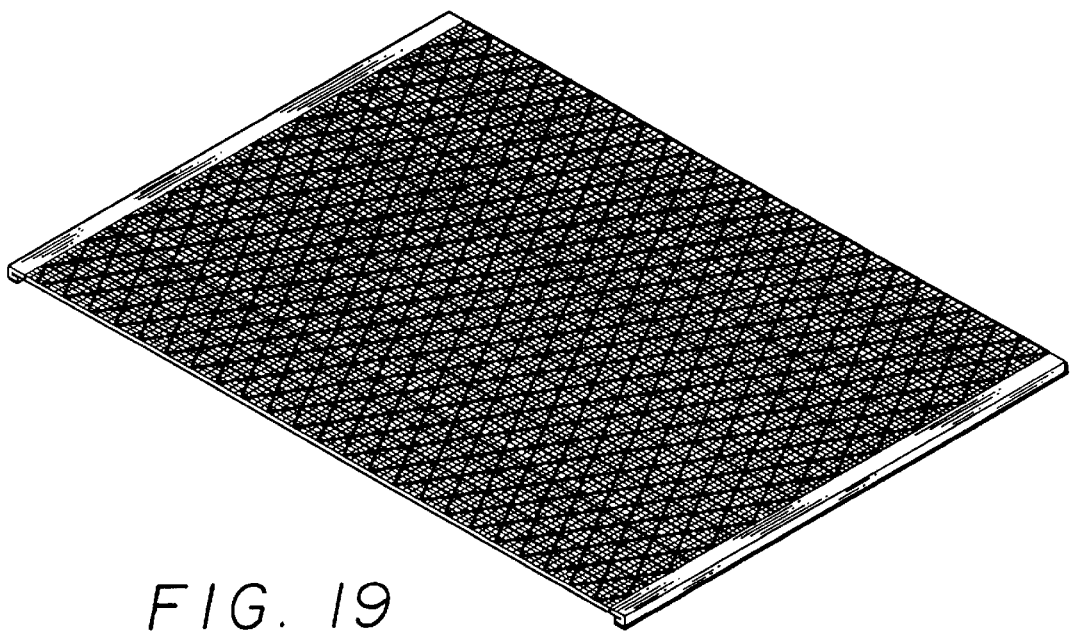
FIG. 19
FIG. 20
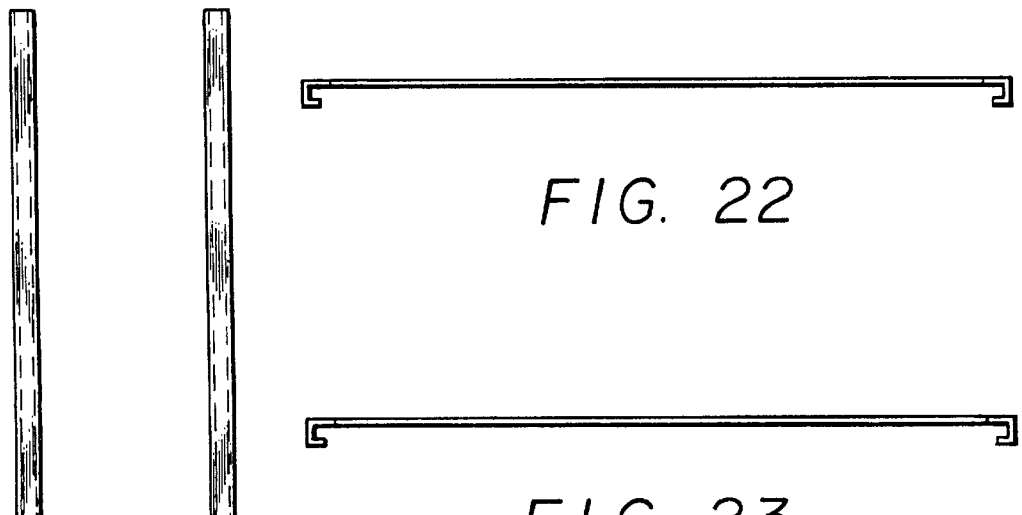
FIG. 22
FIG. 23
FIG. 21

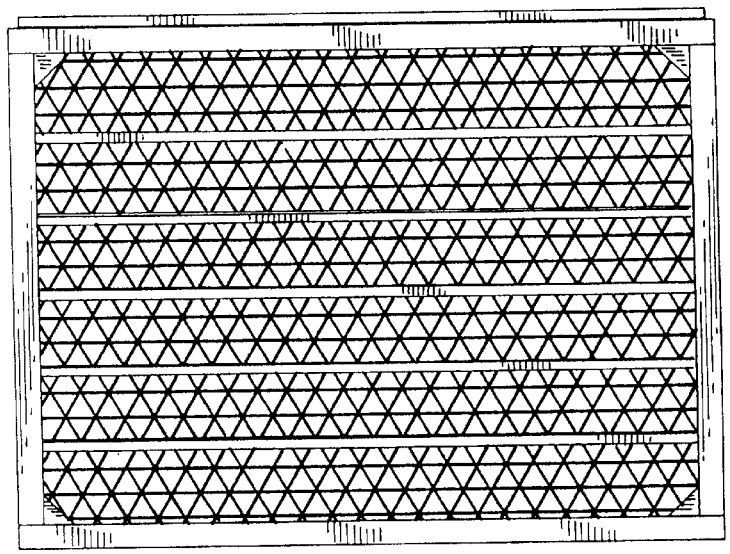
FIG. 28
FIG. 29
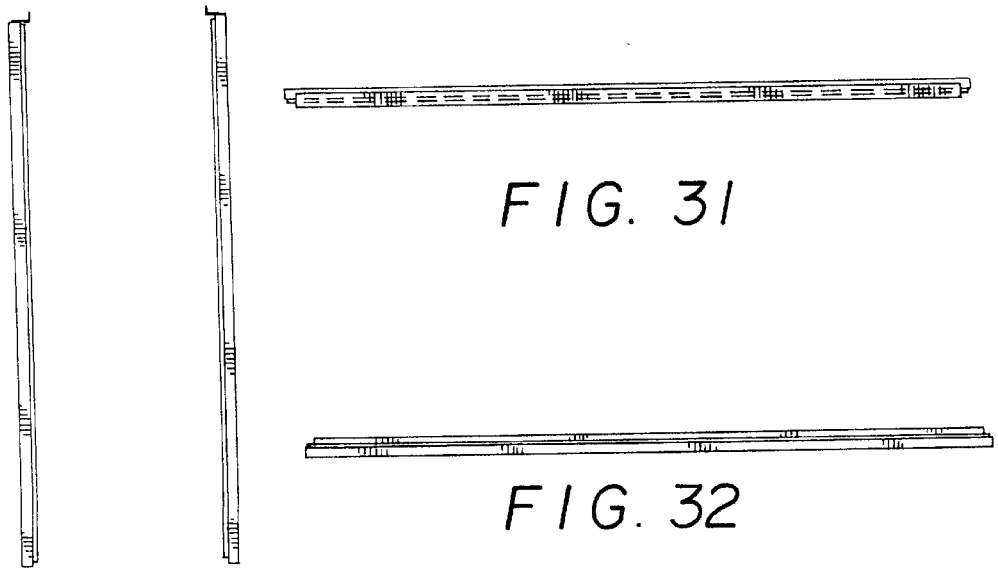
FIG. 31
FIG. 32
FIG. 30

FIG. 35
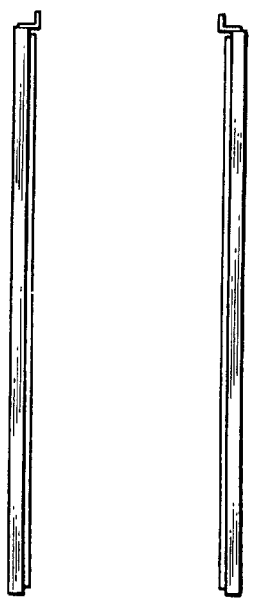
FIG. 36
FIG. 37
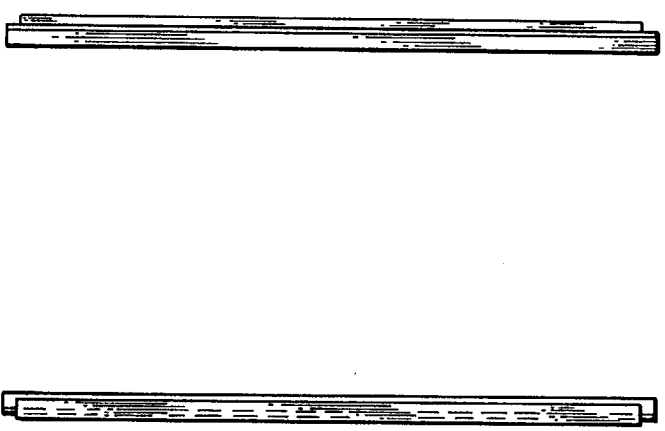
FIG. 38

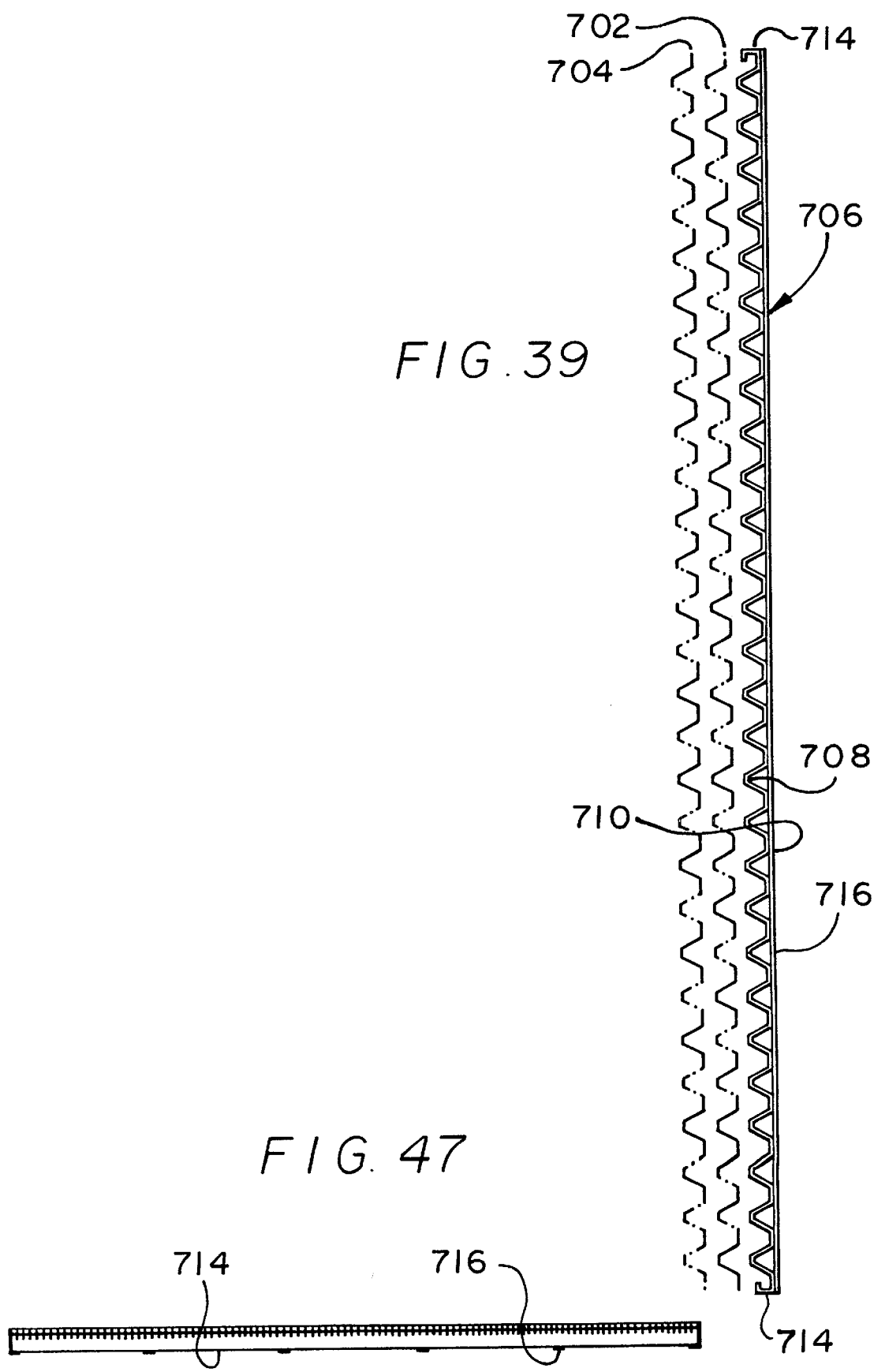

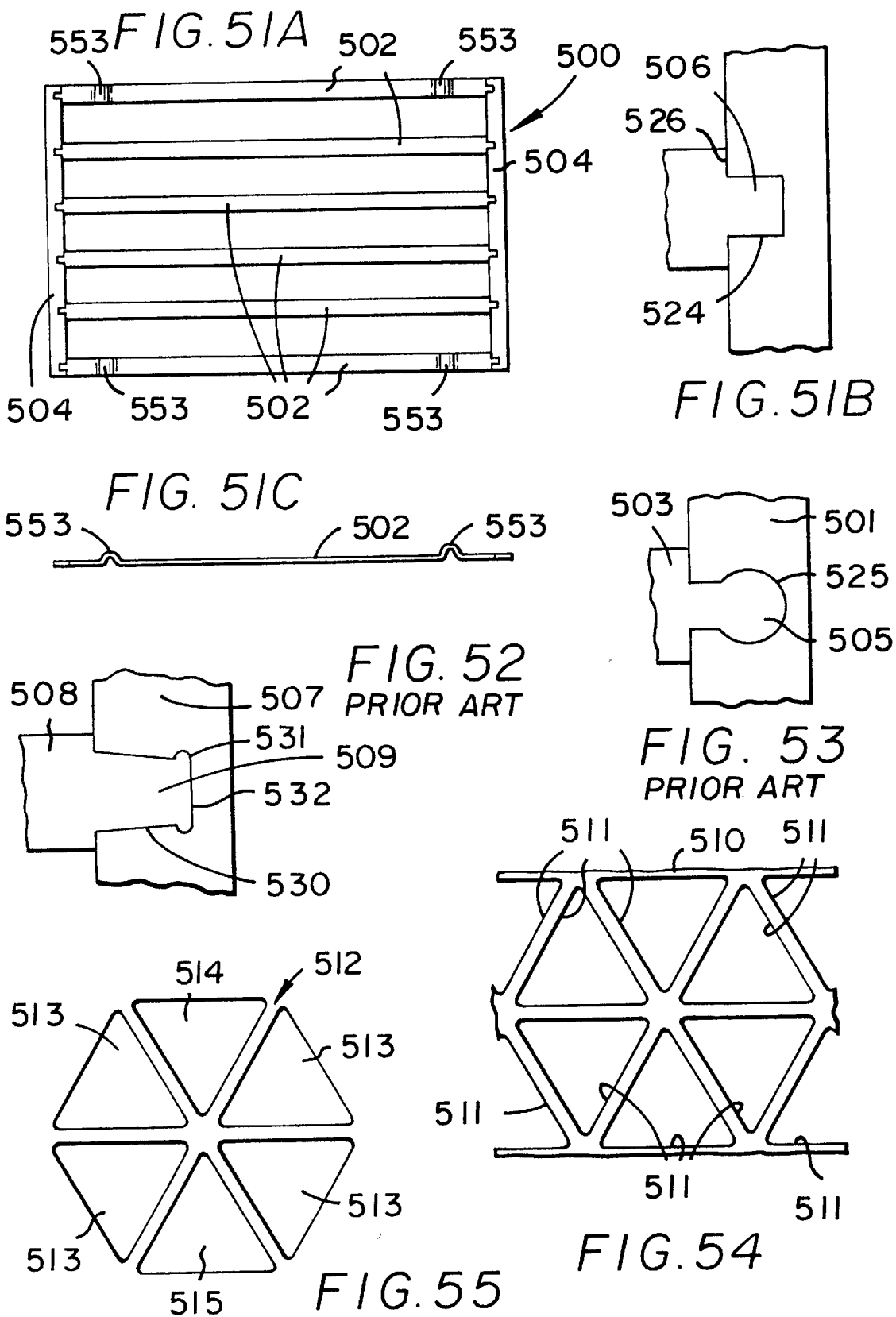

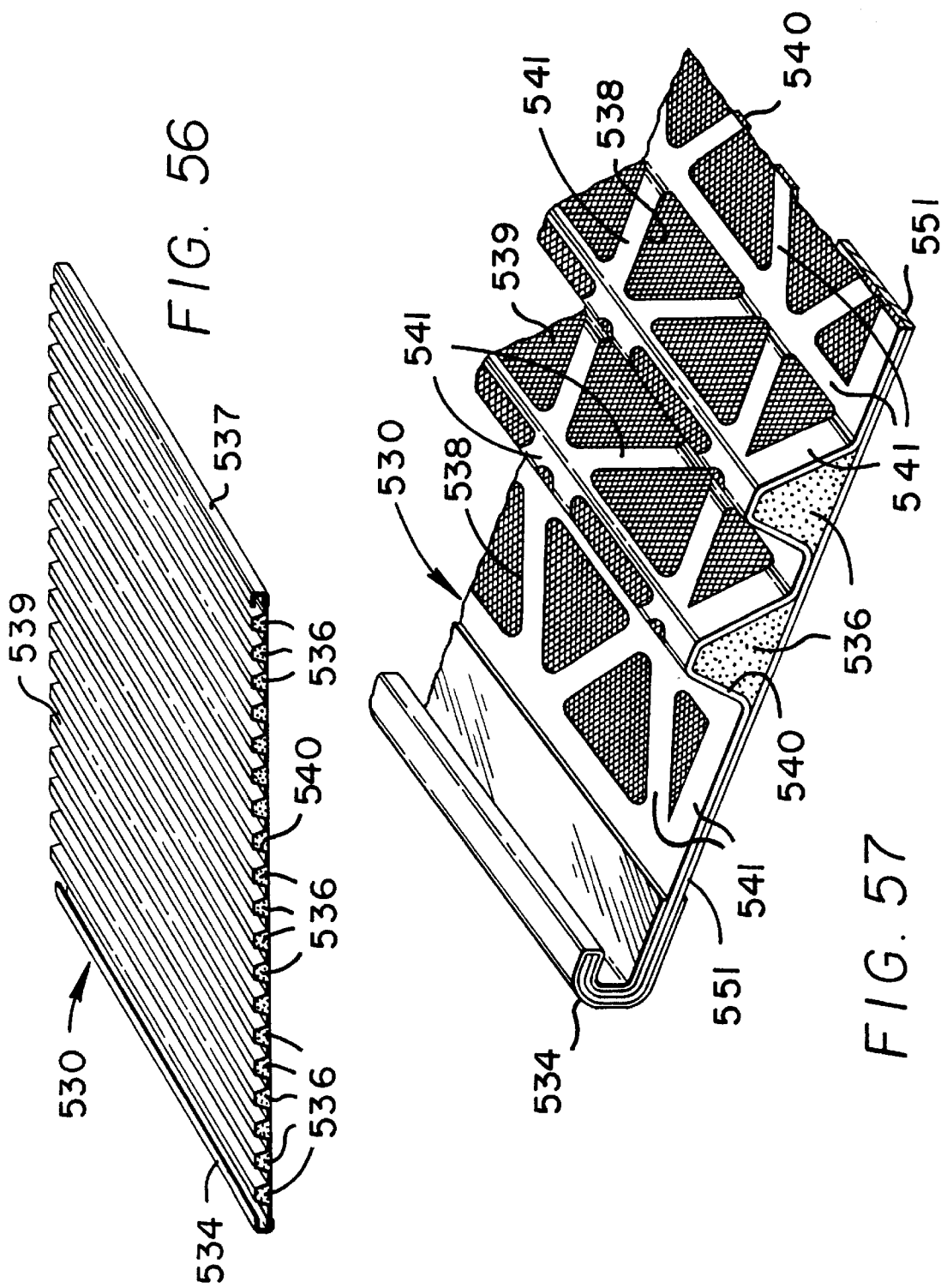

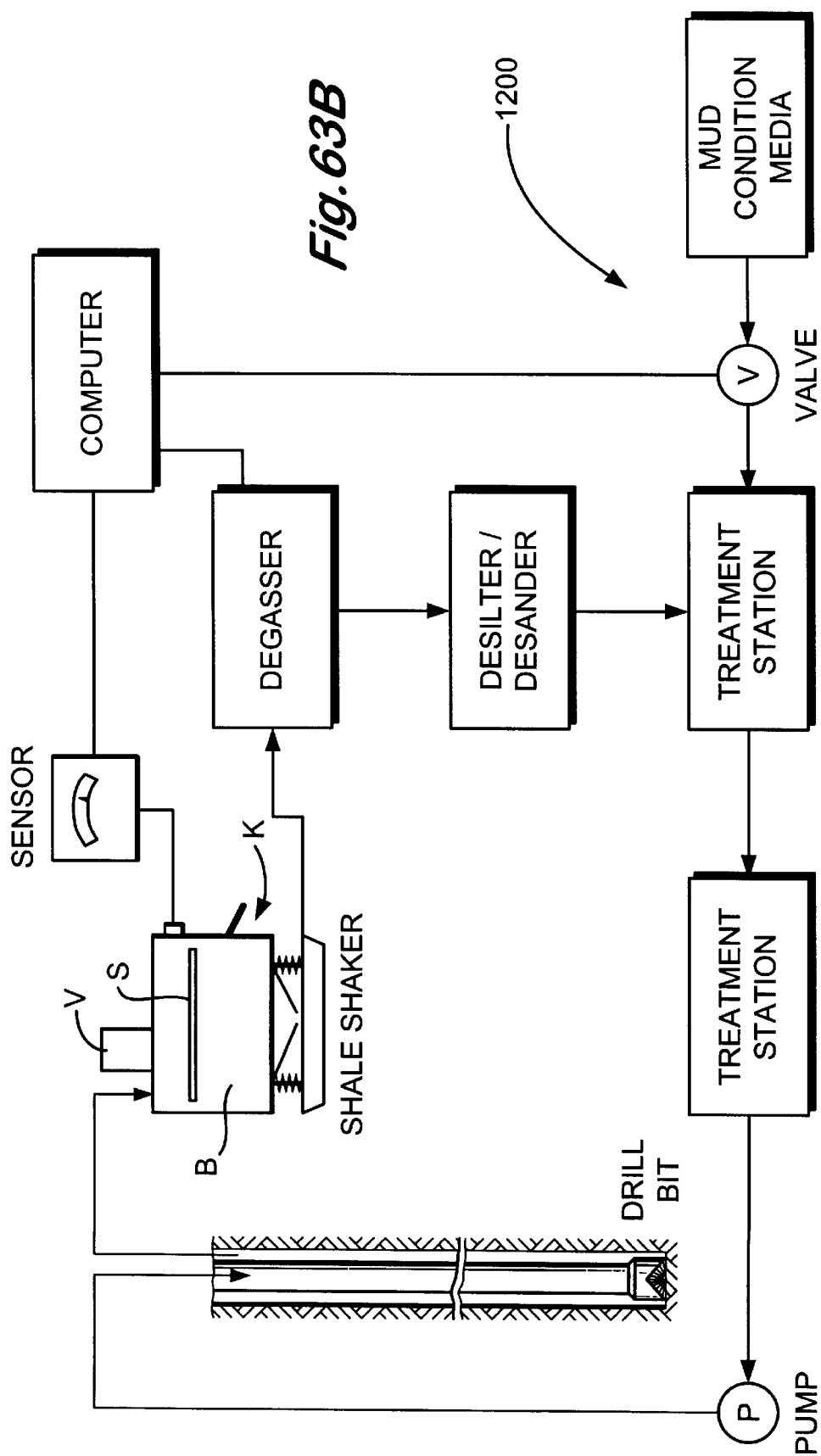

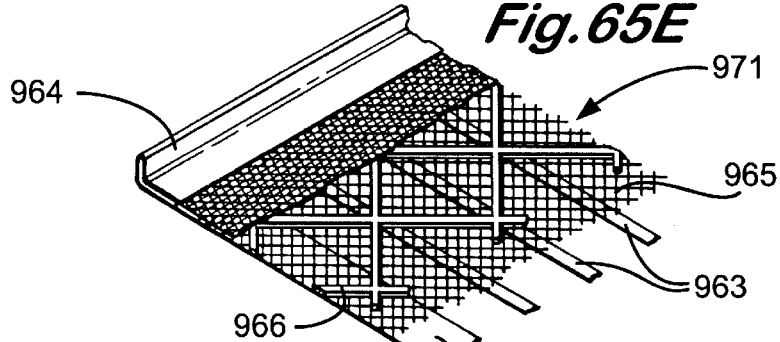
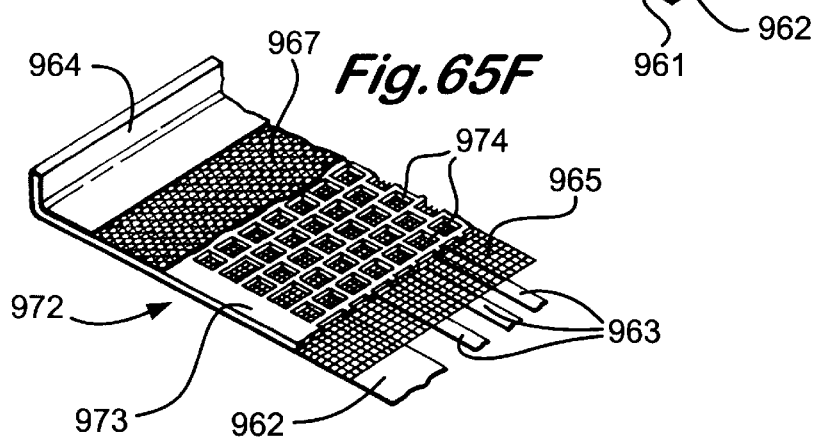
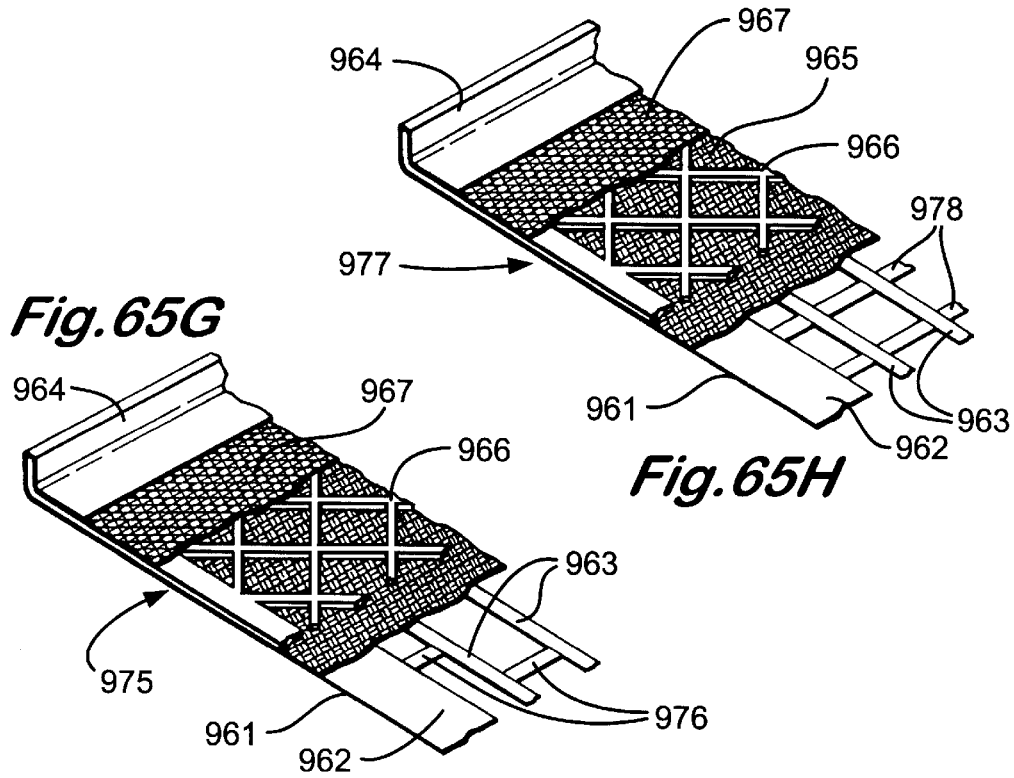

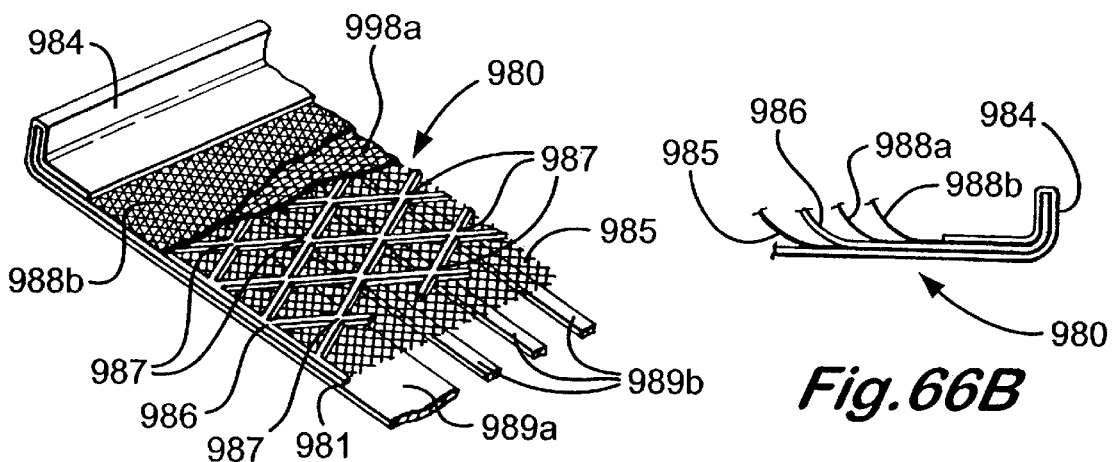
Fig.66A
Fig.66B
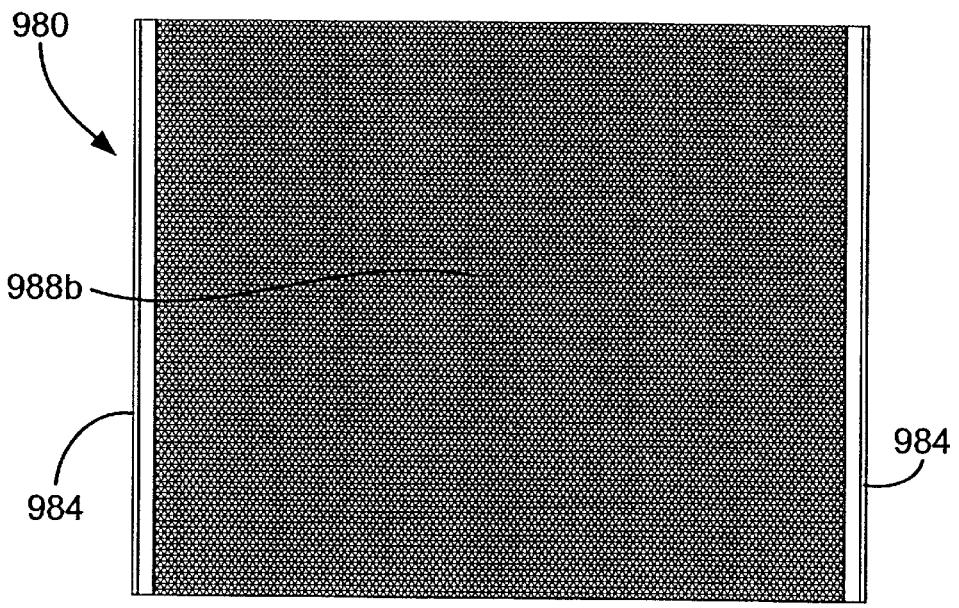
Fig.66C
Fig.66D

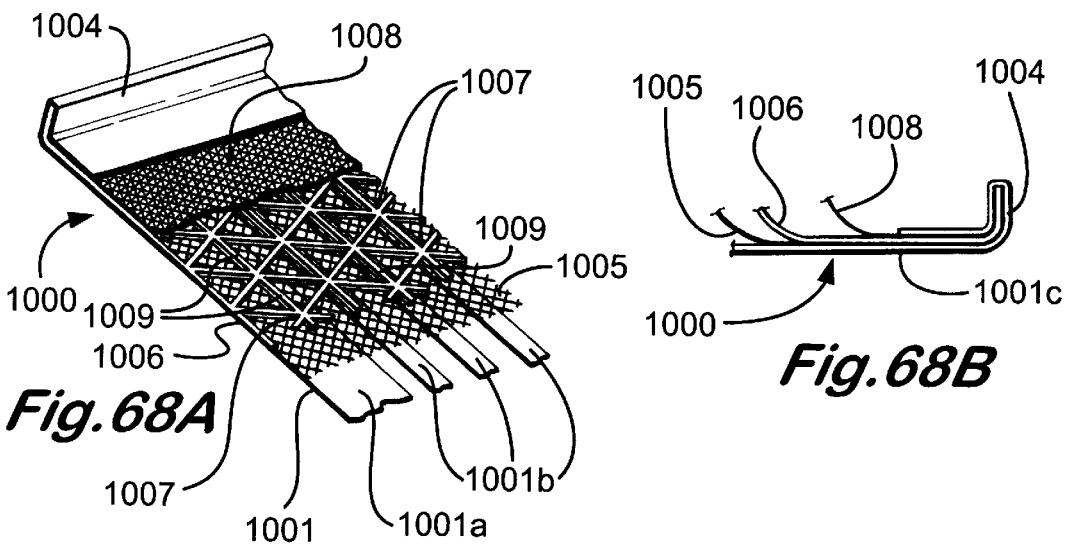
*Fig.68A*  *Fig.68B*
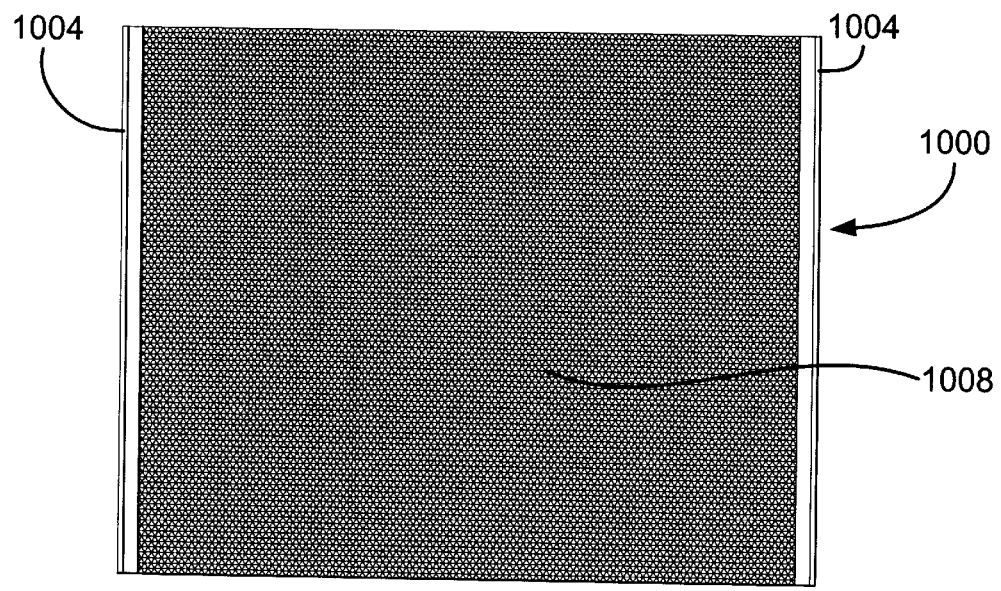
*Fig.68C*
*Fig.68D*

SCREEN APPARATUS FOR VIBRATORY SEPARATOR

RELATED APPLICATIONS

This application is a continuation-in-part of U.S. Ser. No. 09/276,267 filed Mar. 25, 1999, now U.S. Pat. No. 6,032, 806, entitled Screen Apparatus For Vibratory Separator which is a division of U.S. application Ser. No. 08/786,515 filed Jan. 21, 1997, now U.S. Pat. No. 5,971,159 which is a continuation in part of the following co-owned applications and patents: U.S. Ser. No. 29/048,575 file Jan. 4, 1996, now U.S. Pat. No. D. 377,656 which is a continuation of U.S. Ser. No. 29/014,571,filed Oct. 25, 1998 now U.S. Pat. No. D 366,040 issued on Jan. 9, 1996 which is a continuation-in-part of U.S. applications: Ser. No. 08/056,123 filed Apr. 30, 1993, now U.S. Pat. No. 5,385,669 issued on Jan. 31, 1995; and Ser. No. 08/105,696 filed Aug. 12, 1993, now U.S. Pat. No. 5,392,925 issued on Feb. 28, 1995; U.S. Ser. No. 08/504,495 filed Jul. 20, 1995 entitled "Shale Shaker Screen" issued as U.S. Pat. No. 5,598,930 on Feb. 4, 1997; U.S. Ser. No. 08/598,566 filed Feb. 12, 1996 entitled "Screen For Vibrating Separator" which is a continuation-in-part of U.S. Ser. No. 08/220/101 filed Mar. 30, 1994 now U.S. Pat. No. 5,490,598 issued Feb. 13, 1996. This is a continuation-in-part of U.S. application Ser. No. 09/296,975 filed Apr. 22, 1999 entitled Shaker Screens & Methods of Use which is a continuation-in-part of U.S. application Ser. No. 09/228,572 filed Jan. 11, 1999 entitled "Vibratory Separator Screens" which is a continuation-in-part of U.S. application Ser. No. 09/183,005 filed Oct. 30, 1998, which is a continuation-in-part of U.S. application Ser. No. 09/090, 554 filed Jun. 4, 1998 entitled "Vibratory Separator Screen" which is a continuation-in-part of U.S. application Ser. No. 08/895,976 filed Jul. 17, 1997 entitled "Screen For Vibratory Shaker" which is a continuation-in-part of U.S. application Ser. No. 08/786,515 filed Jan. 21, 1997 entitled "Screen For Shale Shaker" and of U.S. application Ser. No. 08/598,566 filed Feb. 12, 1996 entitled "Screen For Vibrating Separator." U.S. application Ser. No. 08/786,515, is a continuation in part of the following co-owned applications and patents: U.S. Ser. No. 29/048,575 filed Jan. 4, 1996, now U.S. Pat. No. D 377,656 issued Jan. 28, 1997 which is a continuation of U.S. Ser. No. 29/014,571, now U.S. Pat. No. D 366,040 issued on Jan. 9, 1996 which is a continuation-in-part of U.S. applications: Ser. No. 08/056,123 filed Apr. 30, 1993, now U.S. Pat. No. 5,385,669 issued on Jan 31, 1995; and Ser. No. 08/105,696 filed Aug. 12, 1993, now U.S. Pat. No. 5,392, 925 issued on Feb. 28, 1995; U.S. Ser. No. 08/504,495 filed Jul. 20, 1995 entitled "Shale Shaker Screen;" U.S. Ser. No. 08/598,566 filed Feb. 12, 1996 entitled "Screen For Vibrating Separator" which is a continuation-in-part of U.S. Ser. No. 08/220/101 filed Mar. 30, 1994 now U.S. Pat. No. 5,490,598 issued Feb. 13, 1996. This application is a continuation-in-part of U.S. application Ser. No. 29/102,627 filed Mar. 29, 1999 which is a division of U.S. application Ser. No. 09/183,003 filed Oct. 30, 1998 which is a continuation-in-part of U.S. application Ser. No. 09/090,554 filed Jun. 4, 1998. All of these related applications and patents are incorporated herein in their entirety for all purposes.

BACKGROUND OF THE INVENTION

1. Field Of The Invention

The present invention is directed to vibratory screens, to filtering screens, to such screens that are generally flat or that are not flat, to devices with such screens, and to shale shakers with such screens, and to shakers for separating particles.

2. Description of Related Art

The need for solids control in drilling mud used in hydrocarbon well drilling is well known in the prior art. Drilling mud, typically a mixture of clay and water and various additives, is pumped down through a hollow drill string (pipe, drill collar, bit, etc.) into a well being drilled and exits through holes in a drillbit. The mud picks up cuttings (rock) and other solids from the well and carries them upwardly away from the bit and out of the well in a space between the well walls and the drill string. At the top of the well, the solids-laden mud is discharged over a shale shaker, a device which typically has a series of screens arranged in tiered or flat disposition with respect to each other. The prior art discloses a wide variety of vibrating screens, devices which use them, shale shakers, and screens for shale shakers. The screens catch and remove solids from the mud as the mud passes through them. If drilled solids are not removed from the mud used during the drilling operation, recirculation of the drilled solids can create weight, viscosity, and gel problems in the mud, as well as increasing wear on mud pumps and other mechanical equipment used for drilling.

In some shale shakers a fine screen cloth is used with the vibrating screen. The screen may have two or more overlying layers of screen cloth. The prior art discloses that the layers may be bonded together; and that a support, supports, or a perforated or apertured plate may be used beneath the screen or screens. The frame of the vibrating screen is resiliently suspended or mounted upon a support and is caused to vibrate by a vibrating mechanism, e.g. an unbalanced weight on a rotating shaft connected to the frame. Each screen may be vibrated by vibratory equipment to create a flow of trapped solids on top surfaces of the screen for removal and disposal of solids. The fineness or coarseness of the mesh of a screen may vary depending upon mud flow rate and the size of the solids to be removed.

Many screens used with shale shakers are flat or nearly flat (i.e. substantially two-dimensional). Other screens, due to corrugated, depressed, or raised surfaces are three-dimensional. U.S. Pat. Nos. 5,417,793; 5,417,858; and 5,417,859 disclose non-flat screens for use with shale shakers. These screens have a lower planar apertured plate with a multiplicity of spaced-apart apertures or openings therethrough. Undersides of troughs of undulating screening material are bonded to the apertured plate. Such screens present a variety of problems, deficiencies, and disadvantages, including: decreased flow area due to area occluded by solid parts of the apertured plate; necessity to either purchase relatively expensive apertured plate or provide for in-house perforating of a solid plate; plate weight increases wear on parts such as rubber screen supports or cushions and can inhibit required vibration; large plate surface area requires relatively large amount of bonding means for bonding screens to the plate; and a finished screen which is relatively heavy increases handling problems, hazards, and cost of shipping.

Vibrating screens have been employed for many years to separate particles in a wide array of industrial applications. One common application of vibrating screens is in drilling operations to separate particles suspended in drilling fluids. The screens are generally flat and are mounted generally horizontally on a vibrating mechanism or shaker that imparts either a rapidly reciprocating linear, elliptical or circular motion to the screen. Material from which particles are to be separated is poured onto a back end of the vibrating screen, usually from a pan mounted above the screen. The material generally flows toward the front end of the screen. Large particles are unable to move through the screen remaining on top of the screen and moving toward the front of the screen where they are collected. The smaller particles and fluid flows through the screen and collects in a pan beneath the screen.

A vibrating screen may be formed from one or more layers of wire mesh. Wire mesh is generally described with reference to the diameter of the wires from which it is woven, the number wires per unit length (called a mesh count) and the shape or size of the openings between wires. Wire mesh comes in various grades. "Market" grade mesh generally has wires of relative large diameter. "Mill" grade has comparatively smaller diameter wires and "bolting cloth" has the smallest diameter wire. The type of mesh chosen depends on the application. Smaller diameter wires have less surface and thus less drag, resulting in greater flow rates. Smaller diameter wires also result, for a given opening size, in a larger percentage of open area over the total area of the screen, thus allowing greater flow rates and increased capacity. However, screens of bolting cloth tears more easily than market or mill grade screens, especially when used in harsh conditions such as drilling and mining operations. The smaller diameter wires tend to have less tensile strength and break more easily, and the finer mesh also tends not to retain its shape well.

Most meshes suffer from what is termed as "near sized particle blinding. During vibration, wires separate enough to allow particles of substantially the same size or slightly larger than the openings to fall between the wires and become lodged, thus "blinding" the openings of the screen and reducing capacity of the screen. If a particle becomes lodged when the wires are at a maximum distance apart, it is almost impossible to dislodge the particle. Sometimes, however, wires will subsequently separate further to release the lodged particle. Unfortunately, some wire mesh, especially bolting cloth, is tensioned. Tensioning restricts movement of the wires. Restricting movement assists in holding the shape of the wire mesh, keeping the size of the openings consistent to create a more consistent or finer "cutting point" and reducing abrasion from wires rubbing against each other. However, restricted movement of the wires reduces the probability that, once a near sized particle becomes stuck, the wires will subsequently separate to allow the particle to pass. Use of smaller diameter wires, with smaller profiles, helps to reduce blinding. With a smaller diameter wire, a particle is less likely to become lodged midway through the opening.

Multiple layers of mesh may be used to alleviate blinding. U.S. Pat. No. 4,033,865, describes layering two meshes in a manner that results in at least one wire of the lower of the two meshes bisecting each opening in the upper mesh. The openings in each mesh are at least twice as wide as the diameters of the wires and the lower mesh has openings the same size as or slightly larger than the openings in the upper mesh. The lower mesh, when held tightly against the upper mesh, prevents particles from migrating far enough into an opening in the upper mesh to be trapped. Some relative movement of the layers also helps to dislodge particles caught in the upper layer. The two-layer arrangement has the further benefit of a finer "cutting point," allowing smaller particles to be separated out. A third "backing" layer of relatively coarse, mill grade mesh is often used to carry most of the load on the screen and to increase the tensile strength of the screen.

Another problem faced in most applications is the tearing of the screen. The problem can be especially acute in heavy duty applications such as drilling and mining. A torn screen must be replaced or repaired. To facilitate repair, the screen layers are bonded to a rigid or semi-rigid support panel that has a pattern of large openings, forming on the screen a plurality of small cells of wire mesh. When a tear occurs in the screen, the mesh remaining within the cell in which the tear occurred is cut out and the cell is plugged. The capacity of the screen is diminished but its life is extended. Typically, several cells of a screen can be repaired before its capacity drops far enough to require replacement. Unfortunately, bonding the screen to the support panel further restricts relative movement of the layers and the wires in each mesh layer, thus compounding the problem of blinding.

Blinding and tearing of the screens reduce the capacity of the screen continually through its useful life. Although capacity can be increased by increasing the total area the screens, the size of the screen is limited in most applications, such as on drilling rigs, especially those on offshore platforms. There has thus been generally a trade-off between capacity, longevity, repairability and resistance to blinding of the screens.

There is a need for a supported (either non-flat or flat) screen which is consumable, efficient and cost-effective, yet readily and inexpensively made, easy to handle, and relatively inexpensive to transport.

SUMMARY OF THE PRESENT INVENTION

The present invention discloses, in certain embodiments, a screen for vibrating screen apparatus. The screen has one or more upper layers of screen, screen cloth, and/or mesh. If more than one layer is used, they may be bonded together at discrete points, at discrete areas, or over their entire surface. The layer or layers are mounted on frame apparatus which may include a solid side support on each of two spaced apart sides of the layer(s), or may include a full four sided screen frame. A strip or strips of support material (e.g. flat steel, aluminum or plastic strips —of any width, but in certain preferred embodiments ranging between a half inch to three inches in width; and of any thickness, but in certain preferred embodiments ranging between one-thirty second and one-eighth inches thick, or rods of these materials with a diameter between one-thirty second and one-eighth inches; any screen may use strips made from different materials, e.g. cross-strips of plastic and end strips of steel, or vice versa) are secured across two or more frame sides. With respect to a two sided frame wherein the two sides are parallel and spaced apart, a strip or strips may be, according to this invention, disposed parallel to the two sides; and, if more than one strip is used, spaced apart across the area of the layer or layers. It is also within the scope of this invention to use a strip or strips which are disposed in a manner non-parallel to the two sides. In one aspect such non-parallel strips may extend diagonally from one end of one side of the frame, across the layer or layers, to a diagonally opposite end of the other side. In another aspect such a strip may extend from any point of a frame side to any point on a non-framed side of the layer or layers. Any such strip (or rod) may be bonded, sintered, welded or otherwise secured (herein referred to collectively as "bonded") at any point to the layer or layers; at substantially every point of contact between the strip(s) and the layer(s); or at selected intermediate contact points.

In certain embodiments a screen assembly for a vibratory separator is provided that has a corrugated support plate having a plurality of alternating raised portions and lower portions, the corrugated support plate having a plurality of spaced apart openings therethrough, a screen frame with a first pair of spaced apart first sides and a second pair of spaced apart second sides, the first sides spaced apart by the second sides and connected thereto, the frame having a plurality of spaced apart support strips extending beneath the corrugated support plate, each support strip independent of and not connected to the other support strips along its length, each support strip having two spaced apart ends each connected to a spaced apart side of the frame and to which the corrugated support plate is secured. Such a screen assembly may, optionally, have at least one projecting portion on each support strip for reception within a raised portion of the corrugated support plate, and screening material on the corrugated support plate.

In certain embodiments such a strip (or strips) is used with an undulating three-dimensional layer or layers of screen, screen cloth, screen mesh, or some combination thereof (either non-bonded layers or bonded layers if multiple layers are present). If the undulating layer(s) present certain downwardly projecting areas, e.g. troughs between valleys, some or all of the troughs may, within the scope of this invention, be bonded to the strip(s) or portions thereof, and all or only a portion of a trough may be bonded to the strip(s).

Certain prior art shaker screens have a frame side with an in-turned edge which facilitates hooking of the screen, e.g. to a vibrating basket. In one embodiment of the present invention a strip as described above extending between two frame sides also extends into and becomes this in-turned hooked edge. In another aspect a strip is secured to a portion of a hook. To inhibit or prevent fluid leakage at the hook/strip interface, a steel strip may be welded to a metal hook (or a non-metal strip may be bonded to a metal or non-metal hook). In one aspect typical frame sides are not used and only a series of strips with hook edges support the screening material and provide for its mounting to a shale shaker.

In other embodiments in which two frame sides are used, support strips at opposite ends of the frame sides may also serve as end members across the layer(s) ends which do not have frame sides. In one aspect such strips are emplaced at the leading and trailing edges of the layers.

In embodiments of this invention in which the layer (or layers) are non-flat (e.g. undulating) and there is some sort of extended depressed or lower areas on or across the layers which provide a generally lower path for fluid moving on part of or all the way across a screen, the strip or strips according to this invention may be placed beneath the layer or layers at any desired angle to the direction of flow of the fluid across the screen. Also, in those cases in which the entire screen surface has undulations in a same general direction, the screen may be disposed so that fluid flows across the screen either generally in the same direction as the undulations or transverse to such a direction. In either case, a strip or strips beneath the layer(s) may be in the direction of flow or transverse to it.

In one aspect the strips (or rods) described above have one or more projecting portions formed integrally thereof or secured thereto which project into troughs or areas of the layer(s). Such projecting portions may be shaped and configured to mate with the shape of a hill, valley, trough or indented area; may be bonded to the layer(s) at such areas; may be bonded only to the sides of such areas and not to the uppermost portion of a top portion thereof; or may be adjacent such areas without bonding thereto. If there is a series of parallel troughs or a plurality of adjacent indented areas, such projections may be provided in all such troughs or areas; in only on such trough or area; in troughs or areas only adjacent frame sides; or in only middle troughs or areas. It is within the scope of this invention in embodiments in which the screen has a series of parallel troughs, to use alternating flat strips and strips with one or more projections as described above. It is also within the scope of this invention to use non-flat strips which have a shape that corresponds to the series of troughs, e.g. with undulating layer(s), a corresponding undulating strip is used. Such strips may be used instead of or in combination with flat strips as previously described. Any strip herein may have holes through it to facilitate fluid flow. In one aspect any strip, combination of strips, or pattern of strips disclosed herein may be used with a generally flat ("two-dimensional") screen. In any screen disclosed herein the screening material may be sintered to itself, individual screen wires may be sintered to each other, one or more layers of screen material, cloth, mesh, or screen may be sintered to each other; and any screen material may be sintered to any strip disclosed herein, either entirely along its length or at selected points or areas therealong.

The present invention, in one embodiment includes a shale shaker with a frame; a "basket" or screen mounting apparatus; one or more screens as described above and below; and basket vibrating apparatus.

It is within the scope of this invention to provide a screen as disclosed in U.S. Pat. Nos. 5,417,793; 5,417 858; and 5,417,859, but to delete the apertured plate required by these patents and to use instead a coarse mesh or a coarse flexible mesh. In certain preferred embodiments this mesh ranges in size between a 1 mesh to a 3 mesh, with a 2 mesh used in one particular embodiment. It is within the scope of this invention to use any strip, combination of strips, strip member, or pattern of strips in place of the apertured plate required by the three listed patents. It is within the scope of this invention to use any strip or strips disclosed herein in combination with the apertured plate required by the three listed patents.

The invention, in certain embodiments, discloses a screen for a vibrating separator or shaker that has increased capacity without an increase in overall dimensions. It furthermore accommodates desirable attributes such as resistance to blinding, repairability and longevity. The screen, substantially horizontal when placed on a separator for operation, is formed from one or more layers of mesh. The one or more layers of mesh are formed into an alternating series of ridges and channels lying substantially within the plane of the screen. The ridges increase the surface area of the screen without increasing the overall dimensions of the screen, thus improving flow capacity. Additionally, particles tend to drop into the channels, leaving the tops of the ridges exposed to fluids for relatively unimpeded flow through the screen that further improves flow rates. Furthermore, the ridges and channels tend to assist in evenly distributing separated particles across the screen. Uneven distribution, due to for example rolling of the screen from side to side when used on offshore platforms, degrades flow capacity of the screen.

In accordance with another aspect of the invention, the wire mesh is bonded to a rigid or semi-rigid panel having an array of openings that are very large as compared to those of the mesh. The support panel is formed with or bent into a series of alternating ridges and channels to create the ridges and channels in the wire mesh when it is bonded to the panel. The openings in the panel create, in effect, a plurality of individual screen cells when the wire mesh is bonded to the panel around each opening. When a portion of wire mesh fails or is torn within a cell, the screen is repaired by cutting the remaining mesh from the cell opening and plugging the cell opening with a solid piece of material.

In accordance with another aspect of the invention, the ridges and channels of the panel have substantially flat surfaces on which the openings are located. A substantially planar opening allows a flat plug to be inserted into the opening for improved fit and sealing. The plug is preferably formed with an edge that facilitates insertion into opening and into which the edge of the cell opening snugly fits, making a repair quick and easy.

In accordance with another aspect of the invention, the ridges have a generally triangular cross section. In a preferred embodiment, the ridges are formed from two surfaces in a triangular configuration and the channel is formed from a flat bottom surface extending between the ridges. This geometry tends to maximize effective or useful surface area of the screen, especially if flat surfaces are used on the ridge to facilitate repair. During normal operation of the separator or shaker, most of the particles fall into the channel and the material to be separated tends to flow through the screen along the sides of the ridges and the bottom of the channel. A generally triangular configuration of the ridge tends to expose greater screen area to the flow and to minimize the amount of area on top of the ridge that tends not to be exposed to material flow.

In another aspect a screen according to the present invention has a lower perforated corrugated plate with a plurality of triangular apertures or openings forming the perforations through the plate. In one aspect the triangles are congruent, of similar size, and are arrayed side-to-side across the plate. In certain aspects when a corrugated plate is used, no plastic grid is placed or used between screens or meshes or between a plate and screening material. The mesh, meshes, screen, screens, or screening material(s) are secured on the plate directly with the use of adhesive on the plate, e.g. but not limited to powder adhesive, without the use of a plastic or adhesive grid. Alternatively such a grid may be used. In certain aspects in which a corrugated perforated plate is used, the screen, mesh or screening material does not contact a strip or multiple strips disposed beneath the plate. In one aspect a corrugated perforated plate is secured to a frame comprised of sides. In another aspect strips as described herein are used with such a frame for certain embodiments. In such a device screening material or mesh secured to the corrugated perforated plate does not contact or bond to the strip/frame assembly.

It is, therefore, an object of at least certain preferred embodiments of the present invention to provide:

New, useful, unique, efficient, non-obvious screen assemblies; screen assemblies with one or more lower coarse screen members and one or more upper fine screen members; such screens with one or more bottom strip members, support strips or rods; such screen assemblies in which screening material of adjacent screens is fused together with plastic; and shale shakers or vibratory separators with any such screen assemblies;

Such screens or screen assemblies which overcome the problems, limitations and disadvantages of prior art screens;

Such a screen or screen assembly with a top most coarse screen or coarse screen portion; and A shale shaker or vibratory separator with one or more such screens or screen assemblies.

Certain embodiments of this invention are not limited to any particular individual feature disclosed here, but include combinations of them distinguished from the prior art with their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a basis or creative impetus for designing other structures, methods and systems for carrying out and practicing the present invention. The claims of this invention should be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

Description Of The Drawings

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or equivalent embodiments.

FIG. 1C is an end view of the screen of FIG. 1A.

FIG. 1D is a bottom view of the screen of FIG. 1A.

FIG. 2C is a bottom view of the screen of FIG. 2A.

FIG. 3 is a bottom view of a screen according to the present invention.

FIG. 4 is a bottom view of a screen according to the present invention.

FIG. 7A is a top view of a screen according to the present invention.

FIG. 7C is an end view of the screen of FIG. 7A.

FIG. 8A is a bottom view of part of a screen with cross strips according to the present invention. FIG. 8B is an end view of part of the screen of FIG. 8A. FIG. 8C is an end view of part of the screen of FIG. 8B.

FIG. 19 is a perspective view of a screen according to the present invention.

FIG. 20 is a side view of the screen of the FIG. 19.

FIG. 21 is a side view opposite the side of FIG. 20 of the screen of FIG. 1.

FIG. 22 is an end view of the screen of FIG. 19.

FIG. 23 is an end view of an end opposite the end of FIG. 22 of the screen of FIG. 19.

FIG. 28 is a bottom view of the screen of FIG. 26.

FIG. 29 is a side view of one side of the screen of FIG. 26.

FIG. 30 is a side view of another side of the screen of FIG. 26 opposite the side shown in FIG. 29.

FIG. 31 is an end view of the screen of FIG. 26.

FIG. 32 is another end view of the screen of FIG. 26 opposite the end shown in FIG. 31.

FIG. 35 is a side view of one side of the screen of FIG. 33.

FIG. 36 is a side view of another side of the screen of FIG. 33.

FIG. 37 is an end view of the screen of FIG. 33.

FIG. 38 is another end view of the screen of FIG. 33 opposite the end shown in FIG. 37.

FIG. 39 is an end view of a screen according to the present invention.

FIG. 46 is an end view of a portion of an end view screen like that of FIG. 43 mounted to basket of a shaker, showing a latching mechanism for securing the screen to the shaker.

FIG. 47 is an end view of the screen illustrated in FIG. 39.

FIG. 51A is a top view of a screen frame according to the present invention. FIG. 51B is an enlargement of a portion of FIG. 51A. FIG. 51C is an end view of a strip of the screen frame of FIG. 51A.

FIG. 52 is an alternative strip interlocking structure for a screen frame as in FIG. 51A.

FIG. 53 is an alternative strip interlocking structure for a screen frame as in FIG. 51A.

FIGS. 54 and 55 are top views of a portion of a plate.

FIG. 56 is a perspective view of a screen according to the present invention. FIG. 57 is an enlarged portion of part of the screen of FIG. 56.

FIG. 63B is a schematic view of a system according to the present invention.

FIGS. 65A and 65D-H are perspective views of screen assemblies according to the present invention.

FIG. 66A is a perspective view of a screen assembly according to the present invention. FIG. 66C is a top view, FIG. 66D is an endview, and FIG. 66B is an enlarged view of a portion (shown outlined in FIG. 66C) of the screen assembly of FIG. 66A.

FIG. 68A is a perspective view of a screen assembly according to the present invention. FIG. 68C is a top view, FIG. 68D is an end view, and FIG. 68B is an enlarged view of a portion (shown outlined in FIG. 68C) of the screen assembly of FIG. 68A.

DESCRIPTION OF EMBODIMENTS PREFERRED AT THE TIME OF FILING FOR THIS PATENT

Figure 1A:
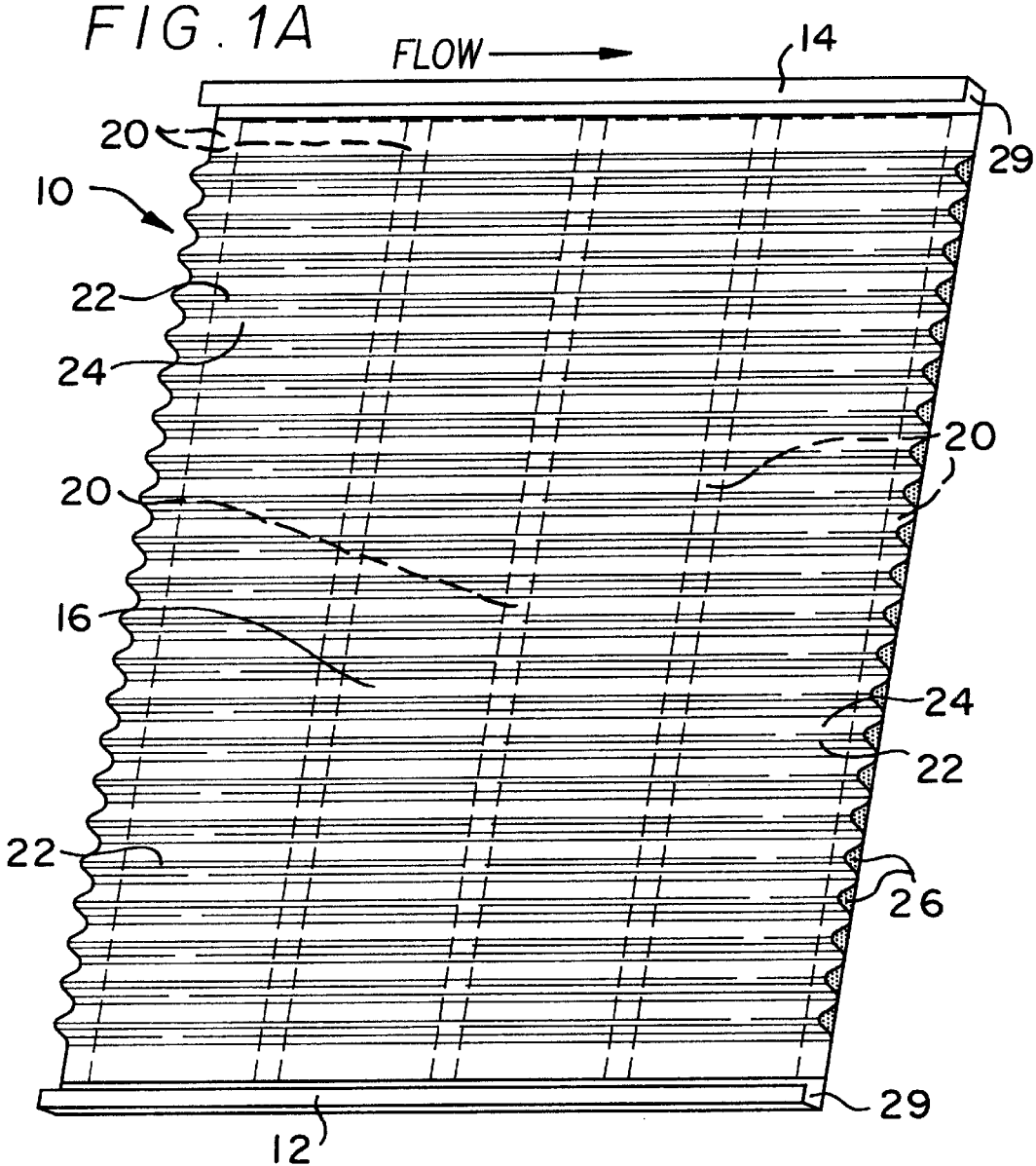
FIG. 1A is a perspective view of a screen according to the present invention.
Figure 1B:
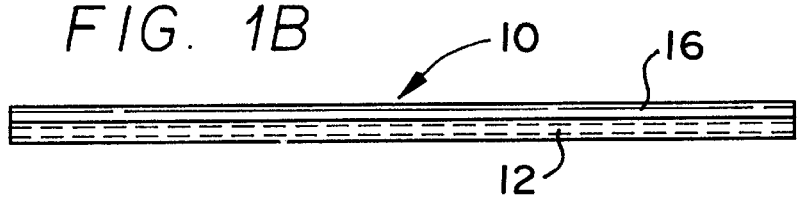
FIG. 1B is a side view of the screen of FIG. 1A.

FIG. 1A shows a screen 10 according to the present invention with a frame with two sides 12 and 14 with strips 20 extending between the two sides 12 and 14; and screen material 16 on the strips 20 and connected to the sides 12 and 14. Screen material 16 (and any other screen or screening material disclosed herein) represents any known mesh, screen, or screens, used in any combination, bonded together or unbonded. The screen material 16 as shown is "three-dimensional," i.e., not generally flat and has undulating portions with hills 22 (as seen in FIGS. 1A–1C) and valleys 24. (It is within the scope of this invention for the screening material 16 and any other screening material herein to be generally flat.)

Plugs 26 may plug ends of the hills 22. Incorporated fully herein by reference is the disclosure of co-owned pending U.S. Application Ser. No. 08/282,983 filed on Jul. 29, 1994 entitled "Shale Shaker Screens" which discloses three-dimensional screens with plugged ends.

In the screen 10 each bottom part 28 of a valley 24 is glued with adhesive, e.g. but not limited to epoxy, to the cross strips where the strips 20 run under the screen material 16. The frame sides 12 and 14 have, optionally, a hook portion 30 which facilitates screen mounting in certain shale shakers.

As shown in FIG. 1A the valleys 24 and hills 22 run generally parallel to the frame sides 12 and 14 and, when the screen 10 is mounted in a shale shaker, the direction of flow of drilling fluid (indicated by the arrow labelled "FLOW") is generally the same as the direction in which the valleys 24 and the hills 22 run.

Figure 2A:
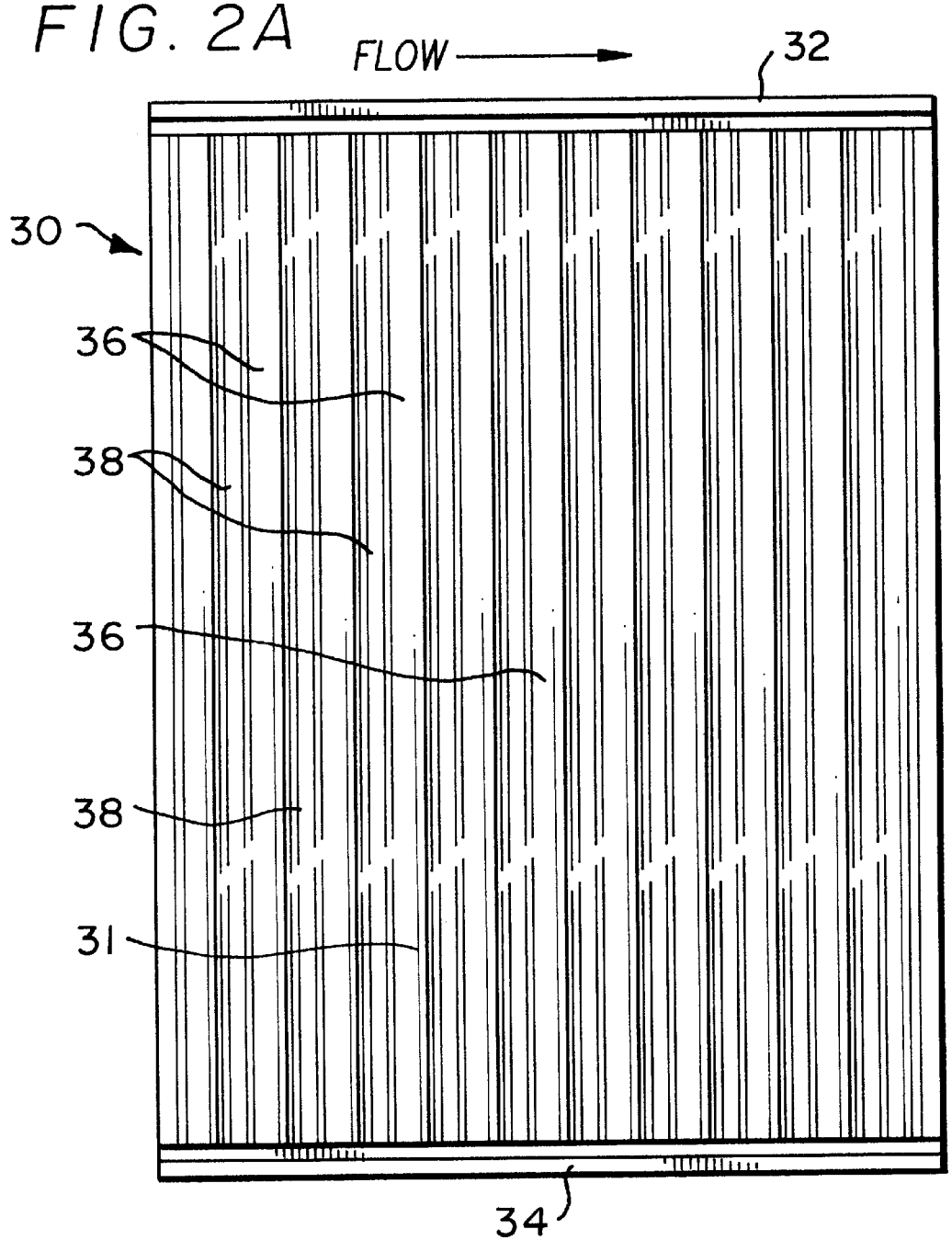
FIG. 2A is a top view of a screen according to the present invention.

FIG. 2A shows a screen 30 according to the present invention which as frame sides 32 and 34 between which is mounted undulating screen material 31. Any strip or strip combination disclosed herein may be used on the screen 30 below the screen material 31. The screen material 31 has hilltops 36 and valleys 38 which are generally perpendicular to the frame sides 32 and 34 and run across the screen 30 from one side 32 to the other side 34. When mounted on a shale shaker the direction of flow of drilling fluid across the screen 30 (as shown by the arrow labelled "FLOW") is at right angles to the general direction of the hills and valley. In one embodiment the strips are aligned with the direction of the valleys and, in another embodiment, there is a strip or rod under each valley. Instead of a strip or strips beneath the screen material 31, an apertured plate (which is not an equivalent of a rod or strip or of a series of strips) may be used.

FIGS. 3–6 show alternative configurations of bottom support strip combinations which may be used with any screen disclosed herein. The screening material may be any embodiment as disclosed herein. FIG. 3 shows an embodiment of a screen 40 with screening material 41 between frame sides 46 and 47 and a bottom support structure with cross strips 42 (like the previously described strips) and end strips 44 and 45 (which are like previously described strips but are at ends of the screening material 41).

FIG. 4 shows a screen 50 according to the present invention with screening material 51 between frame sides 52, 53, 54, and 55 and cross strips 56.

Figure 5:
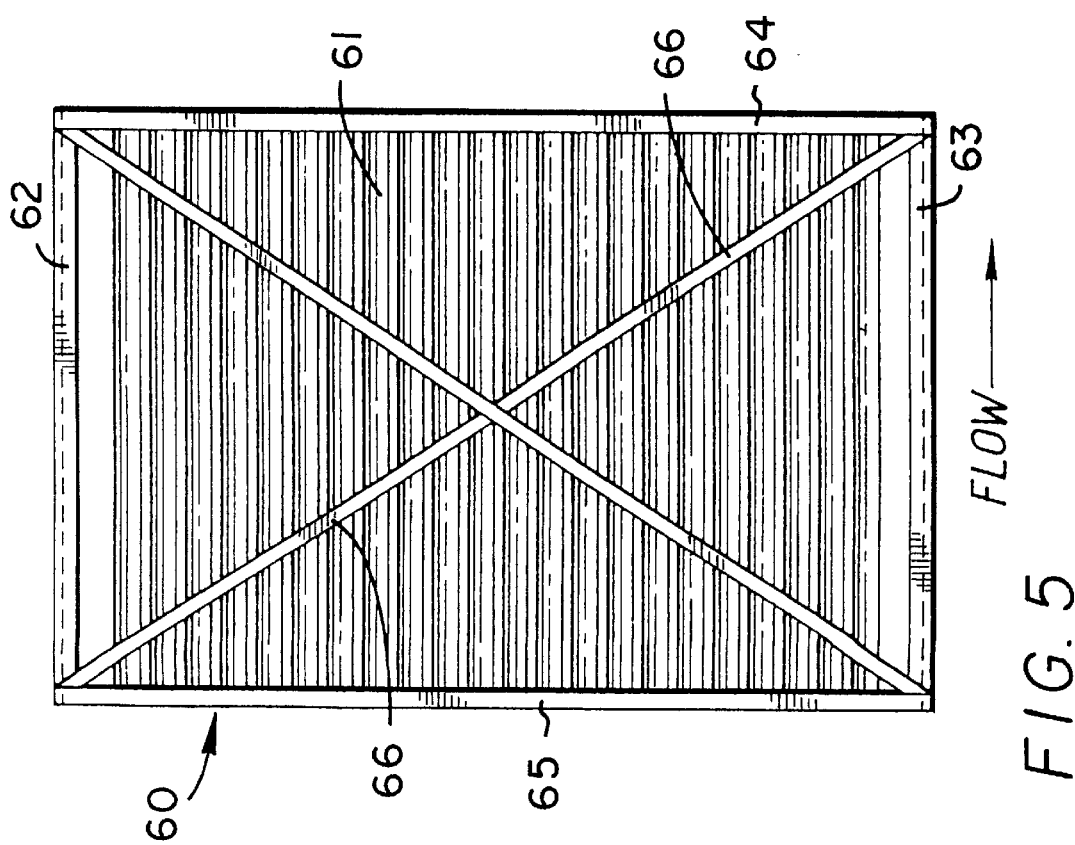
FIG. 5 is an bottom view of a screen according to the present invention.

FIG. 5 illustrates a screen 60 with screening material 61 between frame sides 62 and 63 with end strips 64 and 65 and diagonal cross strips 66. It is within the scope of this invention to use strips that are not full diagonals, but extend from any point on a first frame side to any point on a second frame side or strip which second frame side or strip is at a right angle to the first frame side.

Figure 6:
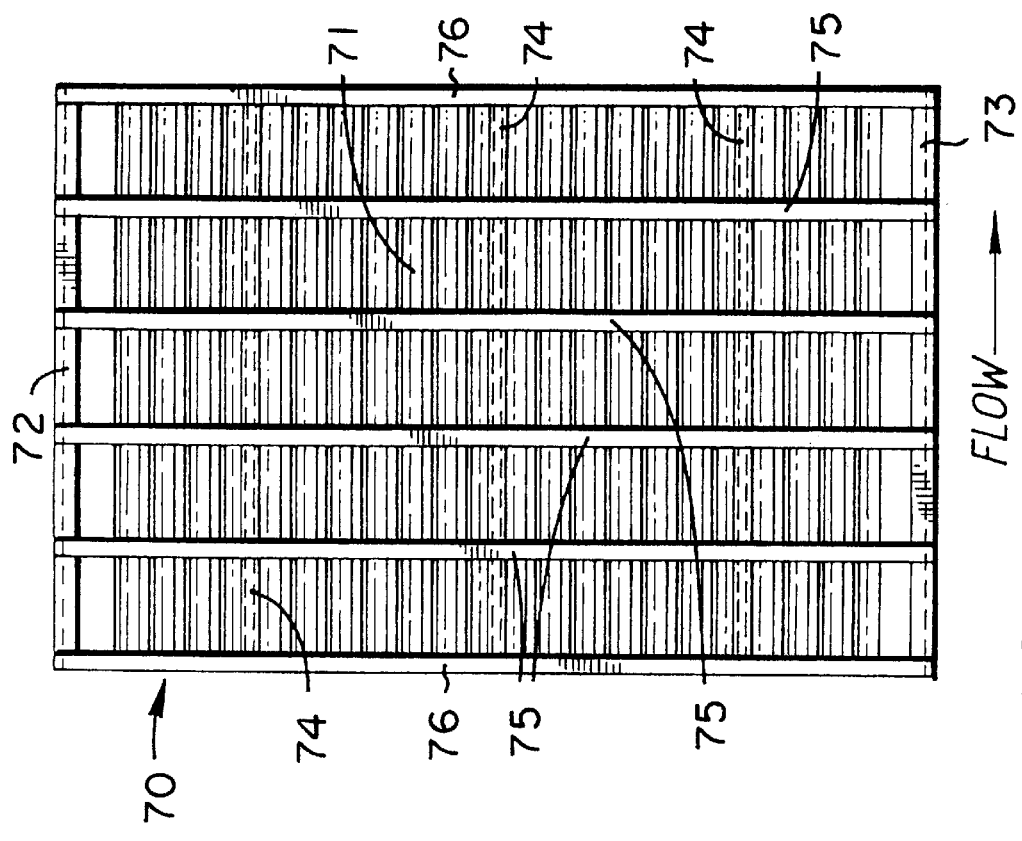
FIG. 6 is a bottom view of a screen according to the present invention.

FIG. 6 illustrates a screen 70 with screening material 71 between frame sides 72 and 73 with cross strips 74, cross strips 75 and end strips 76.

Figure 7B:
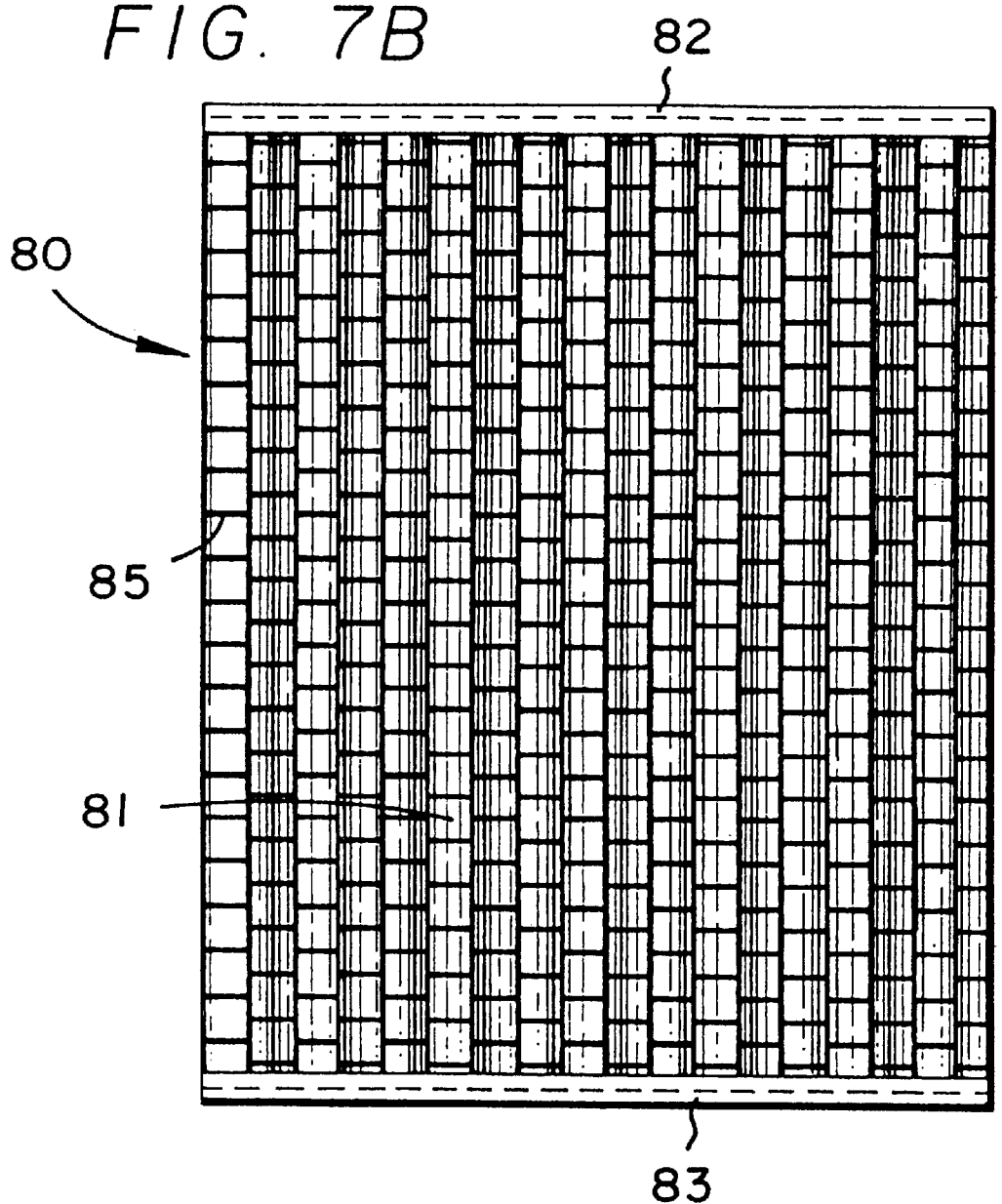
FIG. 7B is a bottom view of the screen of FIG. 7A.
Figure 7D:
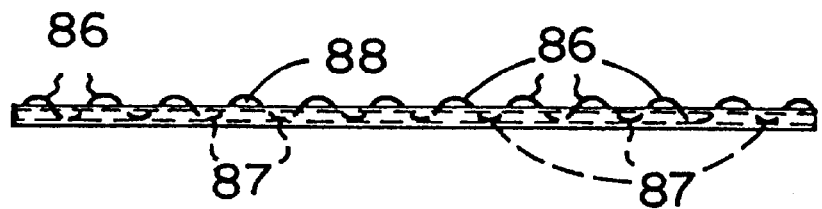
FIG. 7D is a side view of the screen of FIG. 7A.

FIG. 7A shows a screen 80 with frame sides 82 and 83 between which is secured screening material 81. The frame sides include hooks 84. A bottom support 85 is a rigid metal sheet with a plurality of openings therethrough. The screening material 81 is undulating with hilltops 86 and valleys 87. The screen 80 is emplaced in a shale shaker so that the direction of flow of drilling fluid across the screen (as shown by arrow labelled "FLOW") transverse to the general direction of the hills and valleys. A support strip or strips as disclosed herein may be used with this screen.

An opening 88 at the end of each undulating section of the screening material 81 may be closed off by initially applying an excess of screening material 81 so that a portion thereof extends beyond what will be the final outer boundary of the screening material. The excess portion is cut, folded back over the opening to close it off, and then secured in place with adhesive or welding.

FIG. 8A shows a bottom strip support assembly 90 for a screen according to the present invention. A plurality of strips 91 extend between and are secured to frame sides 92 and 93. As shown in FIG. 8B, a strip 91 is welded along a line 94 to a part of a screen hook 95. The weld is sized and configured to prevent leakage at the hook/strip interface. A sleeve 96 made of galvanized metal encases the hook for added strength and protection.

In certain embodiments of a screen as in FIG. 8A, the strips 91 are between one-thirty second and one-eighth inches thick and about forty-five and a half inches long; the frame sides 92, 93 are about thirty six inches long; the strips 91 are made from galvanized steel; the frame sides 92, 93 are made from 20 gauge galvanized steel; and the sleeve 96 is made from galvanized steel.

Figure 9:
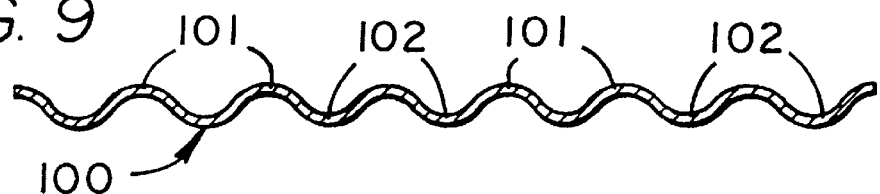
FIG. 9 is an end cross-sectional view of a strip for use in the present invention.

FIG. 9 illustrates a screen support strip 100 with hilltops 101 and valleys 102 for corresponding to similar hills and valleys in a screen or screening material to which the strip is applied.

Figure 10:
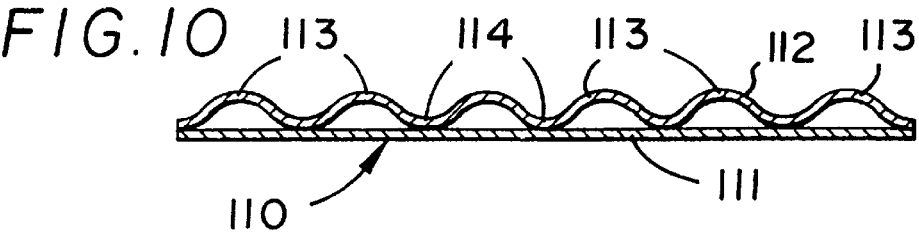
FIG. 10 is an end cross-sectional view of a strip for use in the present invention.

FIG. 10 illustrates a screen support strip 110 according to the present invention which has a bottom flat strip 111 and an undulating strip 112 fixed to the bottom flat strip 111. The undulating strip 112 has hilltops 113 and valleys 114 for corresponding to a screen or screening material with similar hills and valleys.

Figure 11:
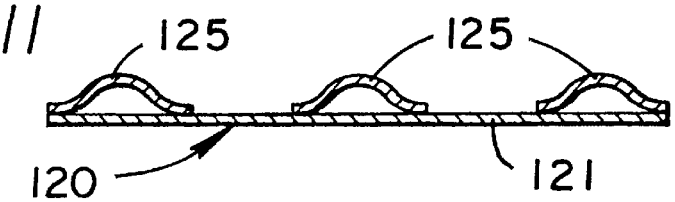
FIG. 11 is an end cross-sectional view of a strip for use in the present invention.

FIG. 11 illustrates a screen support strip 120 like the screen support strip 110, but with fewer projecting portions 125 so that when a screen with multiple troughs or indentations is supported by the strip 120, only every other trough or indentation in the screen (or screening material) will have a projecting portion 125 therein. It is within the scope of this invention to select any particular trough, plurality of troughs, or pattern of troughs or indentations to have a projection support portion therein. The screen support 120 has a lower strip 121 and the upper projecting portions 125, which may also be strips.

Figure 12:
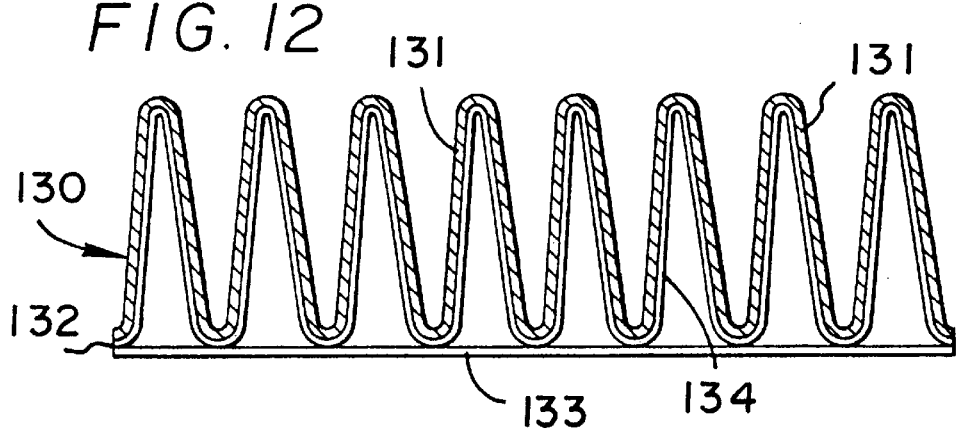
FIG. 12 is an end view of a screen according to the present invention.

FIG. 12 illustrates a screen 130 according to the present invention with screening material 131 (which may be any screen or screening material disclosed herein) supported by a support strip 132. The support strip 132 has a bottom strip 133 and an undulating strip 134 secured thereto. The screening material 131 may rest on the undulating strip 134 or some or all of the undulating strip 134 may be bonded to the screening material.

Figure 13:
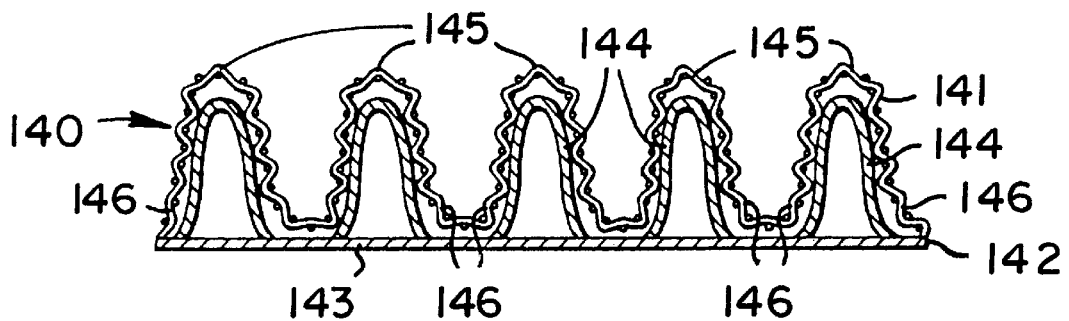
FIG. 13 is an end view of a screen according to the present invention.

FIG. 13 illustrates a screen 140 according to the present invention which has screening material 141 (which may be any screen or screening material disclosed herein) supported by a support strip 142. The support strip 142 has a lower strip 143 and projecting strip portions 144 secured to the lower strip 143. The projecting strip portions 144 project up into hills formed in the screening material 141. In any embodiment of this invention in which part of a support strip projects up into a raised part of a screen, the projecting strip may be connected to, adhesively bonded to, or welded to the screen at any selected point, line, points, or lines in the raised screen part. As shown in FIG. 13, the projecting strip portions are not bonded to, connected to or welded to the tops 145 of screening material 141; nor are they bonded to, welded to, or connected to lower portions 146 of the raised parts of the screening material 141. Alternatively the projecting strip portions 144 may be bonded to, connected to, or welded to only the tops 145 of the raised parts of the screening material; and/or to the lower portions 146.

Figure 14:
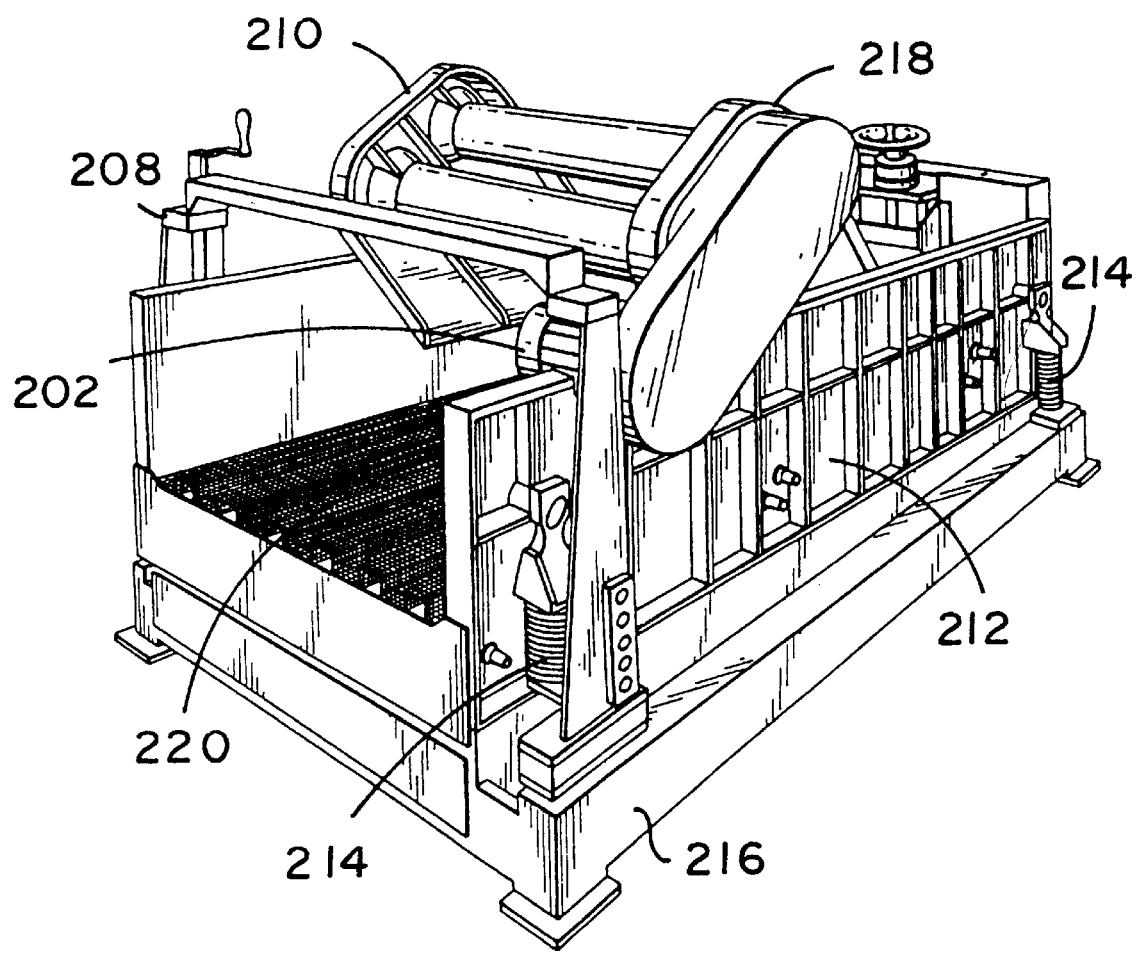
FIG. 14 is a perspective view of a shale shaker according to the present invention.

Referring now to FIG. 14, a shale shaker 210 according to the present invention has a screen 220 (with screen or screening cloth or mesh as desired) according to the present invention mounted on vibratable screen mounting apparatus or "basket" 212. The screen 220 may be any screen disclosed herein or have nay combination of any feature or features of any screen or screen part disclosed herein; and any such screen may be used with any appropriate shaker or screening apparatus. The basket 212 is mounted on springs 214 (only two shown; two as shown are on the opposite side) which are supported from a frame 216. The basket 212 is vibrated by a motor 202 and interconnected vibrating apparatus 218 which is mounted on the basket 212 for vibrating the basket and the screens. Elevator apparatus 208 provides for raising and lowering of the basket end. The screen 220 may be any screen disclosed herein.

Figures 15A, 15B:
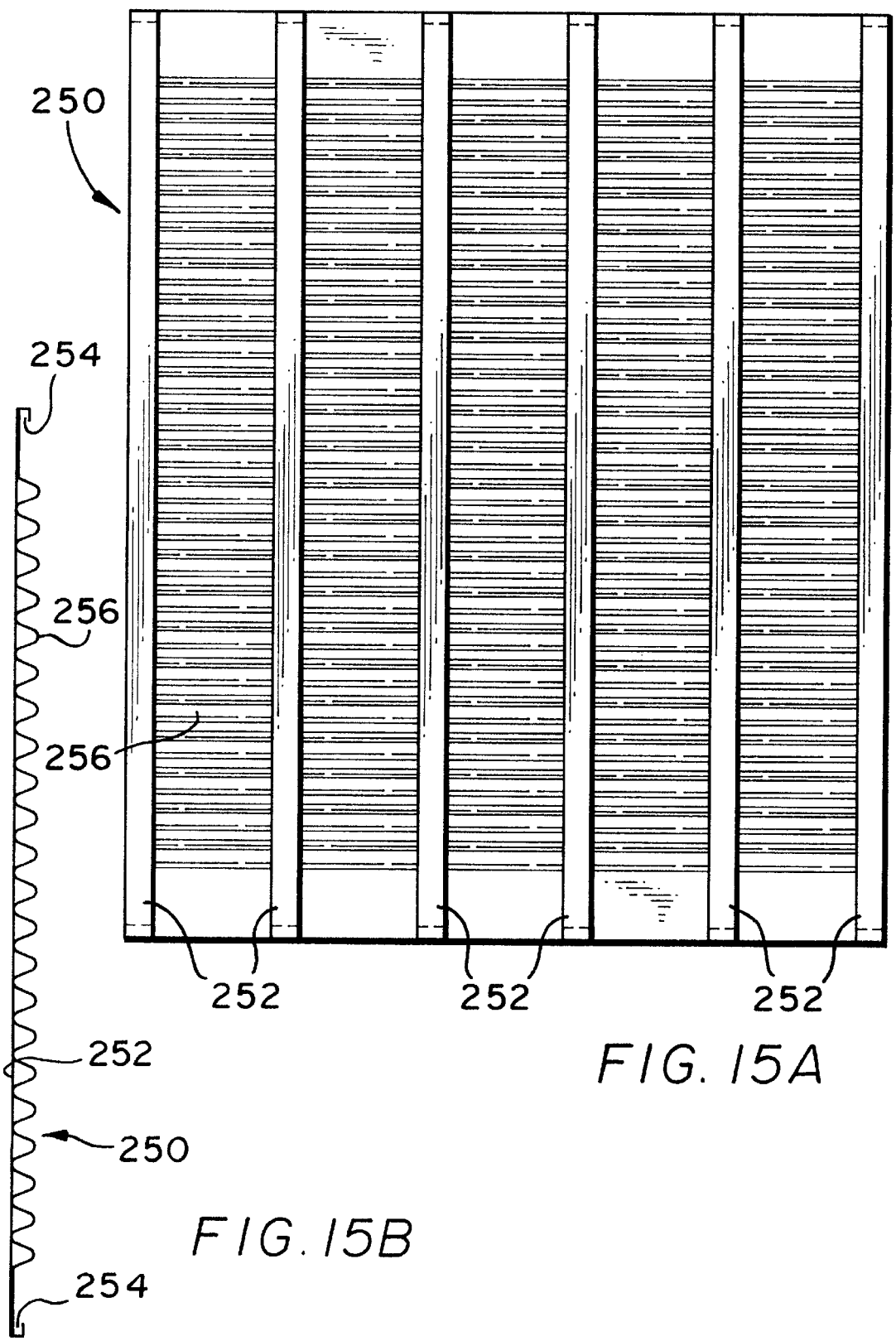
FIG. 15A is a bottom view of a screen according to the present invention.
FIG. 15B is a side view of the screen of FIG. 15A.

FIG. 15A shows a screen 250 like the screen in FIG. 1D, but without any frame sides. The screen 250 has a plurality of bottom support strips 252, each of which has two upper in-turned edges formed into a mounting hook 254. Undulating screening material 256 is bonded to the strips 252.

Figure 16A:
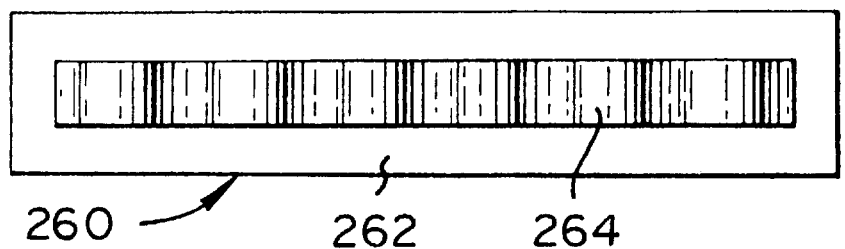
FIG. 16A is a top view of a support strip according to the present invention.
Figure 16B:
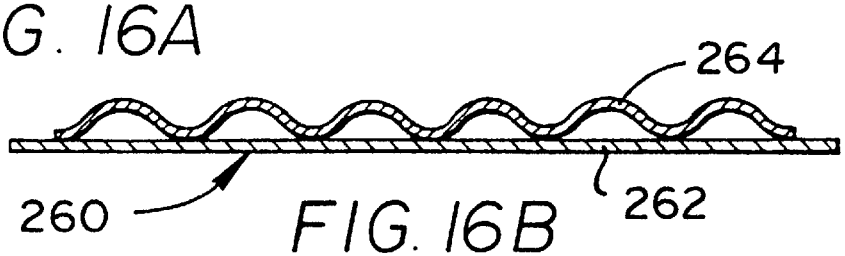
FIG. 16B is a side view of the support strip of FIG. 16A.

FIG. 16A shows a support strip 260 according to the present invention, with an upper projecting strip 264 secured to a lower strip 262. The upper projecting strip 264 is narrower in width than the lower strip 262. Any of the previously described strips with a projecting upper strip and a lower strip may have an upper strip that is narrower in width than the lower strip.

Figure 17A:
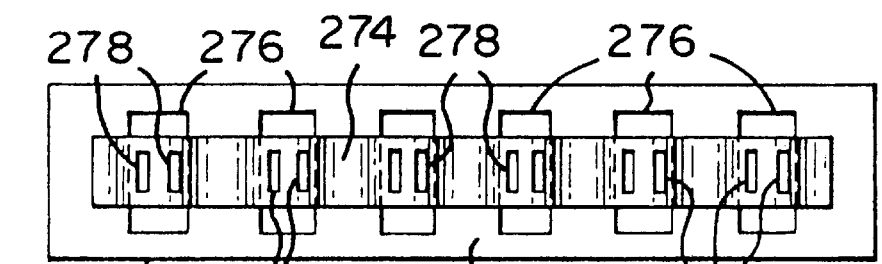
FIG. 17A is a top view of a support strip according to the present invention.
Figure 17B:
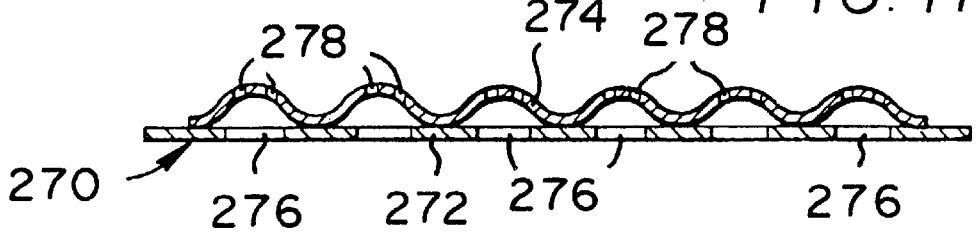
FIG. 17B is a side view of the support strip of FIG. 17A.

FIG. 17A discloses a support strip 270 with a lower strip 272 and an upper strip 274 secured to the lower strip 272. A series of openings 276 is provided through the lower strip 272 to facilitate fluid flow. A series of openings 278 is provided through the upper strip 274. Any strip or rod disclosed herein may have, in certain embodiments, holes therethrough to promote fluid flow. Any strip or rod disclosed herein with an upper projecting portion and a lower strip or rod may have holes in the upper strip or rod, the lower strip or rod, or both to promote fluid flow.

Figure 18:
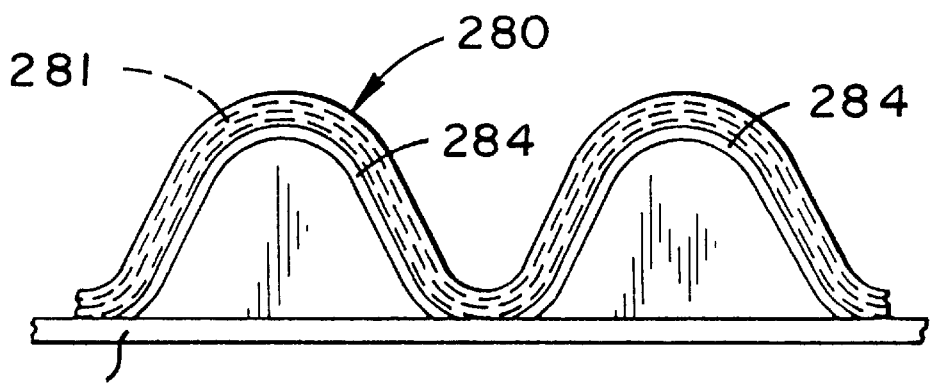
FIG. 18 is a side view of a screen according to the present invention.
Figure 24:
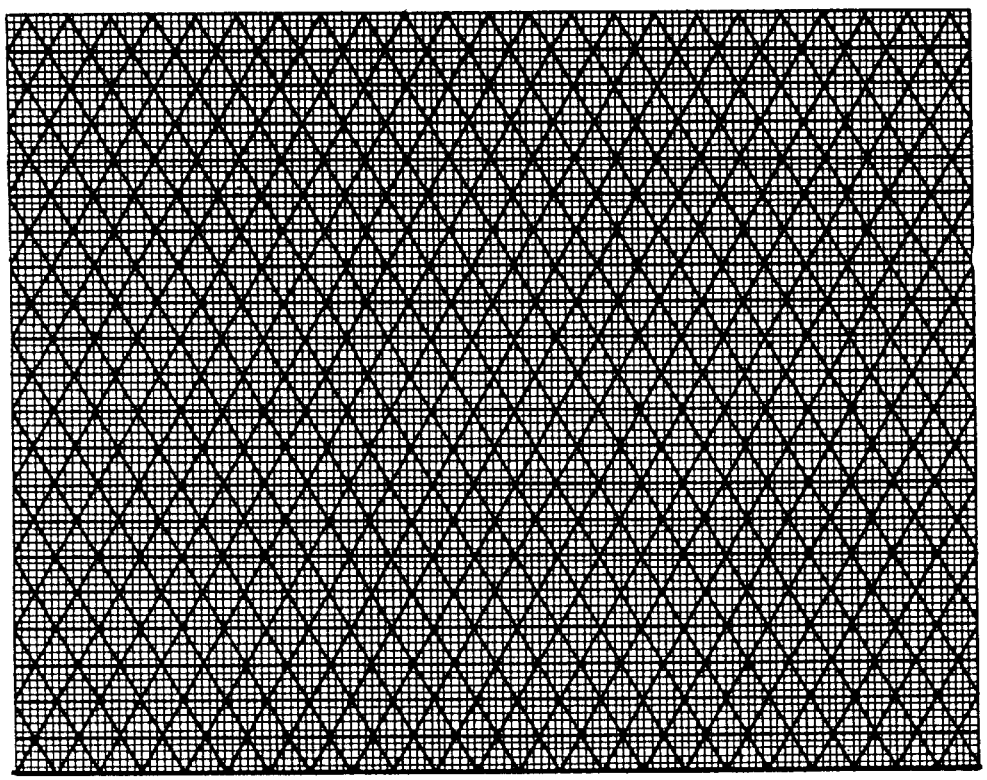
FIG. 24 is a top view of the screen of FIG. 19.
Figure 25:
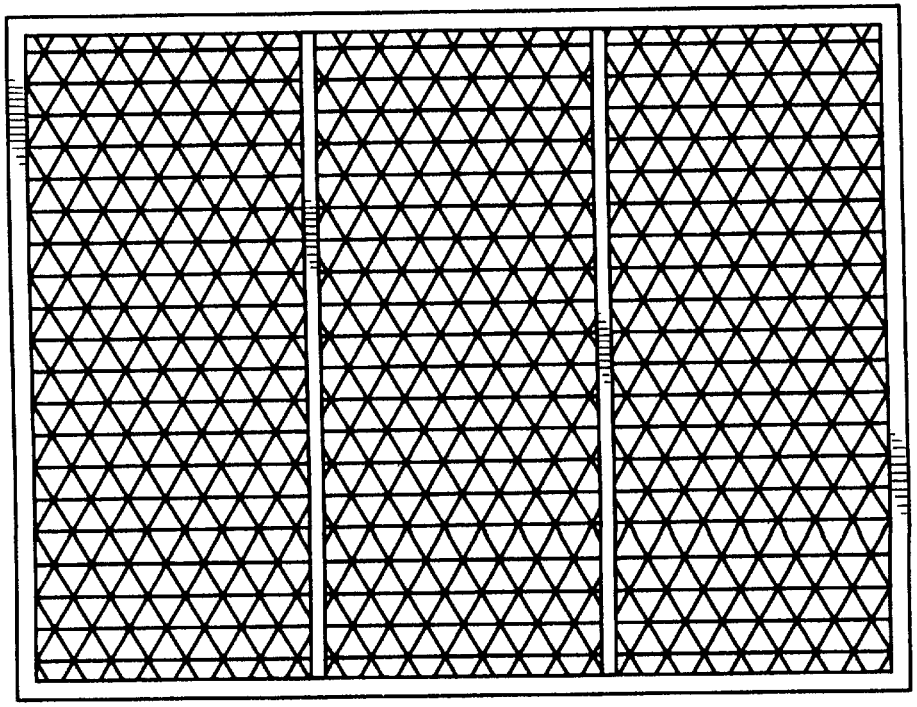
FIG. 25 is a bottom view of a screen according to the present invention.
Figure 26:
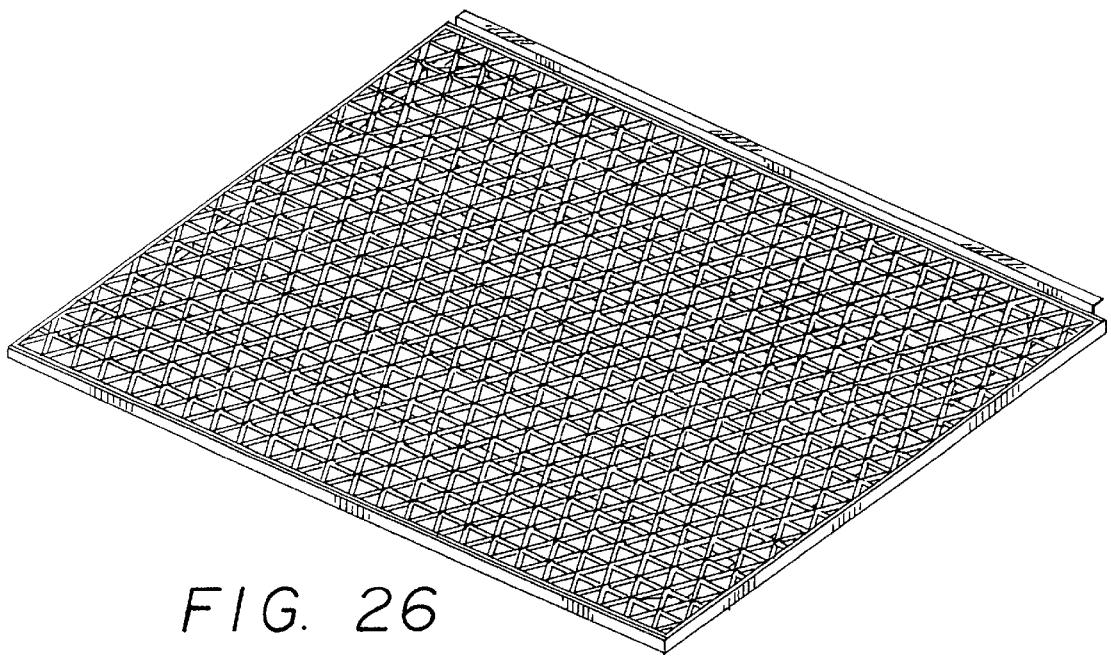
FIG. 26 is a perspective view of a screen according to the present invention.
Figure 27:
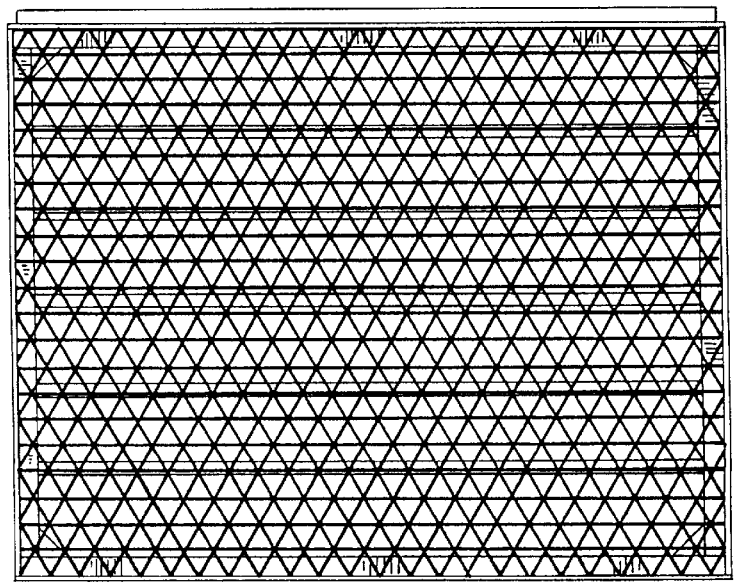
FIG. 27 is a top view of the screen of FIG. 26.
Figure 33:
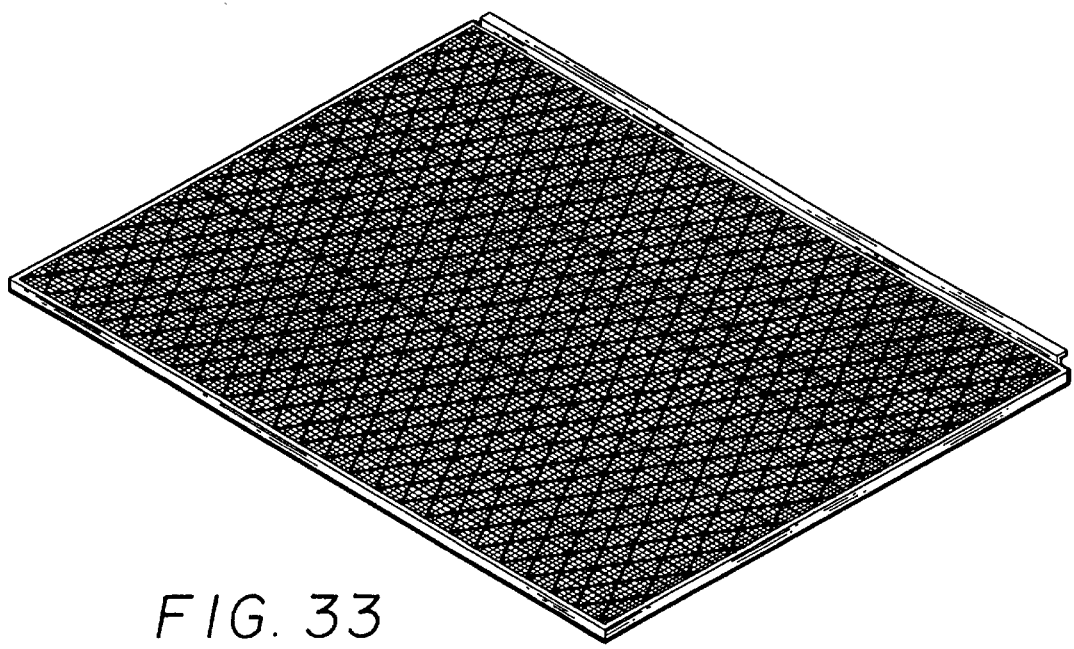
FIG. 33 is a perspective view of a screen according to the present invention.
Figure 34:
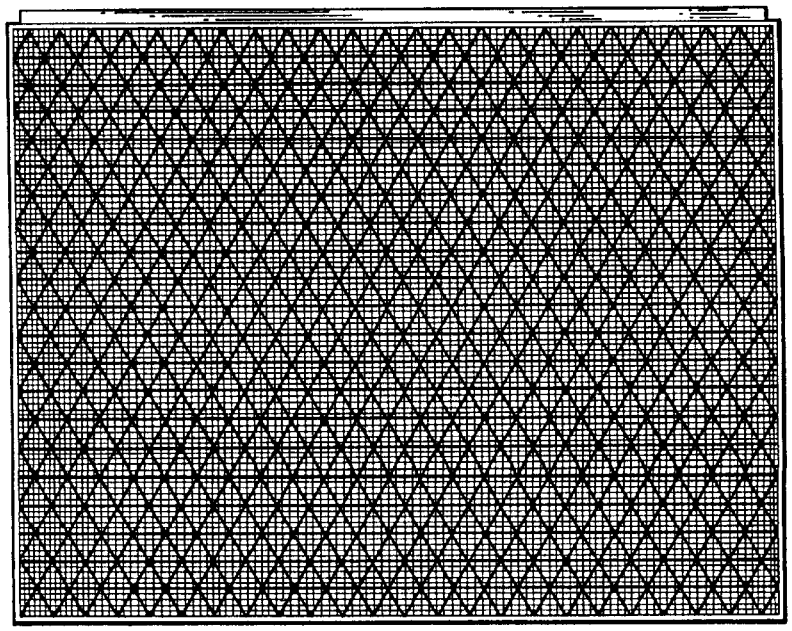
FIG. 34 is a top view of the screen of FIG. 33.

FIG. 18 discloses an improvement to screens with upper screening material and a lower rigid perforated metal sheet or apertured plate, including but not limited to improvements for screens as disclosed in U.S. Pat. Nos. 5,417,793; 5,417,858; and 5,417,859. A screen 280 with screening material 281 has a lower apertured plate 282 (as disclosed, e.g., in the three listed patents). Upper projecting strips 284 are secured to the lower apertured plate 282. The upper projecting strips 284 may or may not be bonded to the screening material 281 and may or may not have holes therethrough. The screening material may be bonded to itself, and/or to any apertured plate, strip, or rod. Any upper projecting rod, strip, combination of strips or rods, or pattern of strips or rods disclosed herein may be used with screens with a lower apertured plate, including but not limited to those disclosed in the three listed patents.

FIGS. 19–38 present various screen designs according to the present invention and various views thereof.

Figure 40:
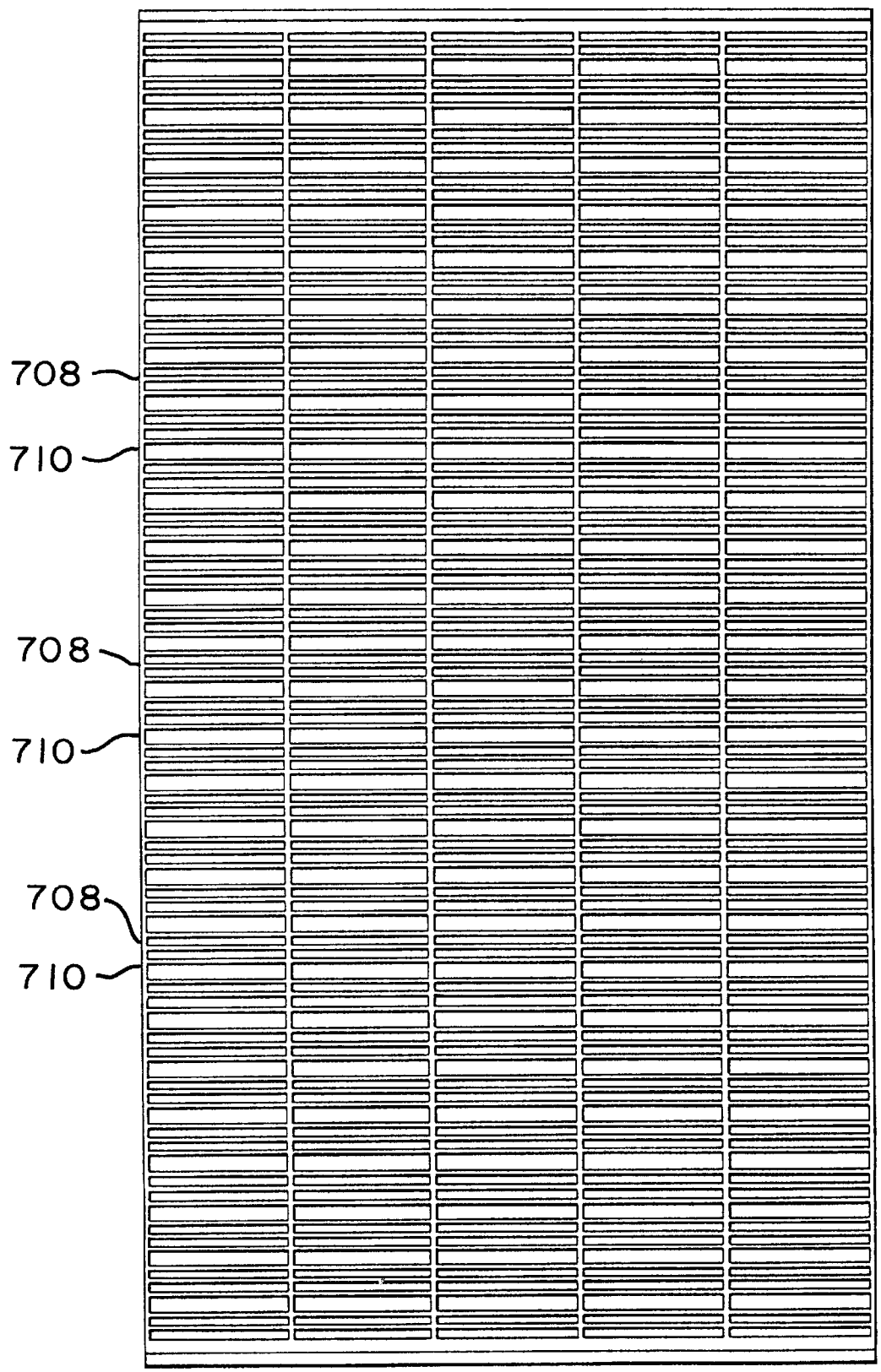
FIG. 40 is a plan view of the screen of FIG. 39.

In the following description, like numbers refer to like parts. Referring to FIGS. 39, 40, and 47 vibrating screen 700 includes a first layer 702 of wire mesh web and a second layer 704 of wire mesh web. Preferably, the first mesh layer is made from a web of bolting cloth grade wire mesh. The second mesh layer is a backing mesh. The first and the second mesh layers are supported on frame 706. The frame is formed to create a plurality of ridges 708 running the length of the screen 700, defining therebetween a plurality of channels 710. Channels run the length of the screen 700 from the back end of the screen to its front end 712. Attached to each side of the screen are hook straps 714. Each hook strap is bonded to the frame 708 and mesh layers 702. Steel straps 716 laterally tension the first and second mesh layers to maintain in the surface of the screen the channels and ridges.

The screen is secured to a shaker in a well known manner by hooking around the hookstraps and tightening rails disposed along the edges of the basket of a shaker (not shown). A series of stringers below the screen (not shown) cause the screen to bow as the rails pivot downwardly as they are tightened.

During operation, material containing solids to be separated is poured onto the back of the screen. Solids tend to collect in the channels and move toward the front end of the screen when the screen is vibrated. Fluid and particles smaller than the openings in the layer of mesh flow through the mesh along the sides of ridges 708 and the bottoms of channels 710.

Figure 41:
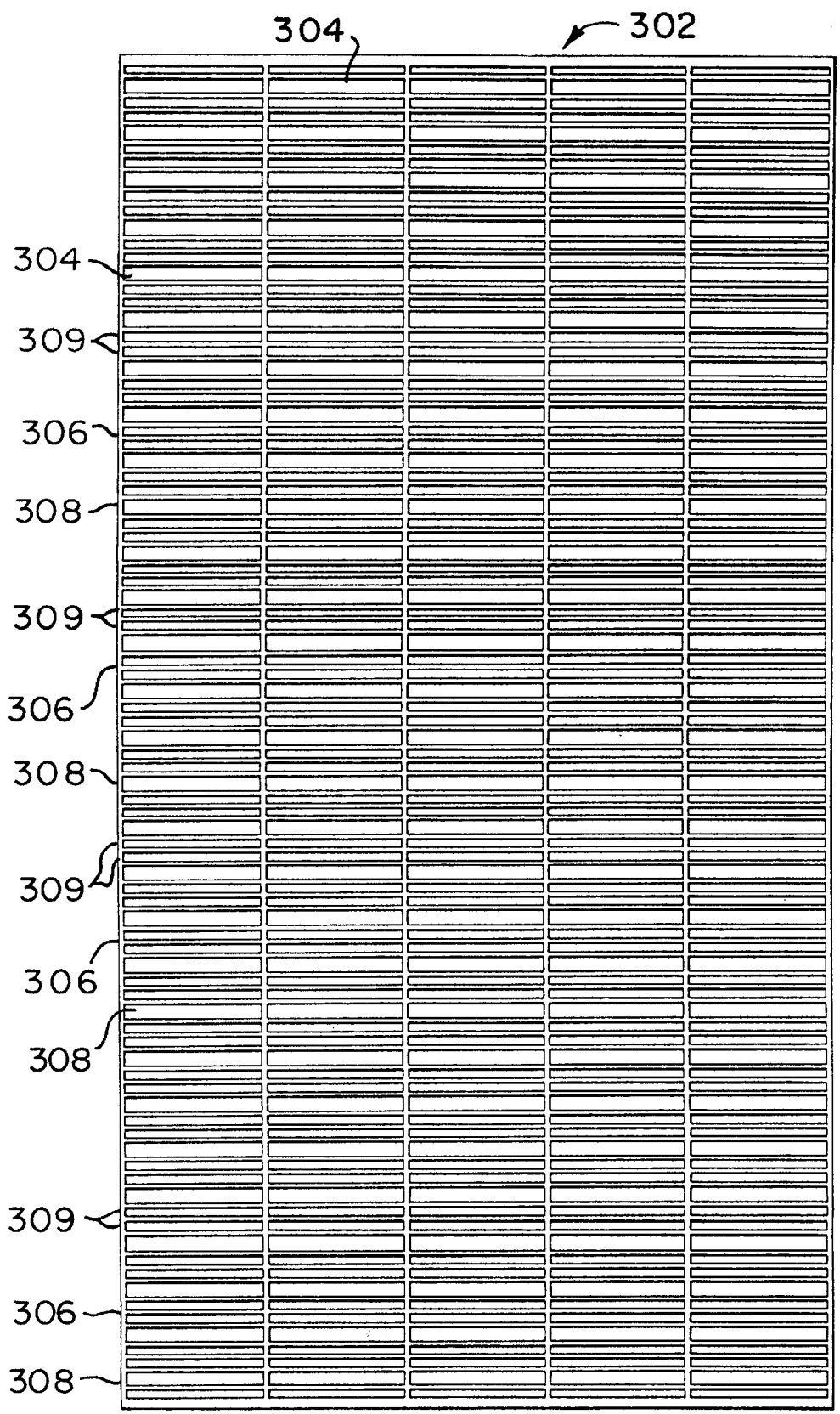
FIG. 41 is a plan view of an alternate embodiment of a screen according to the present invention.
Figure 42:
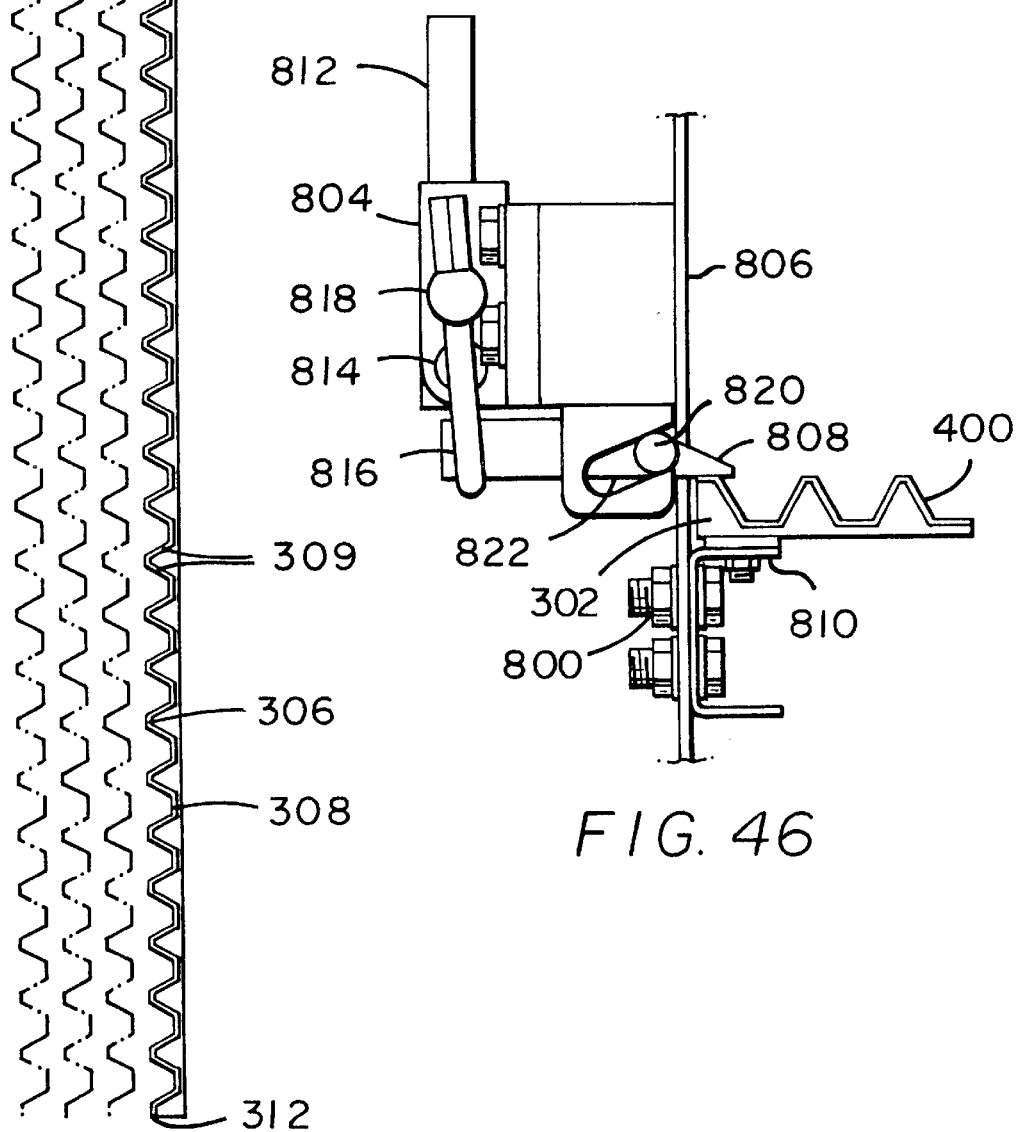
FIG. 42 is an end view of the screen of FIG. 41.

Referring now to FIGS. 41 and 42, in an alternate embodiment of screen 100, a first layer of wire mesh 402, a second layer of wire mesh 404 and a third layer of wire mesh 405 (the wire meshes are shown only in FIG. 42 exploded away from panel 302) are bonded to panel 302 to form screen 400. The first and second layers are a bolting cloth grade wire mesh. The third layer 405 is a mill grade or market grade wire mesh supporting the first and second layers. The panel is formed from a sheet of metal by punching or cutting an array of elongated, rectangular openings 304 into the sheet of metal according to a predetermined pattern. The openings have uniform size and shape. The sheet is then bent with a press or rolled into a corrugated configuration substantially as shown in FIG. 42. The corrugated configuration is comprised of alternating series of triangular shaped ridges 306 and flat bottom channels 308. Each triangular ridge 308 has two substantially flat side surfaces separated by a narrow peak 309.

Along each end of the panel is bonded a frame 310. Frame 310 is contoured to fit and provide support for the ridges 306. The screen is formed so that its side edges run along the peak of a ridge 306. Terminating the sides of the screen along a ridge helps to prevent material from falling between the screen and the inside wall of a shaker basket (not shown) over which the screen is placed.

Although other ridge geometries having flat surfaces may be used, the triangular configuration of the ridges and the flat bottom of the channels tend to maximize effective flat surface area for placement of the openings 304. Each opening 304 is located on a flat surface of either a side of a ridge or a bottom surface of a channel. The rectangular shape of the openings allow as much of the flat surface to be cut with openings allow as much of the flat surface to be cut with openings as is possible while leaving enough solid area to remain to form a grid or lattice-like structure that will retain its shape and not break during normal use.

Once the panel is formed, the first layer 402, the second layer 404 and third layer 405 of wire mesh are heated and then bonded to the panel. The heating expands the wire mesh. After the wire mesh is bonded to the panel, it cools and contracts, thus tensioning the wire mesh. Tensioning helps to maintain uniformity of the wire mesh and to keep the first and second layers of wire mesh together during operation, thus giving the screen a finer cutting point. Tensioning the wire mesh also assists in conveying particles to the end of the screen. A slack screen will not convey particles as well, especially when heavily loaded.

Figure 43:
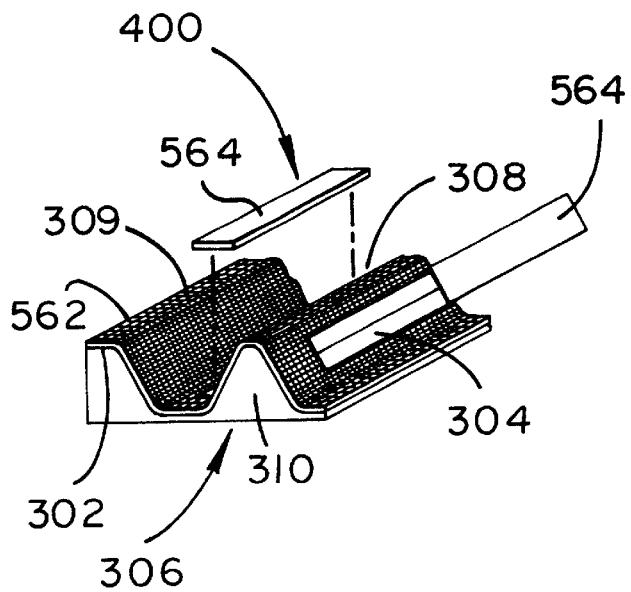
FIG. 43 is a perspective view of a portion of a screen like that of FIGS. 41 and 42.

Referring now to FIG. 43, a perspective view of a portion of a screen 400 shows a layer of wire mesh 562, which includes wire mesh webs 402, 404 and 405 (FIG. 42) bonded to panel 302. Should a tear develop in wire mesh layer 562, the wire mesh surrounding the tear is cut from around the opening 304 in which the tear occurs. A plug 564 is then inserted into the opening in the screen to seal the screen.

Figure 44:
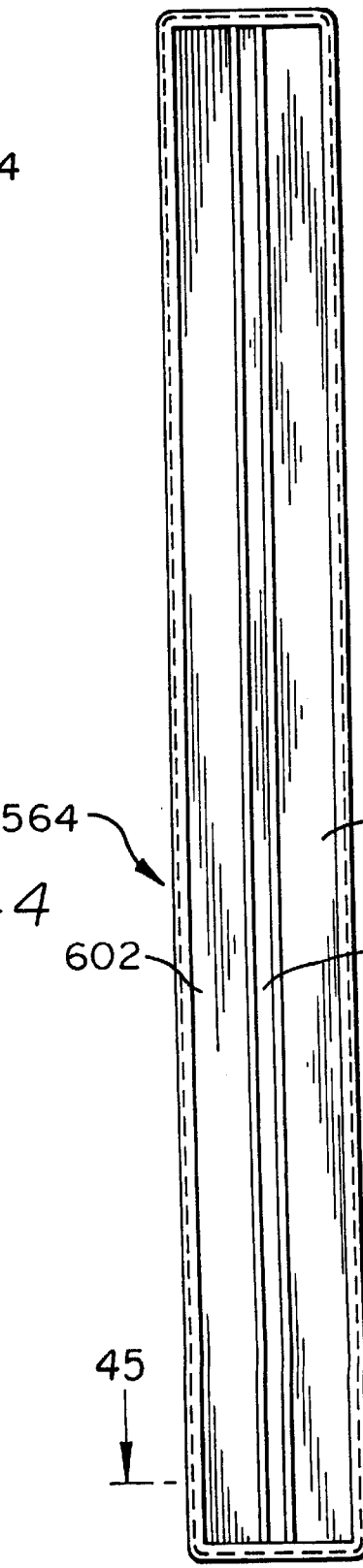
FIG. 44 is a top plan view of a plug for repairing the screen of FIG. 43.
Figure 45:
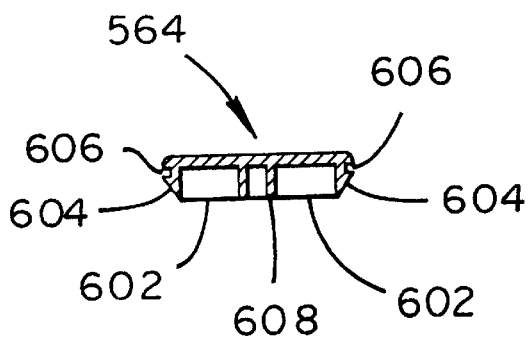
FIG. 45 is a cross-section of the plug of FIG. 44, taken a long section line 45—45.

Referring now to FIGS. 44 and 45, plug 564 is made of an elastic rubber or similar elastomeric material. Its width and length are very slightly larger than one of the openings 304. It has a flat top section surrounded on all sides by a skirt-like side edge 602. The side edge is adapted for enabling the plug to be manually inserted into one of the openings 304 and to seal securely against the side of the opening. The side edges have an outwardly tapering bottom section 604 and a channel 606. The tapering bottom section is sufficiently flexible enough to deflect inwardly under force of the edges of the opening when the plug is pushed into the opening. Deflection of the bottom of the sides pulls inwardly a lower edge of channel 606, thereby providing sufficient clearance to push the plug further down into an opening 304 to the point the upper edge of the channel engages the upper edge of the opening. The width of channel 606 is slightly larger than the thickness of the edge of an opening 304 (which includes the thickness of the panel and two layers of wire mesh). Therefore, the bottom tapering section 604 springs back, locking the plug into place and sealing it against the edges of the opening. Support ribs 608 provide lateral strength to the plug so that it does not deflect downward when loaded during operation, in a manner that would pull the top edge of the channel away from the edge of the opening and allow the load to force the plug through the bottom of the opening.

Referring to FIG. 46, the screen 400 is secured to a basket of a shaker (not shown) using cam latch 604. Latch 804 is secured to side wall 806 of the basket 802. A latching end of latching bar 808 extends through an opening in the wall to engage the top of screen and to force the screen against bracket 810. Handle 812 pivots about pin 814. U-bolt 816 is connected to rod 818. Rod 818 extends through handle 812. The other end of the U-bolt (not seen) is connected in a similar fashion to the other end of the rod so that the U-bolt is permitted to swing about rod 818 under the handle 812. When handle 812 is pivoted upwardly, the saddle of the U-bolt lifts up on latching bar 808, causing the latching bar to pivot about pin 820 and press against the screen. Pulling down on handle 812 lowers the saddle of U-bolt 816, permitting the latching bar to pivot counter-clockwise and release the screen. To assist in quickly replacing the screen, slot 822 allows pin 820 to be moved back and thus allows the latching member 808 to be pulled behind the side of the basket.

Figure 48:
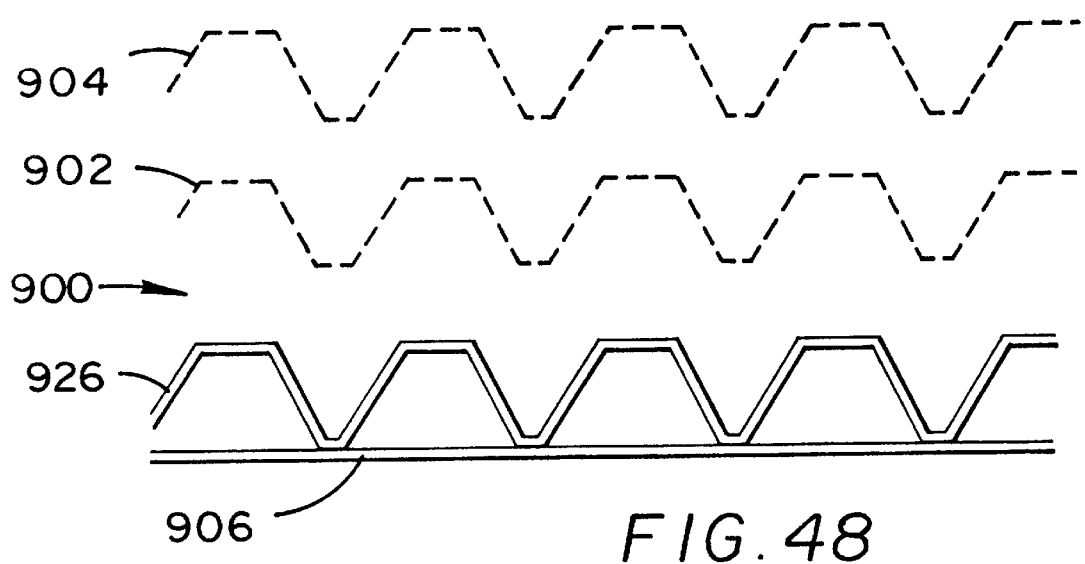
FIGS. 48 and 49 are end views of screens.

FIG. 48 shows a screen 900 like the screen 700 (FIGS. 39, 40) with a similar length and width (see FIG. 40), but with a somewhat different screen shape as viewed from the end (e.g. as in FIG. 39). The screen 900 has a first layer of wire mesh 902 and a second layer of wire mesh web 904 (shown apart from the frame prior to final assembly after which the meshes are on the frame. It is within the scope of this invention to use only one screening layer for any screen described herein or to use three or more layers. A frame 906 (like the frame of the screen 700) supports the mesh and/or screening layers. In one aspect the layers shown for the screen rest one on top of the other and in another aspect one or more or all of the layers are bonded together and in another aspect they are bonded to the frame across their entire surfaces or only around the periphery thereof. The frame 906 is configured and shaped to correspond to the corrugated shape or undulating shape of the layer(s) above it; alternatively the layer(s) may be made to correspond to the shape of the frame (as viewed on end as in FIG. 39). Ridges 908 have relatively elongated flat tops as compared to the length of the flat tops of the ridges of the screen 700 and flat valleys 912 of the frame 906 are relatively short as compared to the valleys of the screen 700. It is within the scope of this invention for the ridges and valleys to have any desired width or shape.

Figure 2B:
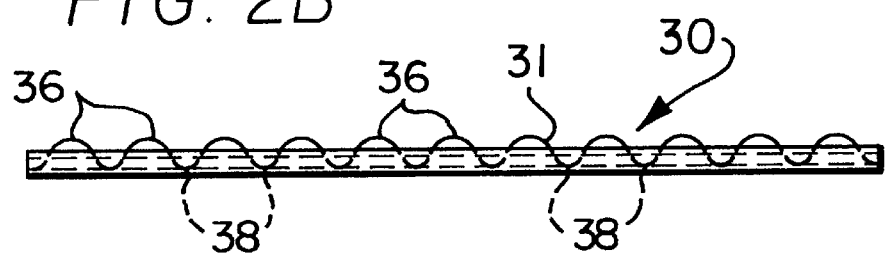
FIG. 2B is a side view of the screen of FIG. 2A.
Figure 49:
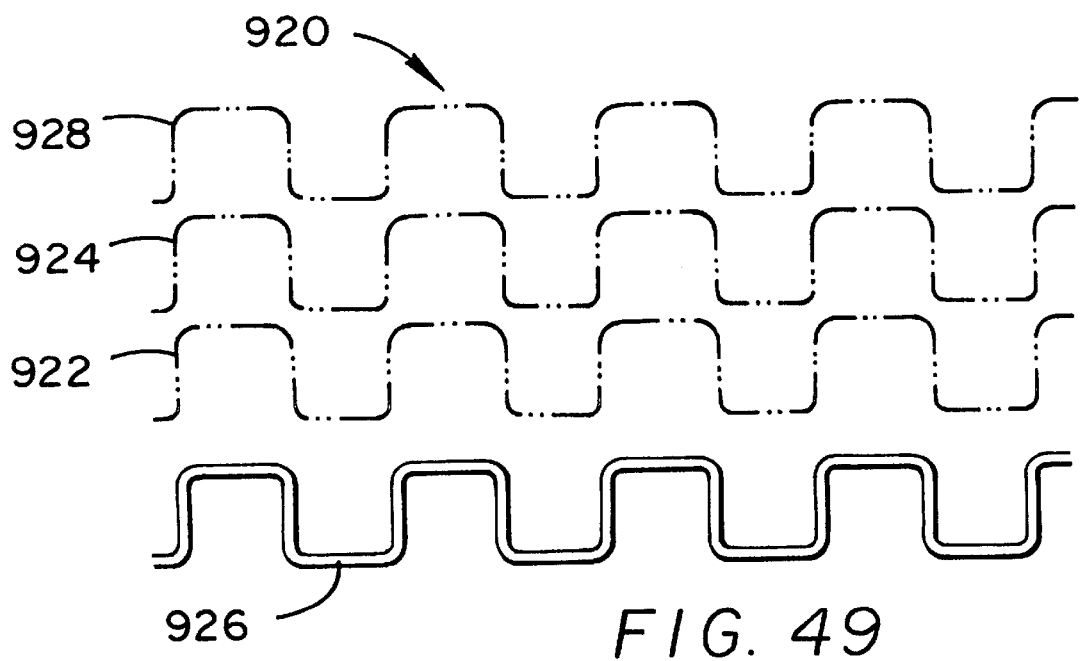

FIG. 49 shows a screen 920 like the screens 700 (FIGS. 39, 40) and 900 with a similar length and width (see FIG. 2), but with a somewhat different screen shape as viewed from the end. The screen 920 has a first layer of wire mesh 922, a second layer of wire mesh web 924 and a third layer of mesh or screening 928 (which are on the frame following final fabrication). A frame 926 (like the frame of the screen 900) supports the mesh and/or screening layers. In one aspect the layers shown for the screen rest one on top of the other and in another aspect one or more or all of the layers are bonded together and in another aspect they are bonded to the frame across their entire surfaces or only around the periphery thereof. The screens 900 and 920 may be used with or without straps (e.g. as the straps 714 and 716, FIG. 47). Individual cells of the screens 900 and 920 may be shaped as the individual cells of the screens of FIGS. 40 and 41 or they may be any desired shape, including but not limited to, oval, square, trapezoidal, or triangular (acute, obtuse, isosceles, congruent). The cells of the screens 900 and 920 are repairable as are cells of the previously-described screens.

Figure 50:
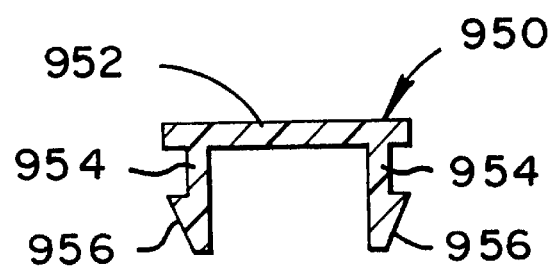
FIG. 50 is an end view of a plug according to this invention.

FIG. 50 shows a plug 950 for plugging off a cell of a screen according to the present invention. The plug 950 has a body member 952 and ears 956 which project from legs 954 depending from the body member 952. The plug 950 is made from a resilient material so the legs 954 are bendable to permit the ears 956 to enter a cell to be repaired and then expand outwardly so the ears catch and hold on an edge of the cell.

It is within the scope of this invention to have a plug held in a cell by friction fit, any "snap fit" structure, welding or adhesive. A plug according may be any desired shape to fit in and mate with the shape of a cell. The plug may be solid or it may be solid with openings, holes or perforations therethrough. In one aspect in which a cell is not initially behind a torn screen area a cell or cells is placed at the torn area on one side of the screen and a plug is inserted into the cell from the other side of the screen to repair a torn area.

FIG. 51A shows a screen frame 500 according to the present invention with a plurality of spaced-apart strips 502 (made of any suitable metal or metal-like material) secured to and between spaced-apart sides 504. Each end 506 of each strip 502 is received and held in a recess 524 in a side 504. The recess 524 corresponds in shape to the shape of the end 506 and a shoulder 526 of each strip 502 abuts a side 504. The end 506 may be inserted into the recess 524 from the side (to the left in FIG. 51B) or from above or below. The top and bottom strips 502 (as viewed in FIG. 51A) each has two humps or ridges 553 (see FIG. 51C) which are located, sized, and configured to be received in corresponding corrugations of a corrugated plate and/or corrugated screen assembly. It is within the scope of this invention for each strip to have one, two, or a plurality of multiple humps or ridges. In one aspect there is one hump or ridge for each corrugation on a superimposed plate and/or screen assembly.

FIG. 52 (prior art) shows a strip interlocking structure which includes a bulb 505 at each end of a strip 503 (disposed in a frame as are the strips 502). The bulb 505 is in a recess 525 in a side 501 (like the sides 504). The bulb 505 is lifted out from the recess 525 for removal or inserted into it from below or above for installation. A frame with such strips is prior art.

FIG. 53 (prior art) shows a strip interlocking structure which includes a bulb 509 at each end of a strip 508 (disposed in a frame as are the strips 502). The bulb 509 is in a recess 530 in a side 507 (like the sides 504). The bulb 509 is lifted out from the recess 530 for removal or inserted into it from below or above for installation. An enlarged end 531 resides removably in a recess 532 and prevents the strip 508 from inadvertently moving out from the recess 530 to the side (to the left in FIG. 53). A frame with such strips is prior art.

FIG. 54 shows a pattern of triangular openings for a perforated plate 510 (made of metal or metal-like material) (shown partially) according to the present invention usable with any embodiment disclosed herein of a perforated plate or that employs a perforated plate. The openings 511 are positioned side-by-side in an array that extends across substantially all of a plate. The plate may be corrugated or flat or a combination thereof with alternating flat and corrugated portions.

FIG. 55 shows a typical pattern of triangular openings for a perforated plate 510 according to the present invention usable with any embodiment disclosed here of a perforated plate or that employs a perforated plate. Openings 513 are positioned side-by-side in an array that extends across substantially all of a plate. Openings 514 and 515 are spaced apart from each other slightly more than the middle openings of the plate 510 producing, in certain embodiments, stronger central plate portions 550. The plate may be corrugated or flat or a combination thereof with alternating flat and corrugated portions.

In the pattern of openings as in FIG. 55, the pattern is shifted slightly as compared to that of the plate 510 to optimize use of a screening surface. For example, a screen using the pattern in FIG. 54 and a web width (distance between two adjacent openings) of 0.125", has a border of ¾" on each edge. By shifting the triangle openings to the pattern of FIG. 55, a web width of 0.125" may be maintained while decreasing the border. This allows more openings in the screen of FIG. 55 as compared to that of FIG. 54, increasing surface area and improving appearance.

In the pattern of FIG. 54, the openings are arranged in rows with bases and peaks alternating. The peak of one opening is even with the base of the next. In the pattern of FIG. 55 the openings 513 are moved closer together and the peaks of the openings 513 are not even with the base of the opening 514 or 515.

FIGS. 56 and 57 show a screen 530 according to the present invention with a corrugated support plate 540 (preferably made of metal) having a plurality of triangular openings 538 (not shown in FIG. 56; see FIG. 57) thereacross the surface of and therethrough; optional upturned edges 534 and 537 for anchoring the screen 530 to a vibratory shaker; wire mesh or meshes 539 secured to the plate 540; and plugs 536 at both ends (like previously described plugs) to plug ridge openings 532 at each end of the corrugations of the plate 540. The plate 540 rests on and is secured to a strip or strips 551 (alternately a frame of multiple strips criss-crossing the plate 540 or a series all in the same direction, or a perforated plate may be used). In one aspect the strip(s) 551 are deleted. The strips 551 may be made of any suitable material, including, but not limited to, metal, plastic, fiberglass, rubber, or cermet.

A screen according to the present invention (e.g. as those of FIGS. 51A–57) may be made without a plastic grid located between a lower plate and screen(s) or mesh(es) above the plastic grid.

When screening material is bonded to a corrugated perforated plate (e.g. as in FIG. 57), thermal expansion puts the screening material in tension. Such a result is not produced when a plastic grid process is used. A metal corrugated perforated plate withstands tension induced thereon by screening material applied and/or bonded thereto. In one aspect the plate is first covered with adhesive (e.g. powdered epoxy) then the mesh(es) and/or screen(s) are placed on the plate. Upon curing of the epoxy, adhesive 541 covers or envelops part of the mesh/screen at the solid areas of the plate.

FIGS. 58–62 present a variety of configurations for corrugated perforated plates according to the present invention and/or for strips according to the present invention.

Figure 58:
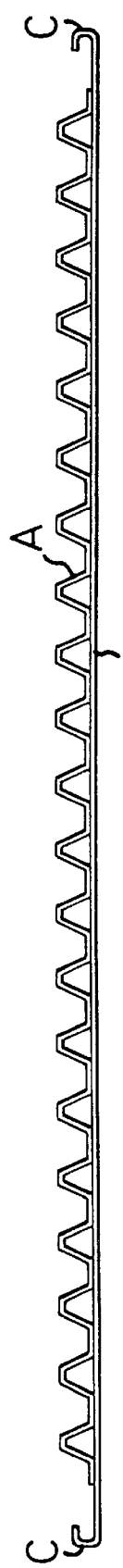
FIGS. 58–62 present end views of corrugated perforated plates according to the present invention which structure may also be used for strips according to the present invention.

FIG. 58 shows a corrugated plate A on a support strip B having optional mounting hooks C.

Figure 59:
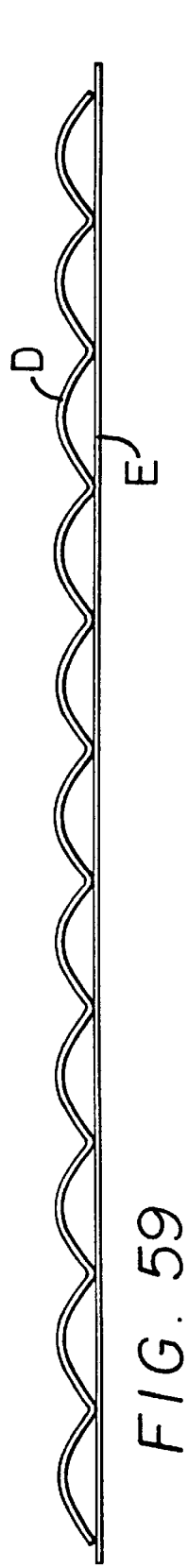

FIG. 59 shows a corrugated plate D on a support strip E. Optionally, mounting hooks may be used with such an assembly.

Figure 60:

FIG. 60 shows a support strip F. A corrugated perforated plate may have such a configuration and mounting hooks may be used with the strips or with the plate.

Figure 61:

FIG. 61 shows a support strip G. A corrugated perforated plate may have such a configuration and mounting hooks may be used with the strips or with the plate.

Figure 62:
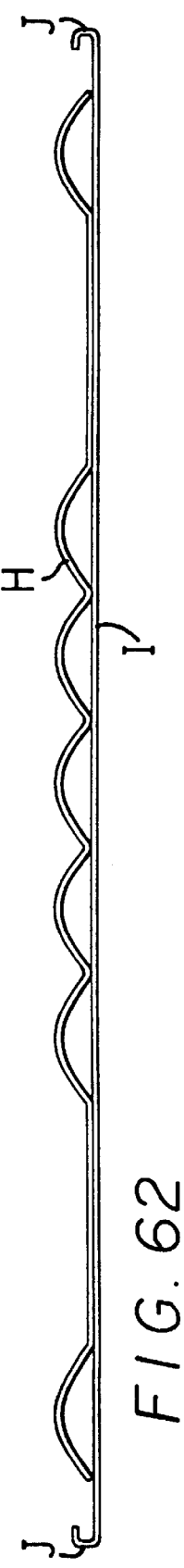

FIG. 62 shows a corrugated plate H on a support strip I having optional mounting hooks J.

Any mesh, meshes, screen, screens, screening material(s) or any combination thereof or any such as described herein may be used with any of the items shown in FIGS. 58–62.

Figure 63A:
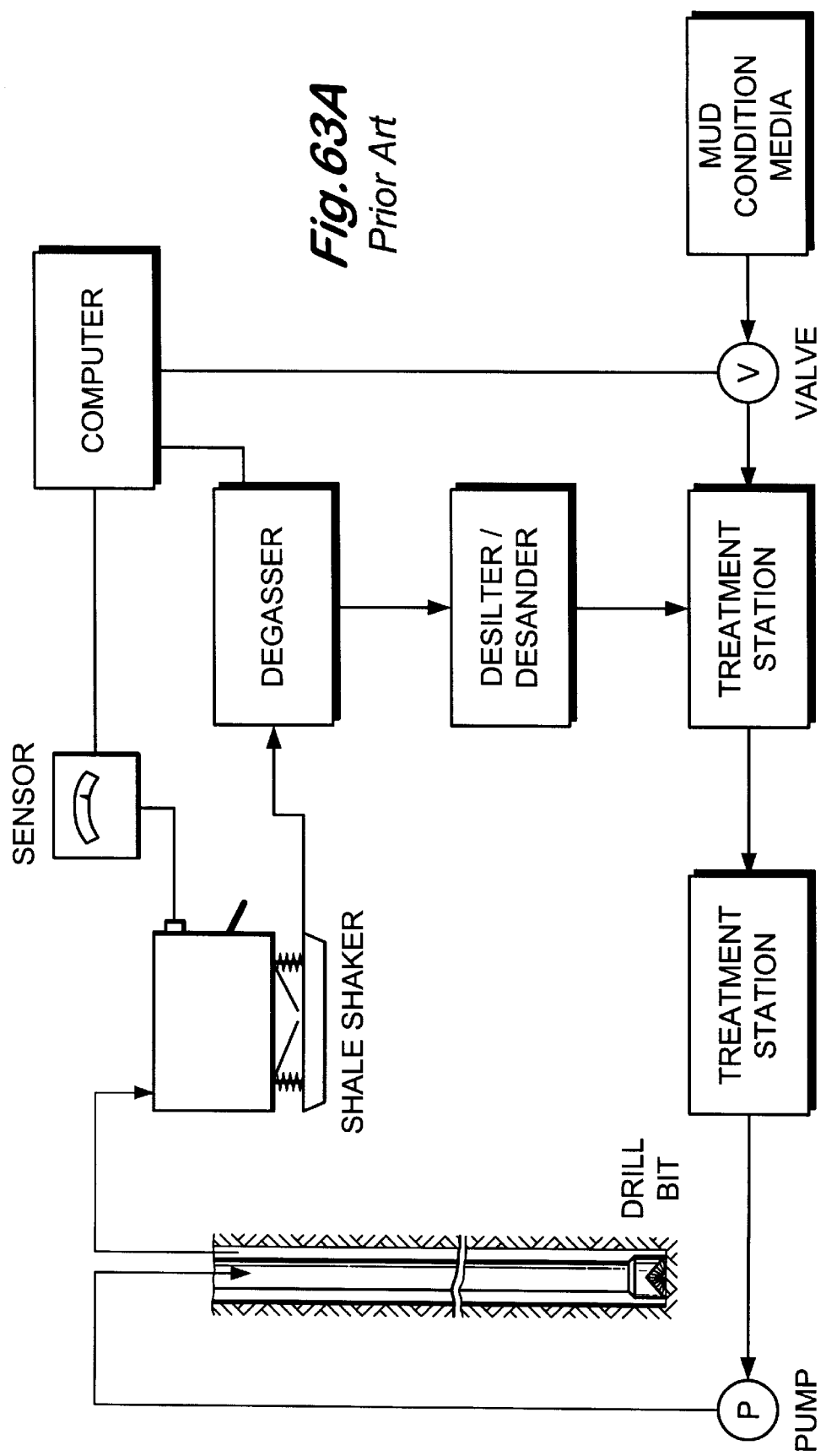
FIG. 63A is a schematic view of a prior art system.

FIG. 63A discloses one example of a typical prior art shaker system (e.g. as shown in U.S. Pat. No. 5,190,645). FIG. 63B shows a system 1200 according to the present invention with parts like those of the system of FIG. 63A; but with a shale shaker K having a screen or screens S according to the present invention (any screen or screens disclosed herein, including, but not limited to, those in FIGS. 65A–65H). The screen(s) S are mounted in a typical shaker basket B and one or more vibrators V (any known suitable shaker vibrator) vibrate the basket B and hence the screen(s) S.

FIGS. 64A–64D show a screen panel 1150 according to the present invention with two opposed spaced-apart sides 1151 and 1152 spaced apart by two opposed sides 1153, 1154 and by a plurality of strips 1155. Each pair of spaced-apart strips, with portions of the sides 1151, 1152 define an open space 1156 through the panel 1150. At each side 1153, 1154, a strip 1155 and a portion of the side 1153 and side 1154 define an open space 1157 through the panel 1150.

In one aspect the panel 1150 (and/or strips and/or sides) is made of any suitable metal, e.g. but not limited to iron, steel, stainless steel, zinc, zinc alloys, aluminum, and aluminum alloys. In another aspect the panel is made of any suitable plastic, fiberglass, polytetrafluoroethylene cermet or composite. In one particular aspect the panel is made of 14 gauge cold rolled steel about 0.074 inches thick.

The openings in the panel may be made by any suitable method, including, but not limited to, drilling, sawing, high pressure water cutting, or laser cutting. In one particular aspect a panel of 14 gauge cold rolled steel about 0.074 inches thick is laser cut with a $CO_2$ laser producing very precise and well-defined open spaces and very precise and well-defined strips 1155, in one aspect with strips about 0.22 inches wide, about 1.3 inches apart from each other.

In other aspects, the strips 1155 may range in width between about 0.10 inches to about 3.00 inches and they may be spaced apart between about 0.2 inches to about 4.00 inches. In one particular screen with about 0.22 inch wide strips spaced about 1.3 inches apart, the panel is 14 gauge cold rolled steel about 46.75 inches long, about 35.86 inches wide, about 0.074 inches thick with end portions, as viewed from above, about 1.65 inches wide between the screen ends" outer edge and the edge of an open space. Alternatively, the strips 1155 may be vertically oriented as viewed in FIG. 64A and the panel 1150 may be corrugated.

Alternatively, the outer edges of the panel 1150 may be provided and the strips, as separate pieces, connected thereto in any manner, shape, or design as described above herein.

Figure 64A:
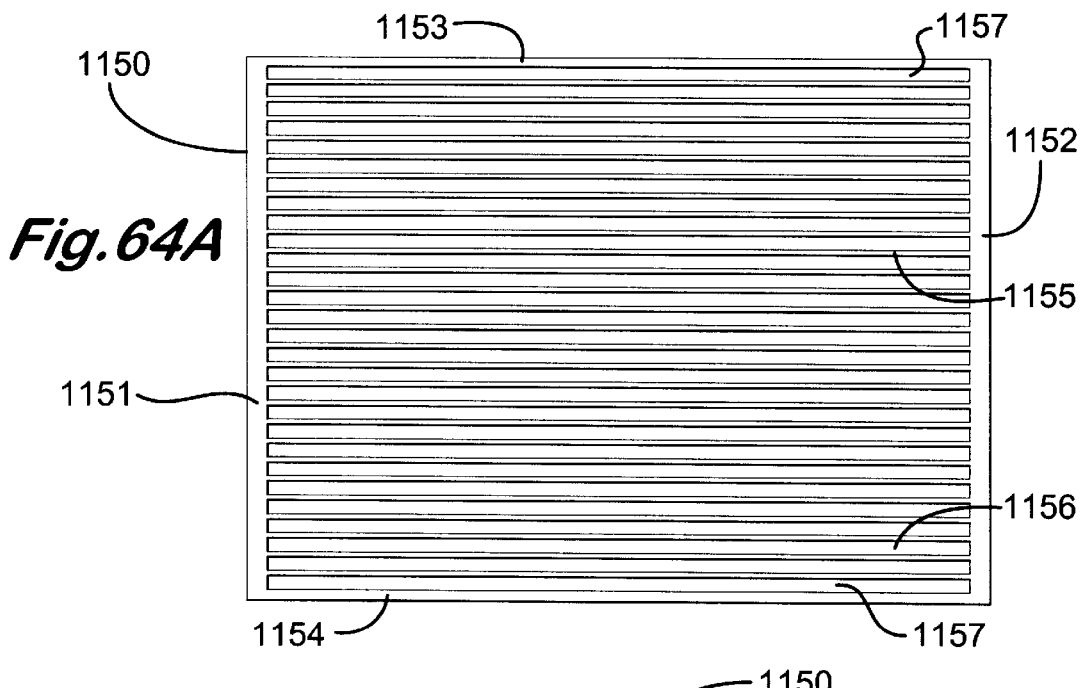
FIG. 64A is a top view of a panel according to the present invention for a screen assembly.
Figure 64B:
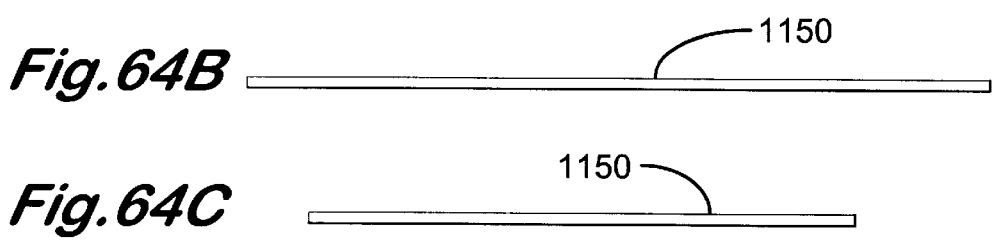
FIG. 64B is a front side view.
Figure 64C:
FIG. 64C is a left end view (as in FIG. 64A) of the panel of FIG. 64A. The back side view is like the view of FIG. 64B. The right end view is like the view of FIG. 64C.
Figure 64D:
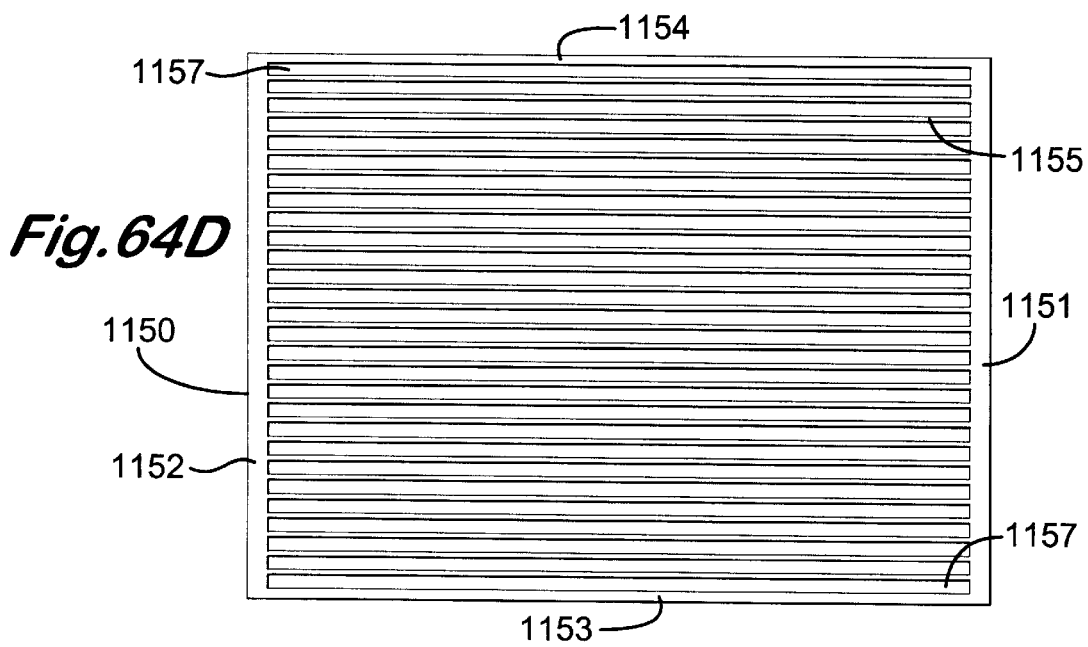
FIG. 64D is a bottom view.
Figure 64E:
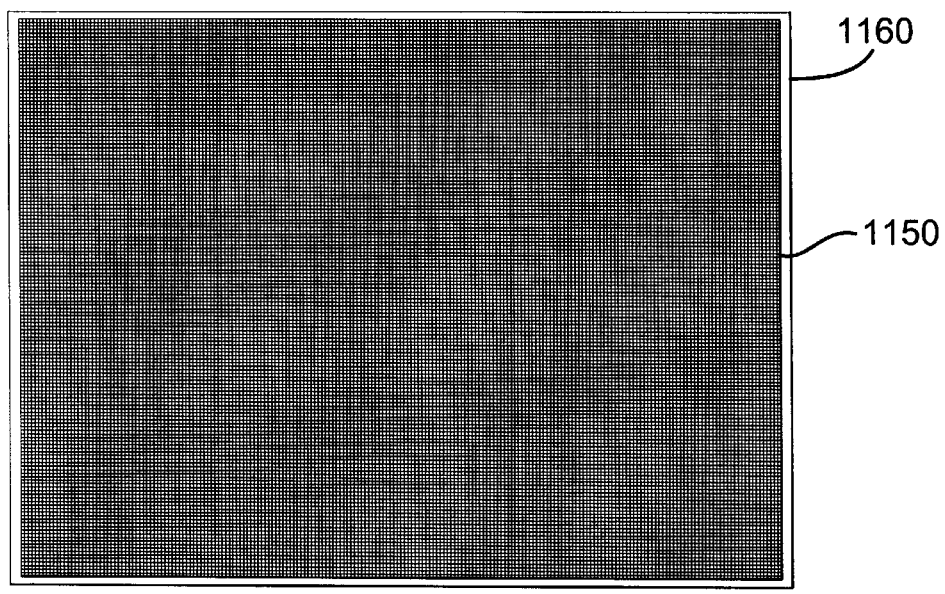
FIG. 64E is a top view.
Figure 64F:
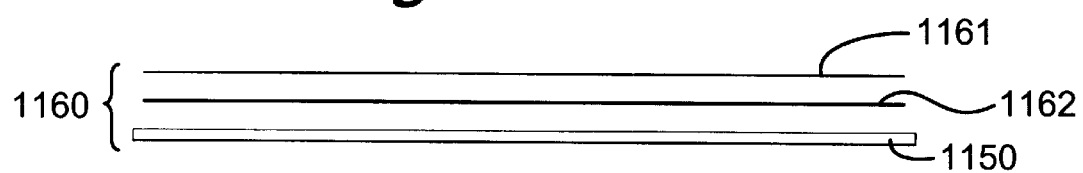
FIG. 64F is an exploded view of the screen assembly of FIG. 64E.

FIG. 64E shows a screen assembly 1160 according to the present invention with a panel 1150. A first mesh (in one aspect a fine mesh) 1161, e.g. 180 mesh, is bonded to a second mesh (in one aspect a backup mesh) 1162, e.g. 12 mesh which is then bonded to the panel 1150. In additional embodiments, the fine mesh may range between 14 mesh and 500 mesh and the backup mesh may range between 2 mesh and 30 mesh. Also, additional meshes may be used, including, but not limited to, any of the meshes and mesh combinations disclosed above herein, including the above-disclosed corrugated meshes in a flat configuration.

In other embodiments a backup mesh, middle mesh and a top mesh (in one aspect ranging between 100 mesh to 300 mesh) are used. In one aspect the backup mesh was 304 stainless steel 32 mesh with wire diameter of 0.045 inches, the middle mesh was 130 mesh 304 stainless steel with wire diameter of 0.0017 inches, and the top mesh was 304 stainless steel 180 mesh with a wire diameter of 0.0012 inches. A panel like the panel 1150 was coated with a powder coating (e.g. such as commercially available TK NOVO B Powder from Tuboscope Vetco) and bonded to the three meshes.

In other embodiments a backup mesh and a top mesh are used bonded together. In one aspect the backup mesh was 304 stainless steel 8 mesh with wire diameter of 0.025 inches, and the top mesh was 304 stainless steel 200 mesh with a wire diameter of 0.0021 inches. A panel like the panel 1150 was coated with a powder coating and bonded to the two meshes.

In other embodiments a backup mesh, middle mesh and a top mesh are used bonded together. In one aspect the backup mesh was 304 stainless steel calendared 8 mesh (with tops of ridges flattened) with wire diameter of 0.025 inches, and the top mesh was 304 stainless steel 180 mesh with a wire diameter of 0.0012 inches (or alternatively 200 mesh with a wire diameter of 0.0010 inches). A panel like the panel 1150 was coated with a powder coating and bonded to the three meshes.

FIGS. 64G–64P are top views of screen panels according to the present invention which have strips in various orientations and of various widths and spacing. Any panel, side, and/or strip depicted in these figures may be made of any material listed above for the panel 1150 and any strip in these figures may have the dimensions described for a strip 1155. Any screen, screens, mesh or meshes or mesh or screen combination described herein may be used with any panel in FIGS. 64G–64P and these panels may be flat, corrugated, or undulating as any such shape for a frame or panel disclosed herein and the screen(s) and/or mesh(es) thereon may have a shape corresponding to the panel shape.

Figure 64G:
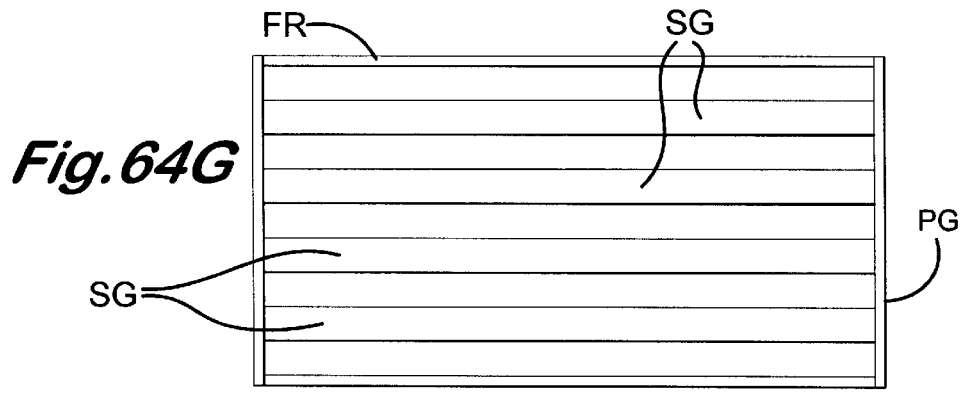
FIGS. 64G–64P are top views of panels according to the present invention.
Figure 64H:
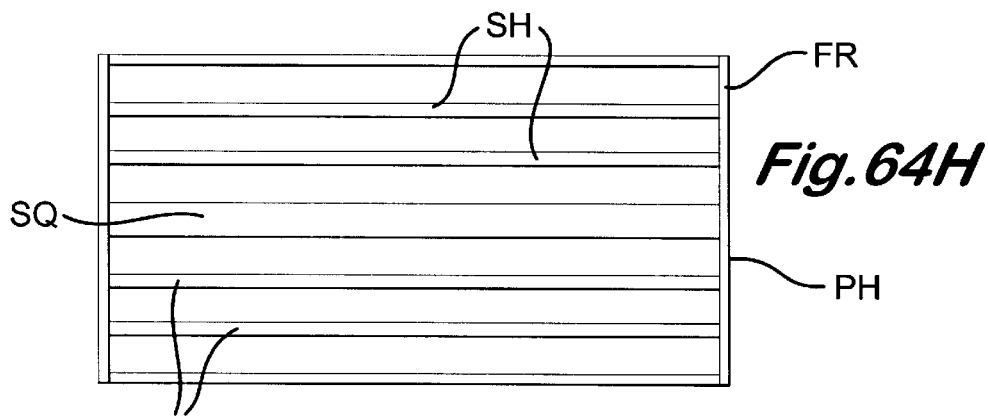
Figure 64I:
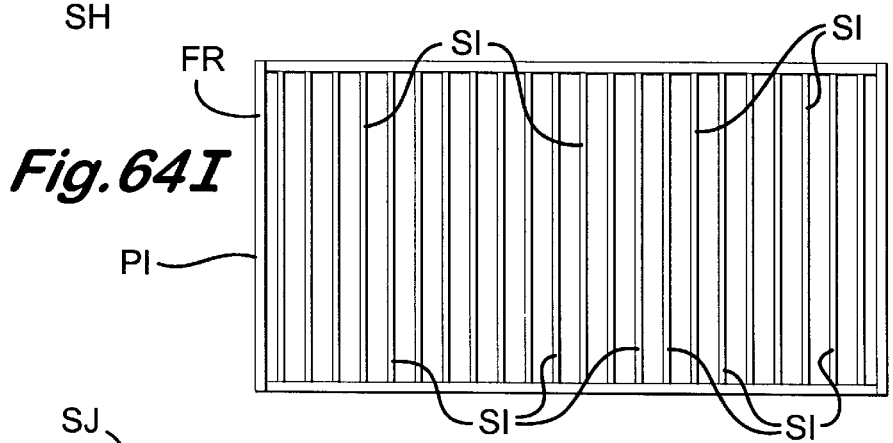
Figure 64J:
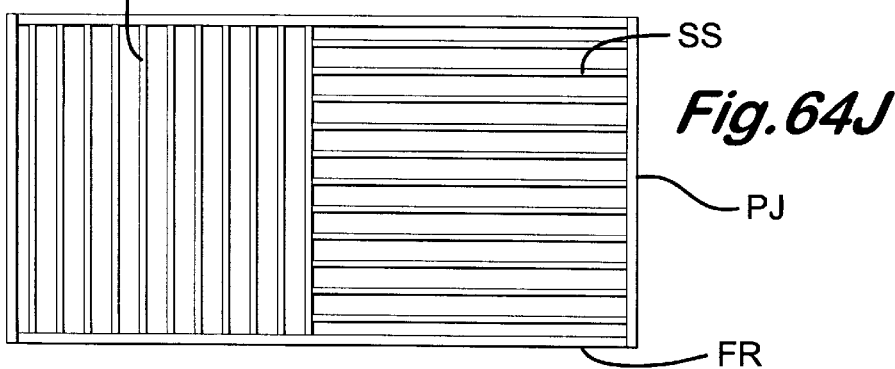

FIG. 64G shows a panel PG with strips SG. FIG. 64H shows a panel PH with strips SH and one wider strip SQ. FIG. 64I shows a panel PI with vertically extending (as viewed in the figure) strips SI. FIG. 64J shows a panel PJ with vertical strips SJ and horizontally extending (as viewed in the figure) strips SS.

Figure 64K:
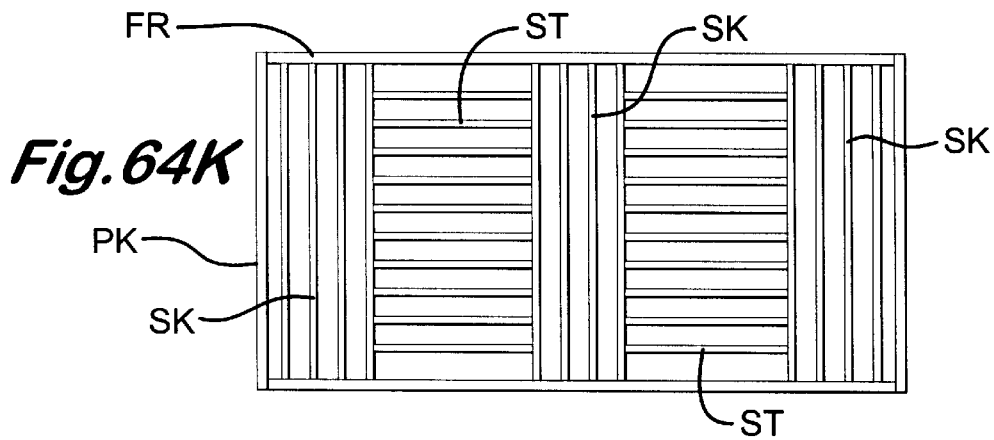
Figure 64L:
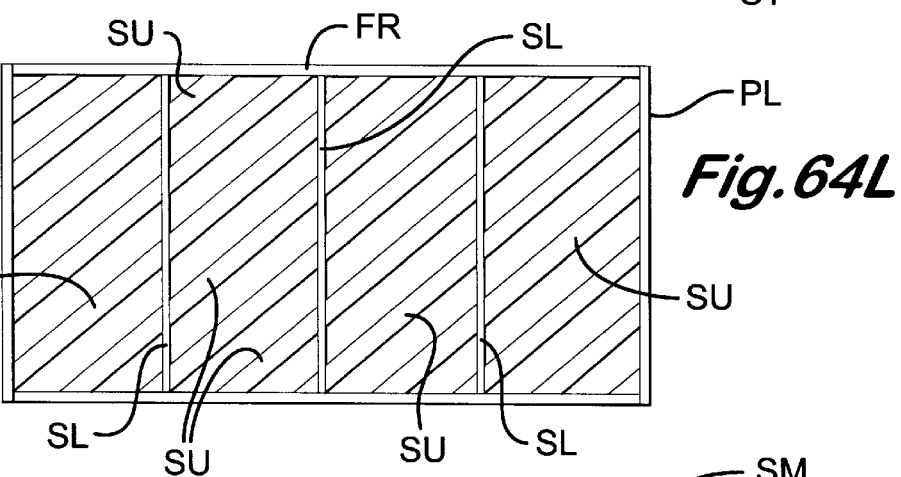
Figure 64M:
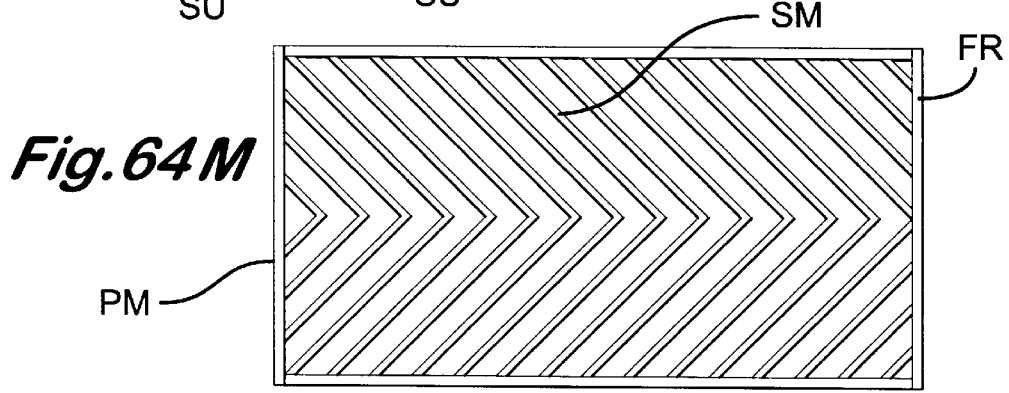

FIG. 64K shows a panel PK with vertical strips SK and horizontal strips ST. FIG. 64L shows a panel PL with vertical strips SL and slanted (as viewed in the figure) strips SV. FIG. 64M shows a panel PM with chevron shaped (as viewed in the figure) strips SM.

Figure 64N:
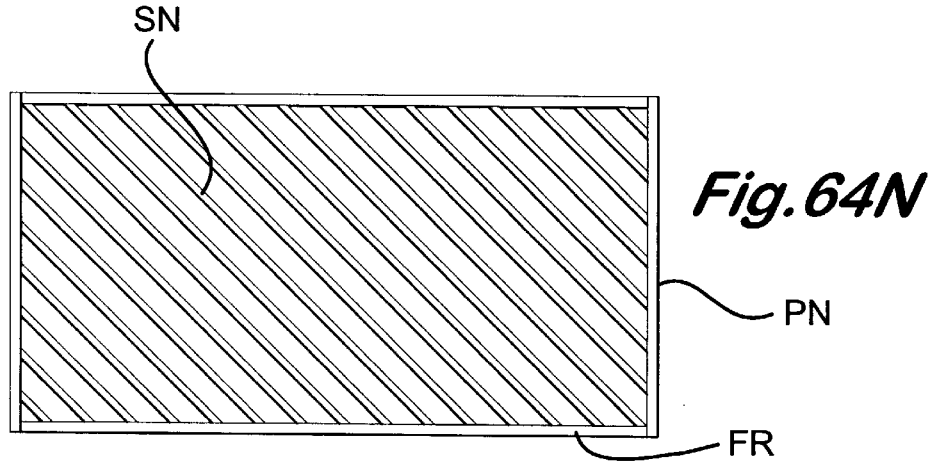
Figure 64O:
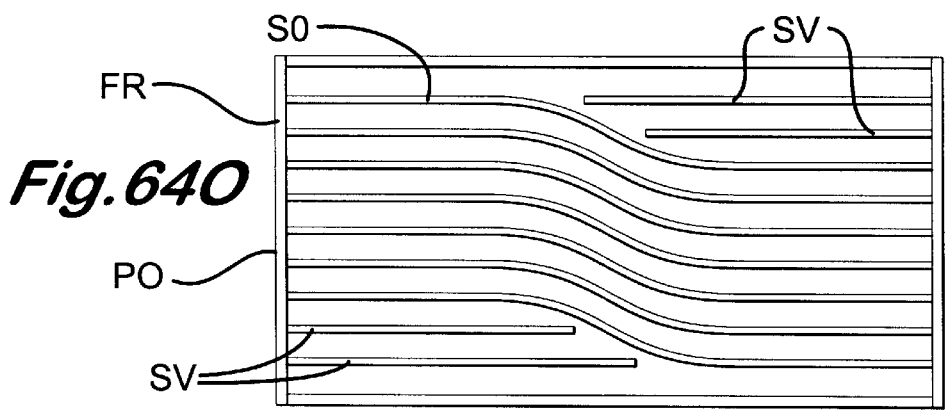

FIG. 64N shows a panel PN with slanted strips SN. FIG. 64O shows a panel PO with partially curved strips SO and optional horizontal strips SV.

Figure 64P:
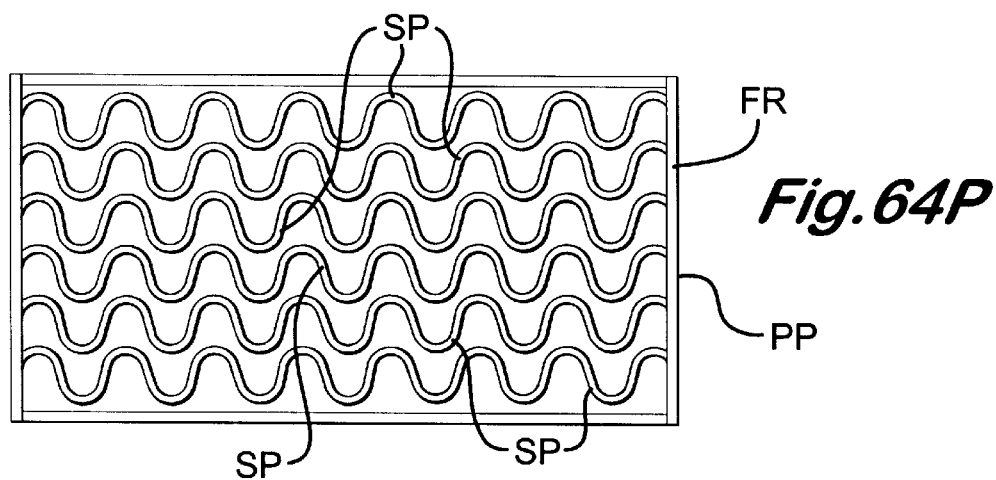

FIG. 64P shows a panel PP with undulating curved (as viewed from above) strips SP.

Each panel in FIGS. 64G–64P has an outer frame FR to which some or all of the strips or attached or formed with. As in FIGS. 64J, 64K, and 64L, some of the strips are connected to other strips. Spaces between strips may be formed by cutting the strips, e.g. with a laser or other suitable tool or instrument. Any plastic grid disclosed herein may be configured and shaped to correspond to any panel disclosed herein.

Figure 65A:
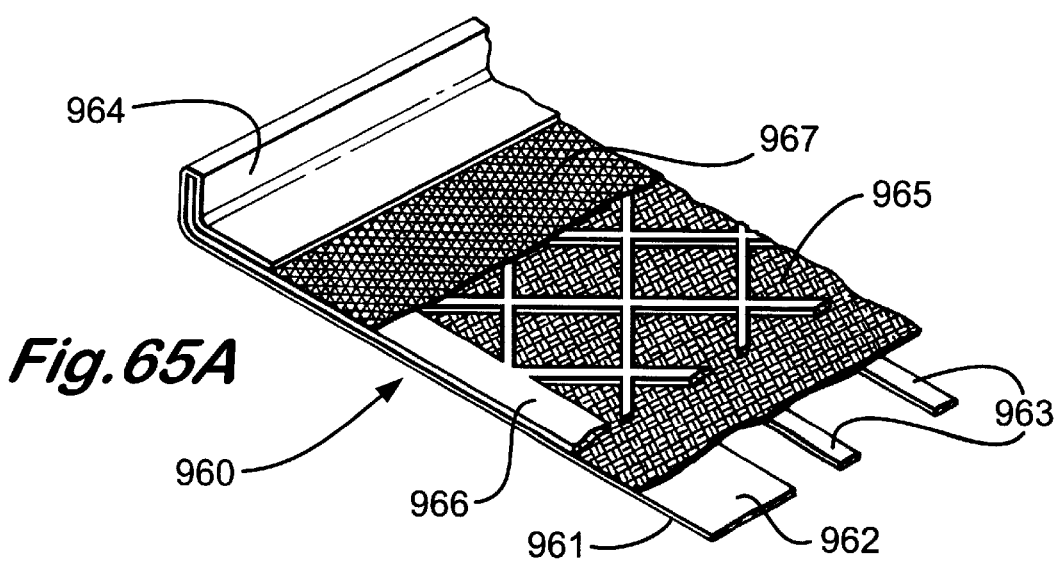
Figure 65B:
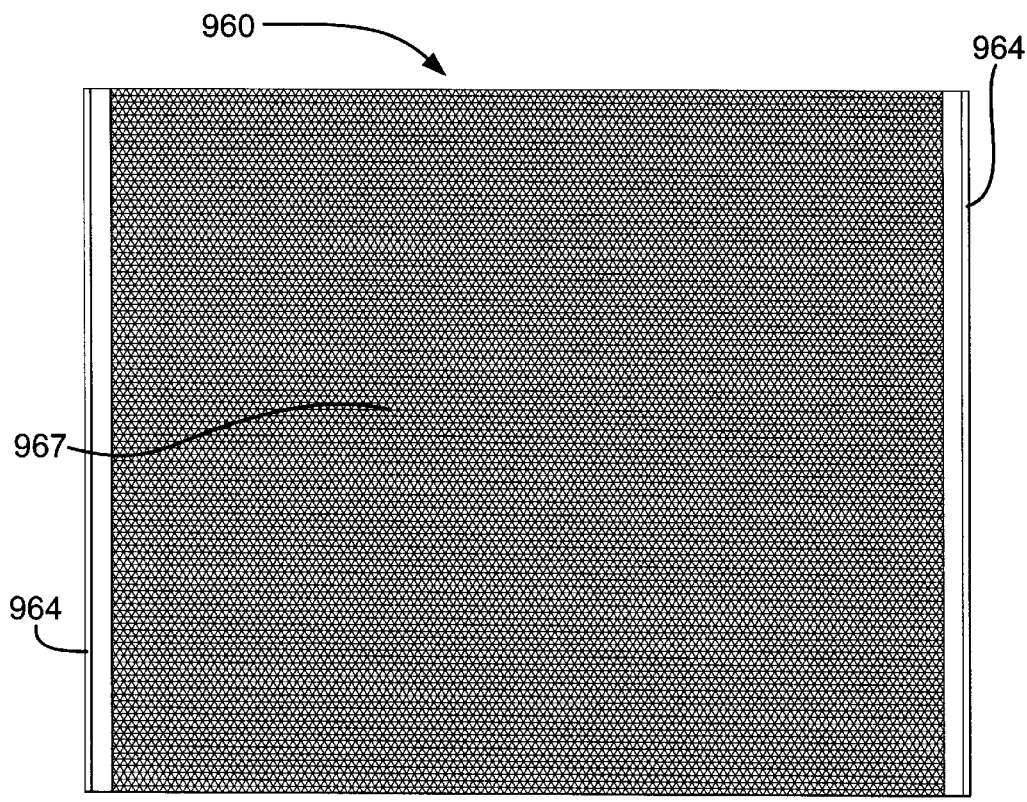
FIG. 65B is a top view and FIG. 65C is an end view of the screen assembly of FIG. 65A.
Figure 65C:
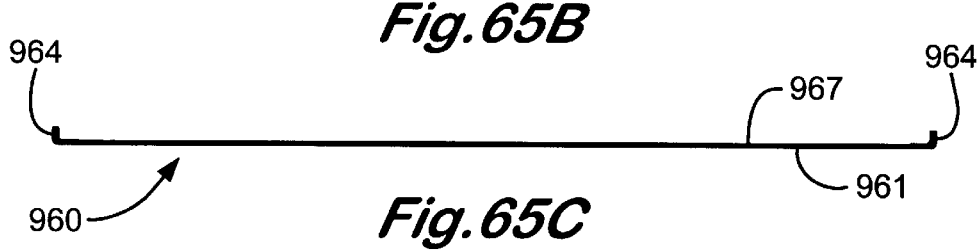

FIGS. 65A–65C show a screen assembly 960 with a lower strip member 961 (including individual strips 962, 963), with four sides 962 (one shown), multiple cross-strips 963, upturned edges 964 (called an "L" hook; one shown in FIG. 65A). The entire screen 960 is shown in FIG. 65B and FIG. 65A shows a portion of the screen 960 in cut away revealing the various components. It is to be understood that the strip member, grid and screens cover substantially the entire screen assembly area as viewed in FIG. 65B.

A coarse screen 965 rests on the strip member 961. In one aspect, optionally, the strip member 961 is bonded to the coarse screen, e.g. with glue or epoxy. A plastic grid 966 is initially (prior to the bonding of the strip member to the coarse screen) interposed between the coarse screen 965 and a fine screen 967. By subjecting the grid/screen combination to heat (e.g. between heated plates or in an oven at 480° F. for five minutes to eight minutes) and, optionally, pressure (e.g. with weight on top of the combination and/or between plates pressed together with one or more pneumatic cylinders), the plastic fuses the screens together and permeates them, encapsulating wires where it is present. The screens, bonded together by the plastic, are then emplaced on the strip member and an adhesive is used to bond the strip member 961 to the screen combination. The upturned edge 964 (made, e.g. with a press brake) of the strip member 961 is bent up and over edges of the screens and plastic and this structure provides a hook strip apparatus for the connection of the screen assembly 960 to various shakers and vibratory separators that use hook-strip connection. A channel-shaped or "C" hook strip may be used instead of the "L" hook. Alternatively all the edges of the screen assembly may be relatively flat with no hook strip. The plastic grid can be placed initially above the fine screen(s), below the coarse screen(s), or between any two screen layers. Upon heating, the plastic flows to all layers above and/or below it bonding all layers together. Instead of a plastic grid any suitable plastic pieces or strips, or glue, may be used.

The coarse screen 965 may be any suitable coarse screen, including but not limited to, those disclosed herein. The fine screen 967 may be any suitable fine screen, including but not limited to, those disclosed herein. Two or more coarse screens may be used and two or more fine screens may be used. The strip member 961 may be any strip member disclosed herein or any frame or support with strips disclosed herein. The plastic grid 966 may be any plastic grid disclosed herein; any suitable polyurethane hot melt; and/or any plastic or plastic grid and bonding process associated therewith as in U.S. Pat. Nos. 5,417,793; 5,868,929; 5,417, 858; 5,417,859; 5,221,008; 4,575,421; 5,720,881; 5,636,749 and 5,330,057 which are incorporated fully herein for all purposes. The plastic grid 966 may be bonded to the screens by any suitable known cooking, curing, pressing, and/or cooling method, including but not limited to, methods as disclosed herein and/or in the patents listed above.

In certain particular preferred embodiments a screen assembly 960 either 36"×45½" or 36"×64" has screens as follows:

Coarse screen: ½" openings, 88 mesh; ½" openings flattop wire cloth
  Mesh: 1 to 50; 19; 32; or calendared 12—in a square or oblong weave or any suitable weave
  Material: steel; stainless steel; 304 SS; 314 SS; 316 SS
Fine Screen:
  Mesh: 12 to 500; 200×125; 240×150; 280×180; 370× 200 (In one aspect two fine screens, one 130 mesh, one 160 mesh or one 130 mesh and one 180 mesh)
  Material: same as coarse screen or synthetics (e.g. nylon)
Plastic grid:
  Type of plastic: polypropylene; polyethylene; nylon
  Distance between centers: about 1.65"
  Thickness: about 0.032 to 0.028 inches
Strip member:
  Material: 14 gauge cold rolled steel (in one aspect less than fifteen percent carbon)
  Distance between adjacent strips: about 1.29" to 1.35"
  Thickness: about 14 gauge In one aspect a powdered epoxy is applied to the top of the strips and sides of the strip member and the screen(s) are then emplaced on top of the strip member. Instead of using a plastic grid 966, glue may be applied (e.g. automatically with a glue applying machine or with a glue gun by hand) to one of the screens in a desired pattern, e.g. but not limited to, to resemble any pattern of any grid disclosed herein. Alternatively a patterning roller may be used to so apply the glue in a desired pattern.

Figure 65D:
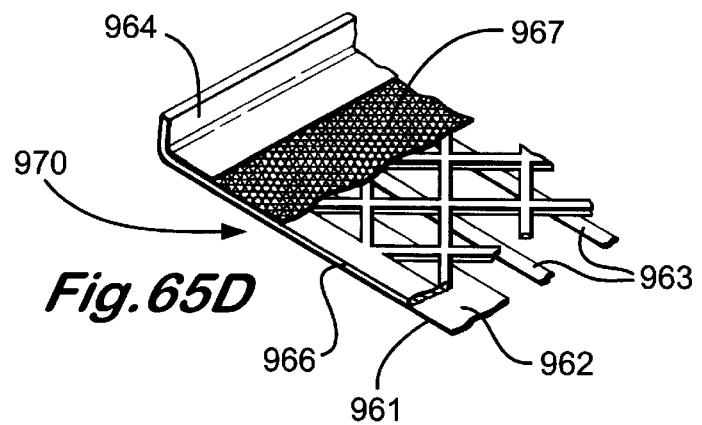

FIGS. 65D–65G are perspective views of various alternatives to the screen 960 of FIG. 65A (and the same numerals identify the same components as in the screen 960). A screen 970 in FIG. 65D is like the screen 960 but has no layer of coarse screen beneath the plastic grid 966. A screen 972 shown in FIG. 65E has a plastic grid 973 with openings 974 that differ in size from those of the grid 966. A screen 975 shown in FIG. 65F has cross-members 976 interconnecting strips 963. Crossmembers connect the outer most strips to the panel sides. A screen 977 shown in FIG. 65G has cross-members 978 interconnecting strips 963, some of which connect an outermost strip to a panel side. Cross members as in FIGS. 65G and 65H may be above the strips, below the strips, or at the same level as the strips. In one particular aspect, the cross members may be as disclosed in U.S. patent application Ser. No. 09/344,145 filed Jun. 24, 1999 entitled "Vibratory Separator Operations And Apparatuses" which is incorporated fully herein for all purposes.

FIGS. 66A–66D show a screen assembly 980 according to the present invention that has a lower strip member 981 and a screen/plastic combination mounted on the lower strip member 981.

The screen/plastic combination includes a lower coarse screen 985 and two upper fine screens 988*a* and 988*b*. Fusing the screens together is a plastic grid 986 that initially is placed on the coarse screen 985 below the fine screens 988*a* and 988*b*, e.g. as shown in FIGS. 66A and 66D; but which, following heat treatment, permeates both screens fusing them together and encapsulating in plastic portions of wires in each screen. Any process described herein for applying plastic may be used instead of the plastic grid as shown and any heating process described herein may be used to fuse the screens together. Alternatively any glue and gluing process described above may be used instead of a plastic strip or plastic pieces.

The screen assembly 980 (as described for the screens of FIGS. 65A–65G) may have no coarse lower screen or one or more coarse screens and may have one, two, three or more fine screens.

As shown in FIG. 66A, it is within the scope of this invention to form and shape a plastic grid (or to apply plastic strips, plastic pieces, or glue) in such a way that areas of the intersection of lines of plastic (or lines of glue) such as the areas 987 are located above individual strips 983 of the lower strip member 981 or above a side 982 of the member 981.

A bent edge 984 provides a hook strip connection for those machines that use hook strip connectors. As shown the edge 984 is an "L" shaped hook strip, but it is within the scope of this invention to use a channel shaped or "C" shaped hook strip instead of the "L" shape.

It is to be understood that the screen assembly as shown in FIGS. 66A and 66B show the plastic grid 986 as a separate member or separate material, not yet heated and pressed, which has not yet permeated the screen layers. The lower strip member 981 (including strips 989*a* and 989*b*) is adhered to the screen plastic combination as described above for the screen 960.

FIGS. 67A–67E show a screen assembly 990 according to the present invention that has a lower strip member 991 (with strips 991*a*, 991*b* and end pieces 991*c*) and a screen/plastic combination mounted on the lower strip member 991.

Figure 67A:
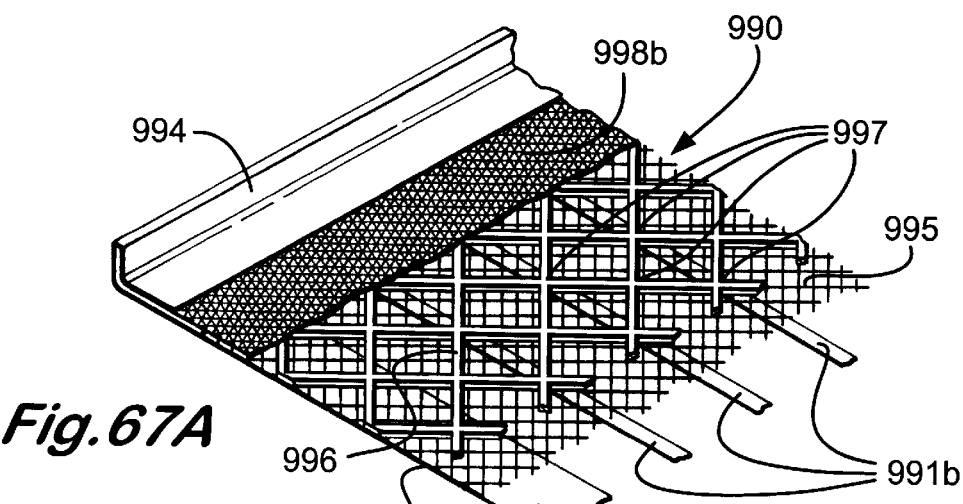
FIG. 67A is a perspective view of a screen assembly according to the present invention.
Figure 67B:
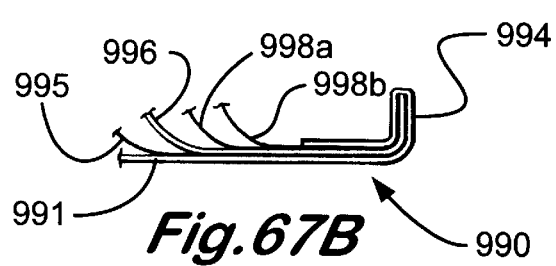
FIG. 67B is an enlarged view of a portion (shown outlined in FIG. 67C) of the screen assembly of FIG. 67A.
Figure 67C:
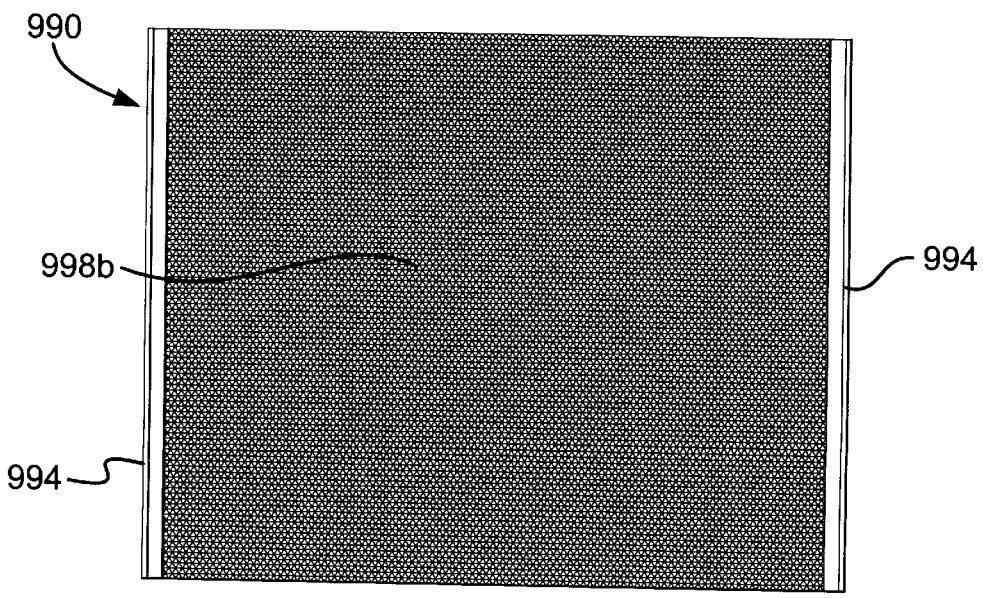
FIG. 67C is a top view.
Figure 67D:
FIG. 67D is an end view.
Figure 67E:
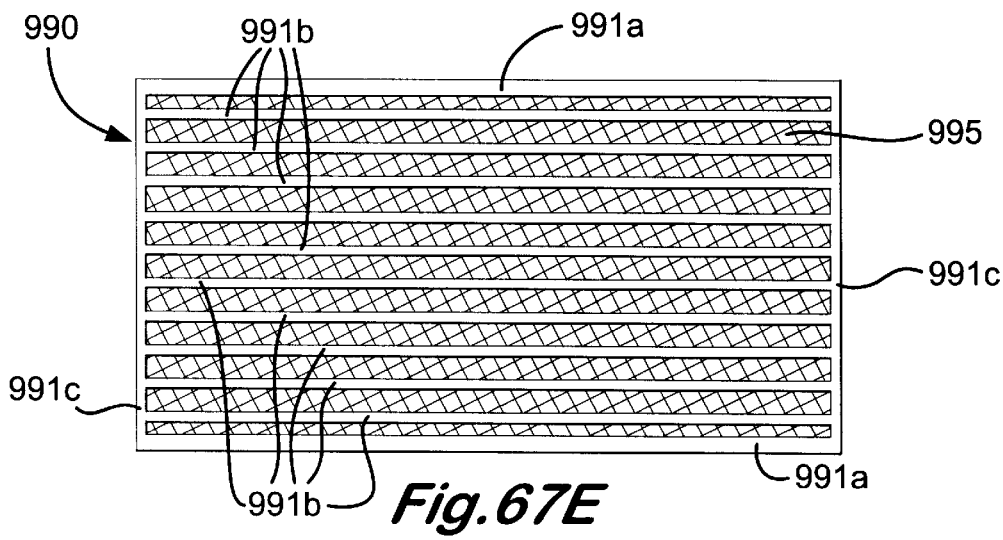
FIG. 67E is a bottom view of the screen of FIG. 67A.

The screen/plastic combination includes a lower coarse screen 995 and an upper fine screens 998*a* and 998*b*. Fusing the two screens together is a plastic grid 996 that initially is placed on the coarse screen 995 below the fine screens, e.g. as shown in FIGS. 67A and 67B; but which, following heat treatment, permeates both screens fusing them together and encapsulating in plastic portions of wires in each screen. Any process described herein for applying plastic may be used instead of the plastic grid as shown and any heating process described herein may be used to fuse the screens together. Alternatively any glue and gluing process described above may be used instead of a plastic strip or plastic pieces.

The screen assembly 990 (as described for the screens of FIGS. 65A–65G) may have no coarse lower screen or one or more coarse screens and may have one, two, three or more fine screens.

As shown in FIG. 67A, it is within the scope of this invention to form and shape a plastic grid (or to apply plastic strips, plastic pieces, or glue) in such a way that areas of the intersection of lines of plastic (or lines of glue) such as the areas 997 are located above individual strips 991*a* or 991*b* of the lower strip member 991 or above an end piece 991*c* of the member 991.

A bent edge 994 provides a hook strip connection for those machines that use hook strip connectors. As shown the edge 994 is an "L" shaped hook strip, but it is within the scope of this invention to use a channel shaped or "C" shaped hook strip instead of the "L" shape.

It is to be understood that the screen assembly as shown in FIGS. 67A and 67B show the plastic grid 996 as a separate member or separate material, not yet heated and pressed, which has not yet permeated the screen layers. The lower strip member 991 is adhered to the screen plastic combination as described above for the screen 960.

FIGS. 68A–68D show a screen assembly 1000 according to the present invention that has a lower strip member 1001 (like the strip member 991, FIGS. 67A and 67E) with strips 1001*a*, 1001*b* and end pieces 1001*c* and a screen/plastic combination mounted on the lower strip member 1001.

The screen/plastic combination includes a lower coarse screen 1005 and an upper fine screen 1008. Fusing the two screens together is a plastic grid 1006 that initially is placed on the coarse screen 1005 below the fine screen 1008, e.g. as shown in FIGS. 68A and 68B; but which, following heat treatment, permeates both screens fusing them together and encapsulating in plastic portions of wires in each screen. Any process described herein for applying plastic may be used instead of the plastic grid as shown and any heating process described herein may be used to fuse the screens together. Alternatively any glue and gluing process described above may be used instead of a plastic strip or plastic pieces.

The screen assembly 1000 (as described for the screens of FIGS. 65A–65G) may have no coarse lower screen or one or more coarse screens and may have one, two, three or more fine screens.

As shown in FIG. 68A, it is within the scope of this invention to form and shape a plastic grid (or to apply plastic strips, plastic pieces, or glue) in such a way that areas of the intersection of lines of plastic (or lines of glue) such as the areas 1007 are located above individual strips 1001*b* of the lower strip member 1001 or above a strip 1001*b* of the member 1001. Also plastic (or glue) lines, strips or pieces 1009 connect adjacent areas of intersection 1007 and the strips or pieces 1009 also are located above portions of the strips.

A bent edge 1004 provides a hook strip connection for those machines that use hook strip connectors. As shown the edge 1004 is an "L" shaped hook strip, but it is within the scope of this invention to use a channel shaped or "C" shaped hook strip instead of the "L" shape.

It is to be understood that the screen assembly as shown in FIGS. 68A and 68B show the plastic grid 1006 as a separate member or separate material, not yet heated and pressed, which has not yet permeated the screen layers. The lower strip member 1001 is adhered to the screen plastic combination as described above for the screen 960.

Figure 69A:
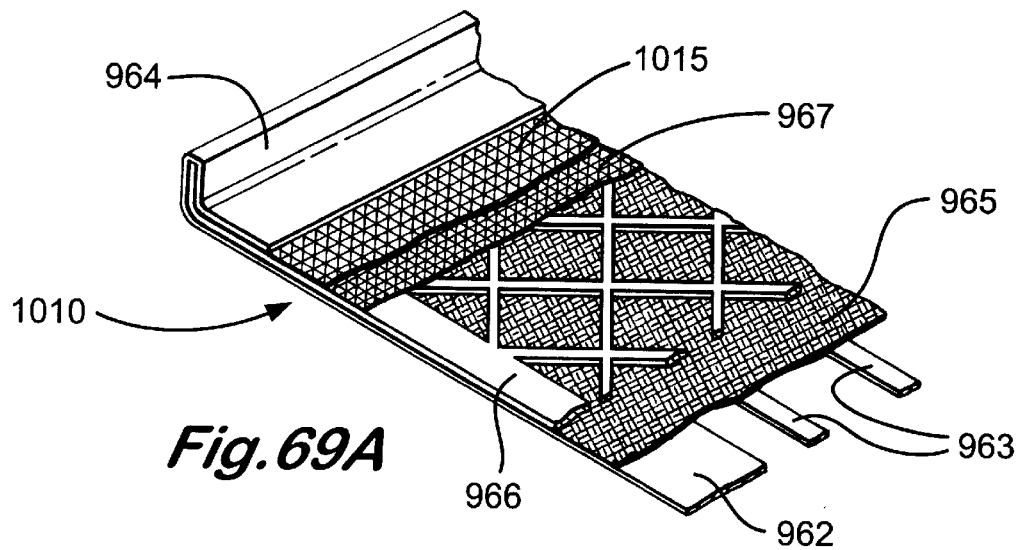
FIG. 69A is a perspective view of a screen assembly according to the present invention.
Figure 69B:
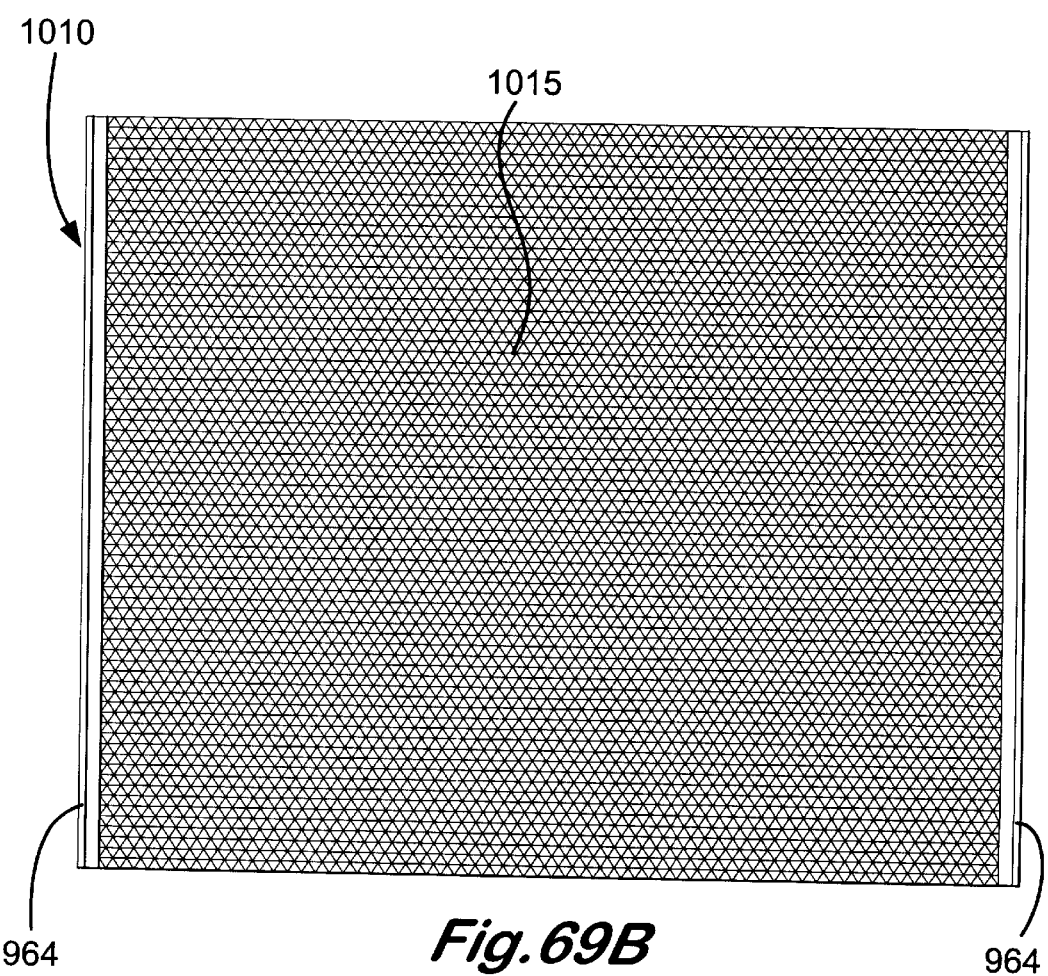
FIG. 69B is a top view of the screen of FIG. 69A.

FIGS. 69A and 69B show a screen assembly 1010 like that of FIG. 65A, but with the addition of a top coarse screen 1015 that covers the entire area of an uppermost fine screen 967. (Like numerals in FIGS. 65A and 70 indicate the same item or component.) The coarse screen 1015 may be any desired mesh, e.g. but not limited to 20 mesh, 30 mesh, 40 mesh or 50 mesh. Such a top coarse mesh protects the finer screens, takes some of the solids loading off the lower screens (a scalping effect), catches sharp sand particles preventing them from wearing away fine screen(s), and inhibits or prevents solids from sticking to a top screen and pulling it up as a shaker vibrates. The coarse top screen 1015 may be fused together with the other screens below it in a plastic-heating-pressing process as described above. In certain preferred embodiments in which only a portion of a screen assembly (as viewed from the top) has the top coarse mesh on it, edges of the top coarse mesh are located so that they overlie a strip in a strip support member that is positioned under the lowermost coarse mesh layer. Any screen or screen assembly disclosed herein can have a top mesh as in FIG. 69A or a portion or portions thereof as in FIGS. 69C–69D.

Figure 69C:
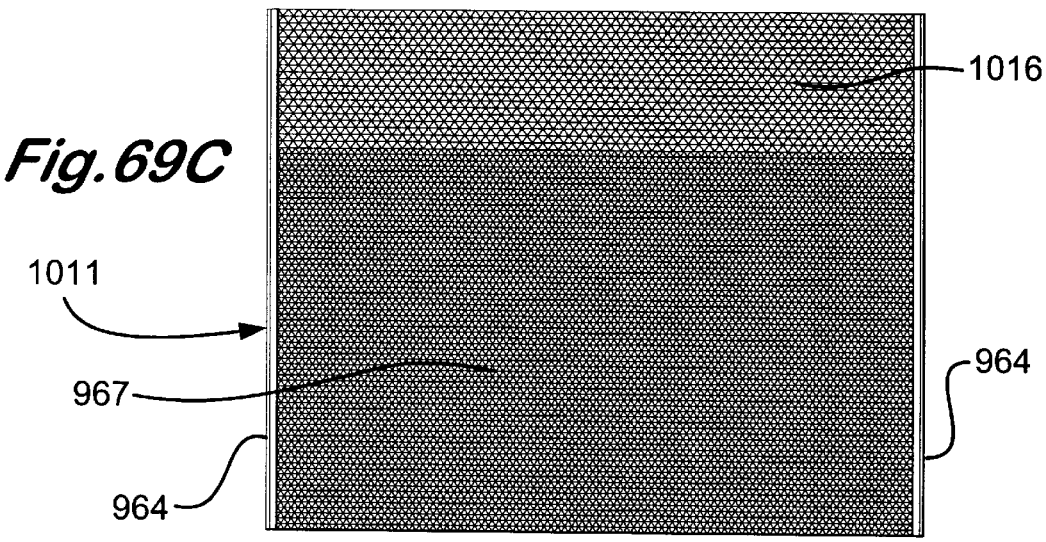
FIGS. 69C–69E present variations, in top view, of the screen assembly of FIG. 69A.
Figure 69D:
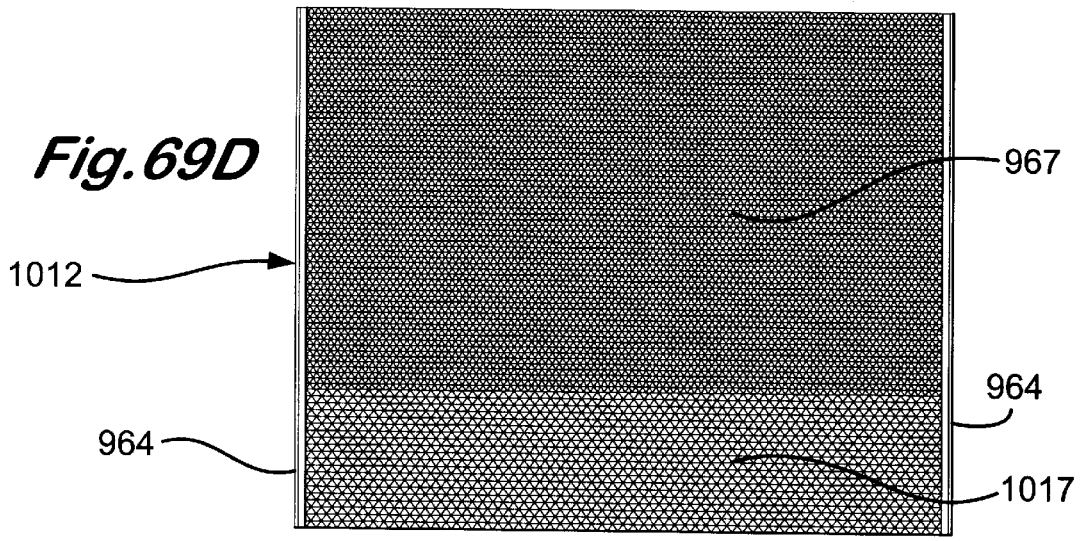
Figure 69E:
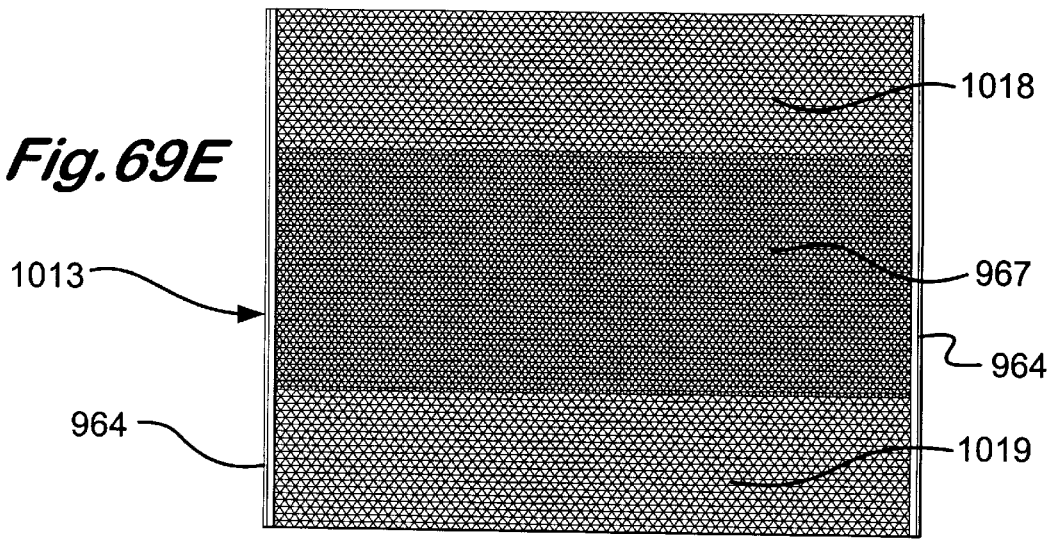
Figure 71:
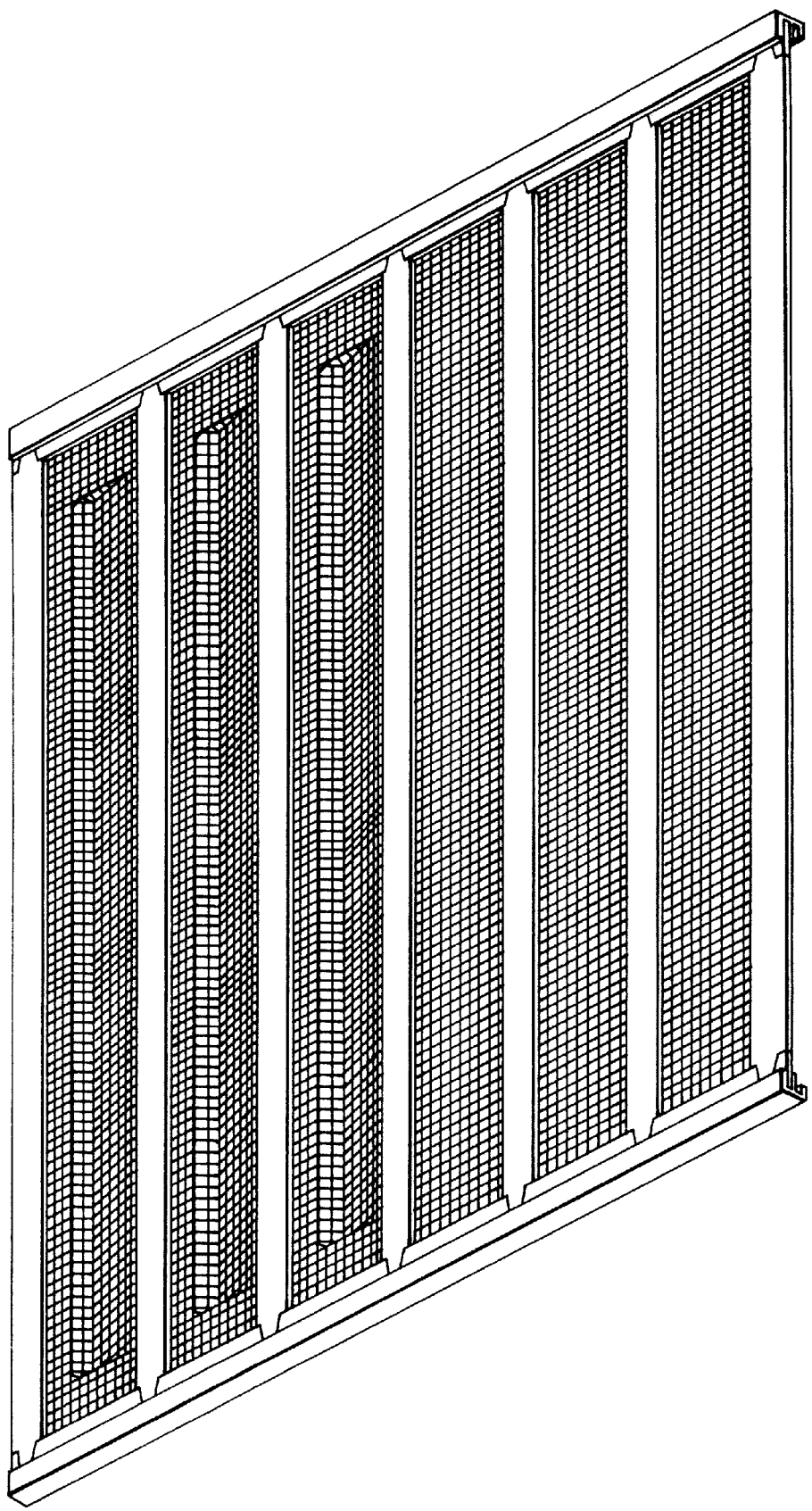
FIGS. 71–80 show designs of a screen according to the present invention.
Figure 72:
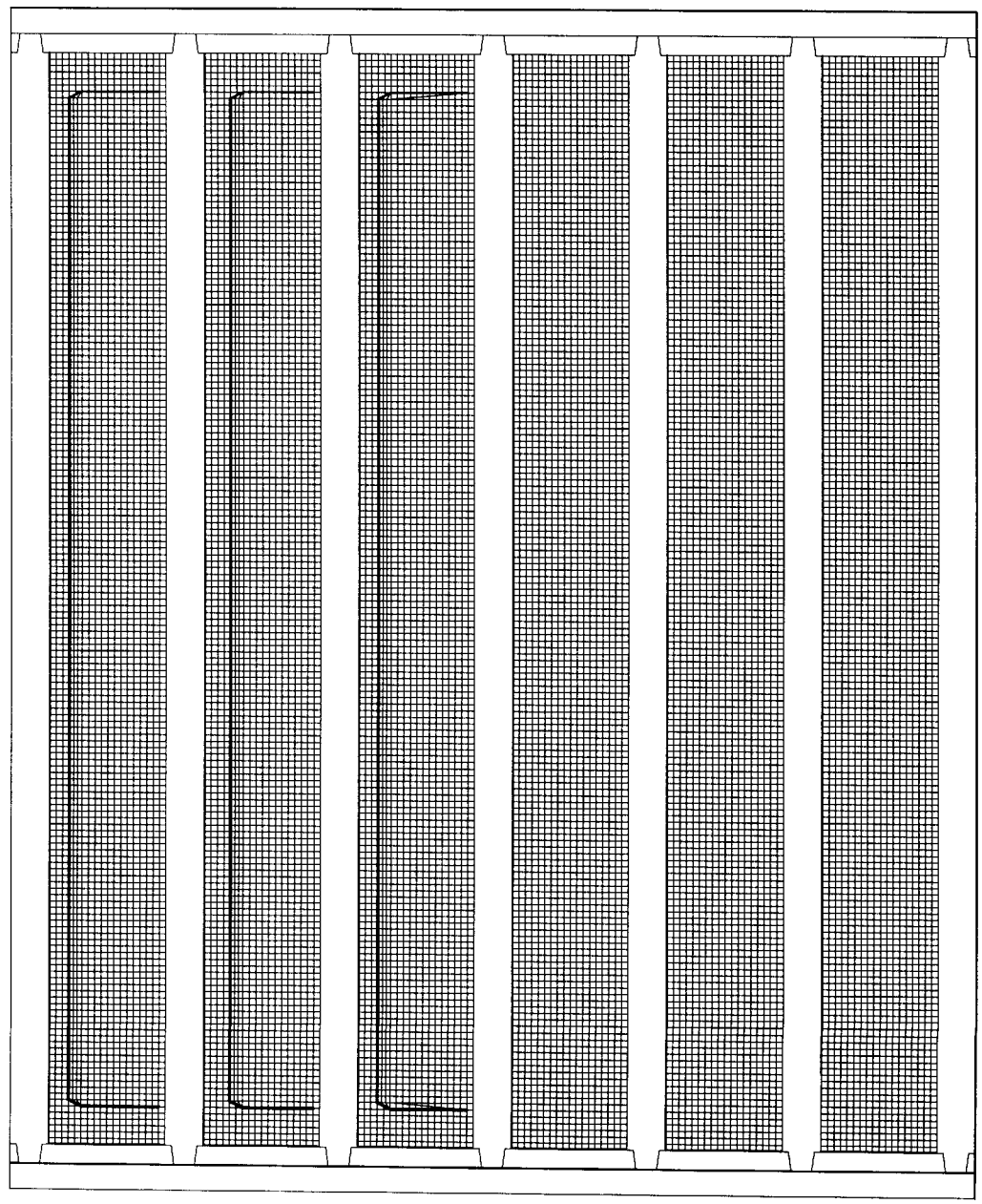
Figure 73:
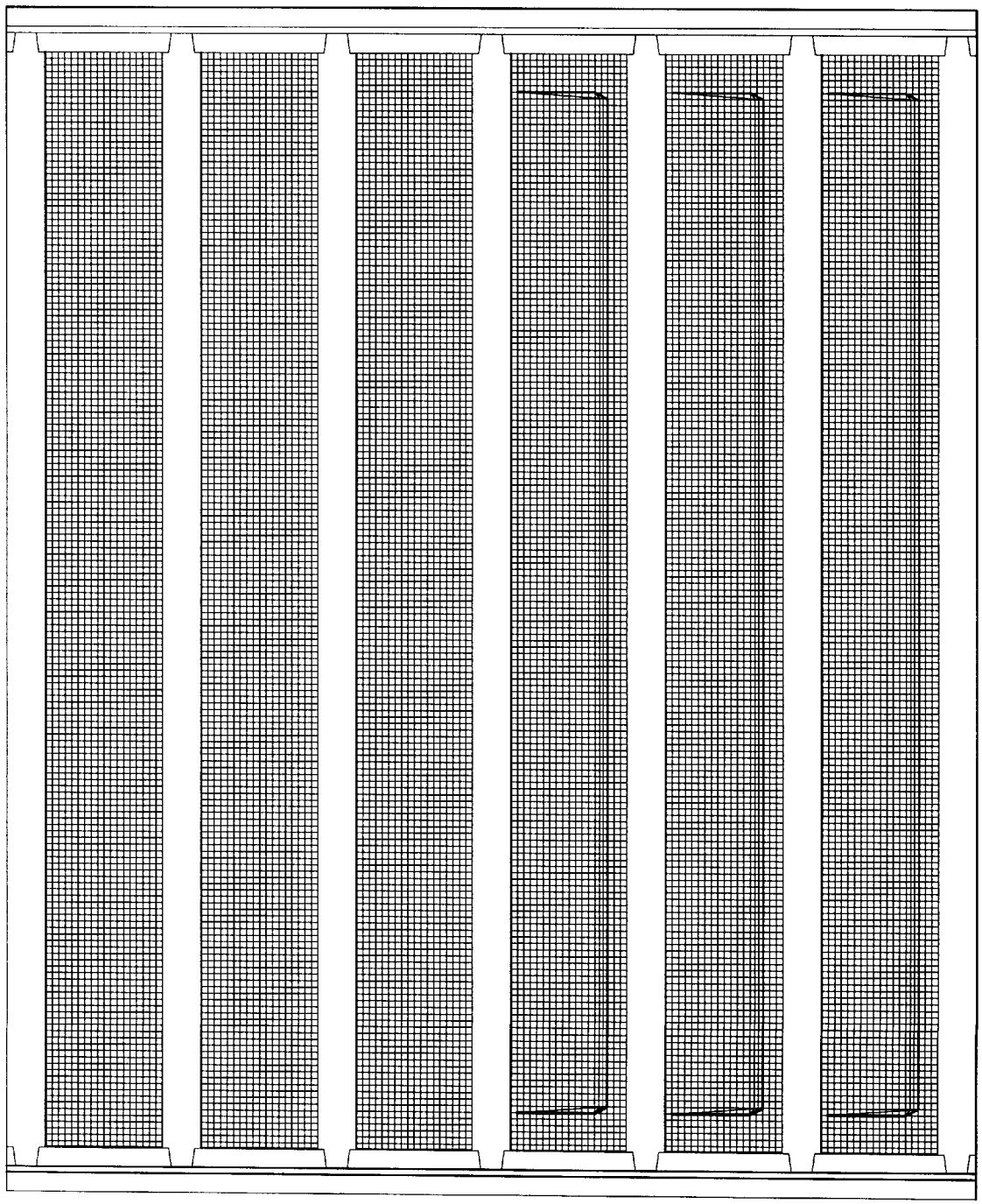
Figure 74:
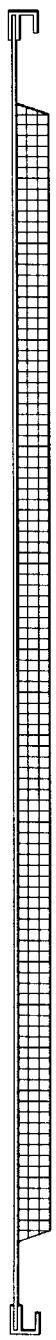
Figure 75:
Figure 79:
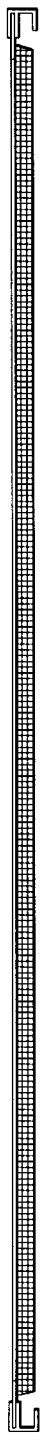
Figure 80:
Figure 76:
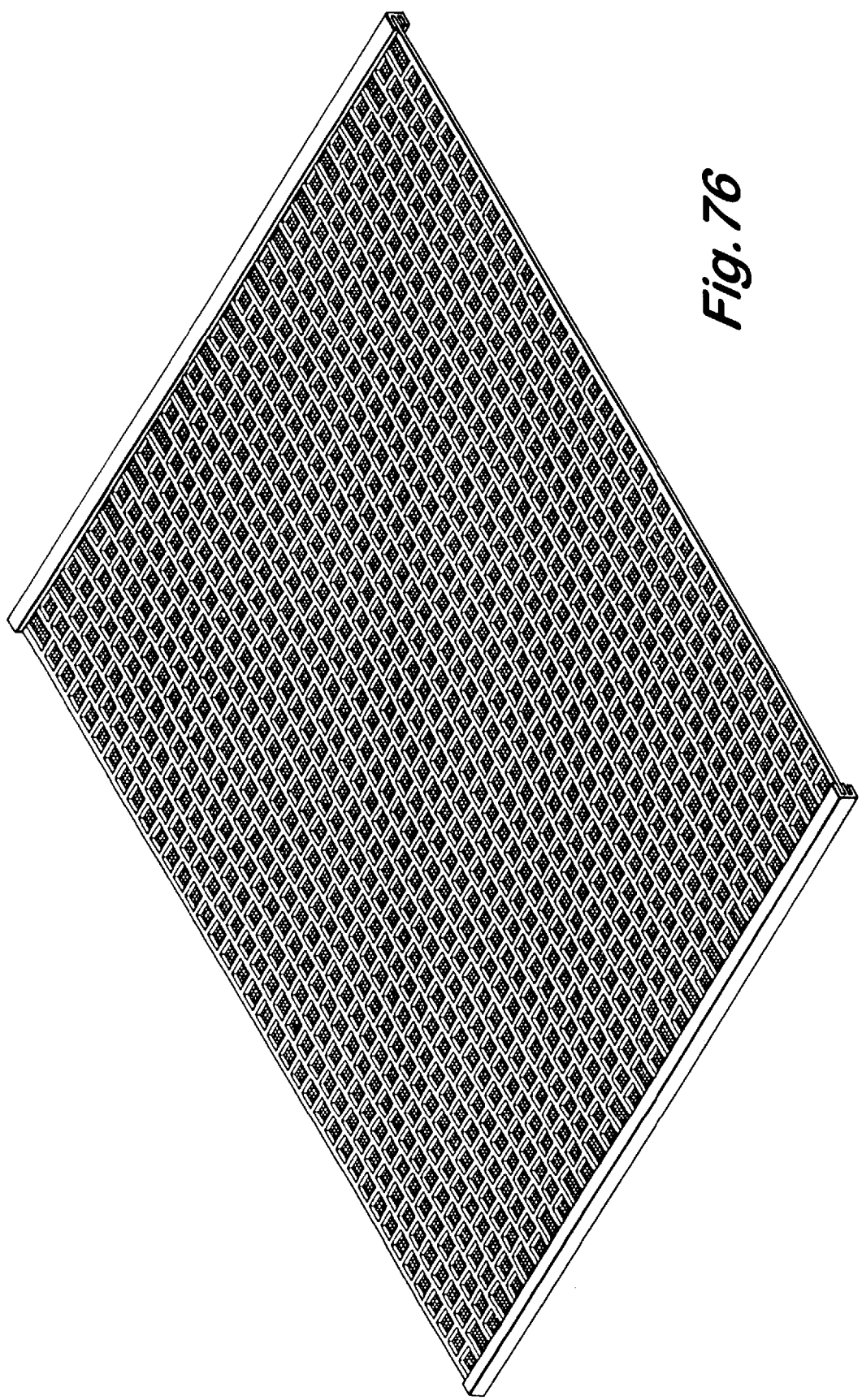
Figure 77:
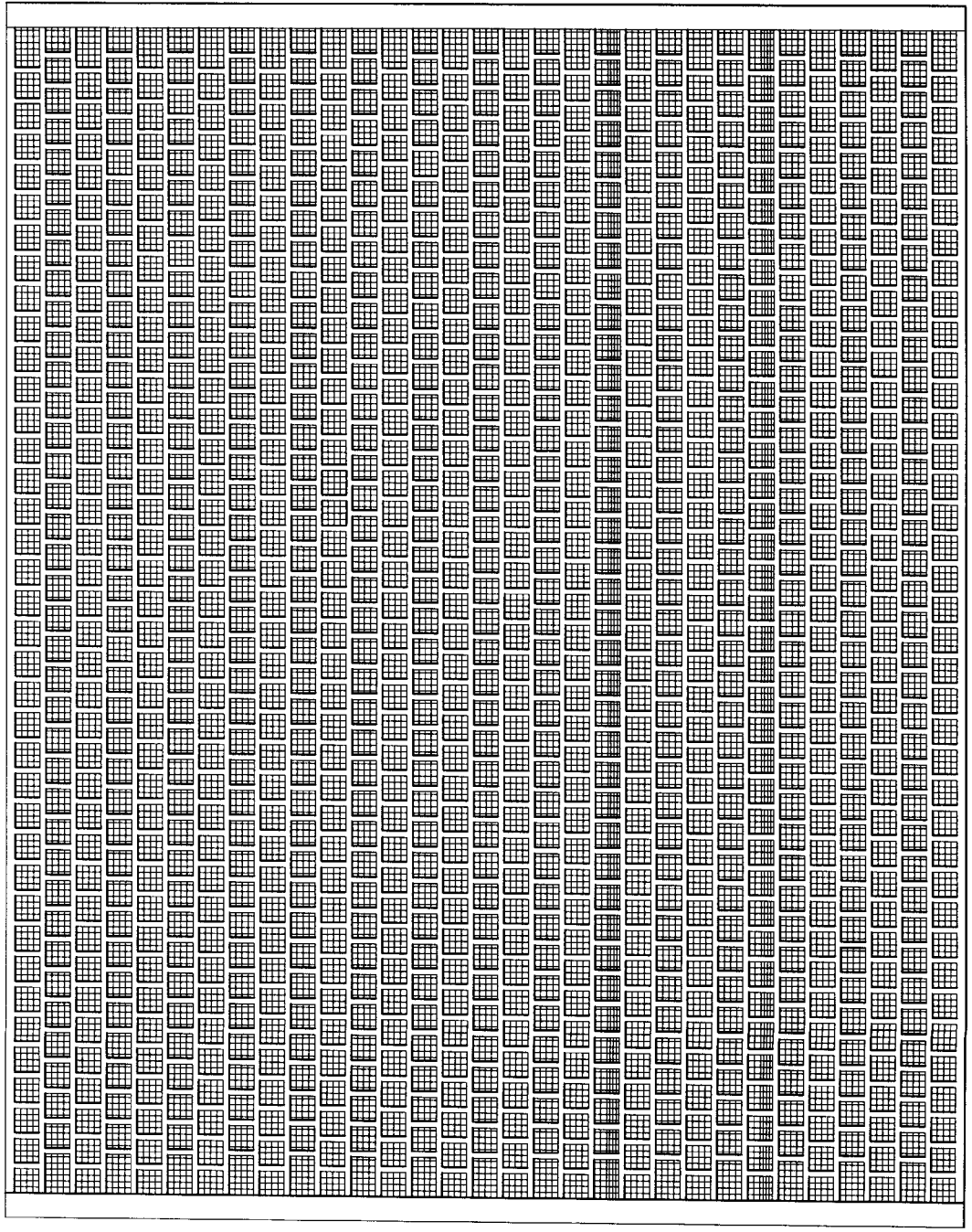
Figure 78:
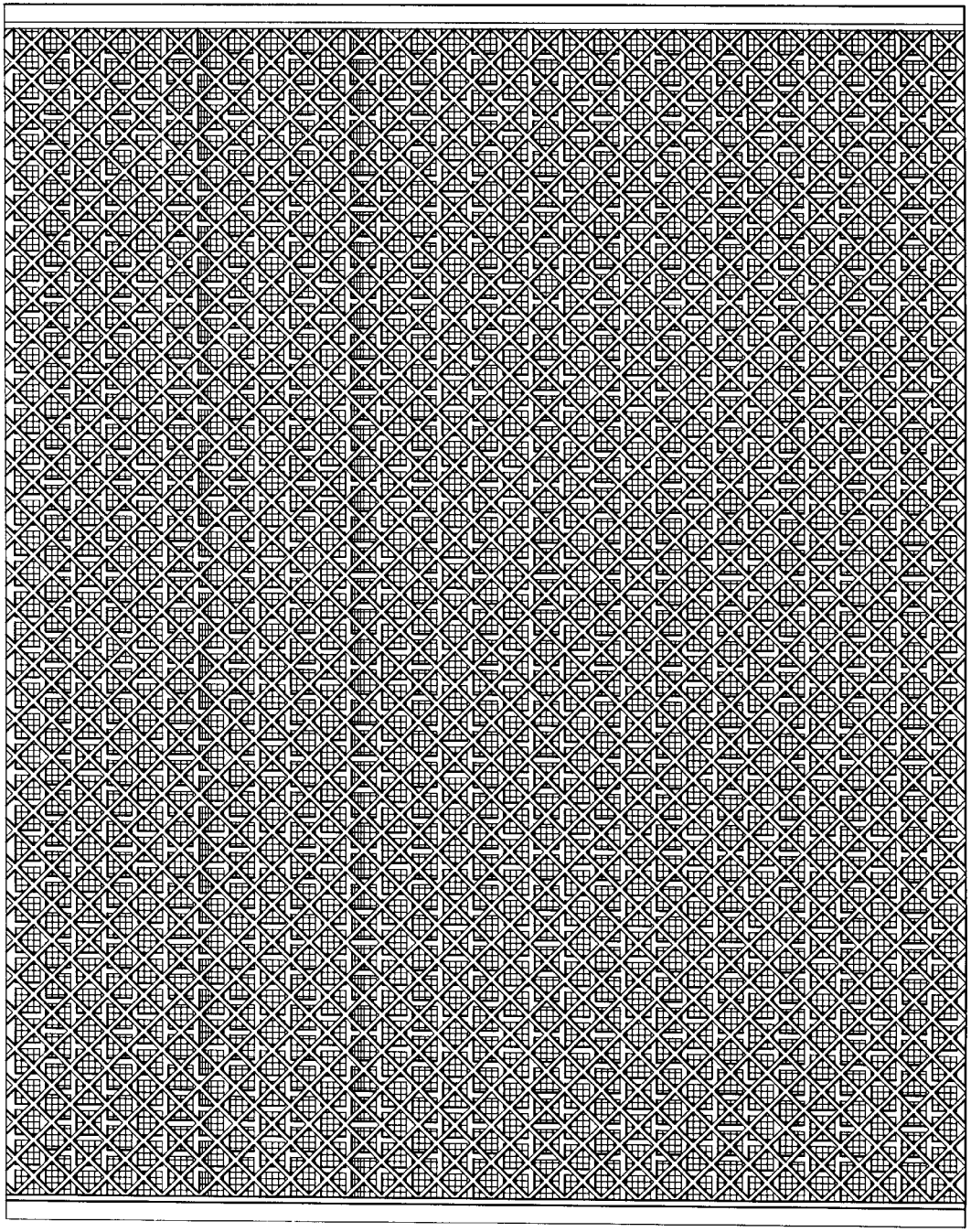

FIGS. 69C, 69D and 69E show variations of the screen assembly 1010 in which only a portion of the upper most fine screen has a top coarse screen located above it. In FIG. 69C a coarse top screen portion 1016 is positioned at the back end of a screen assembly 1011 at which location fluid to be processed is introduced onto the screen assembly. In FIG. 69D a coarse top screen portion 1017 is positioned at a front end of a screen assembly 1012 at which location material exits from the screen assembly. In FIG. 69E a screen assembly 1013 has both screen portions 1018 (like the screen portion 1016, FIG. 69C) and 1019 (like the screen portion 1017, FIG. 69D). Like numerals in FIGS. 69A and 69C–69E indicate the same item or component.

Figure 70:
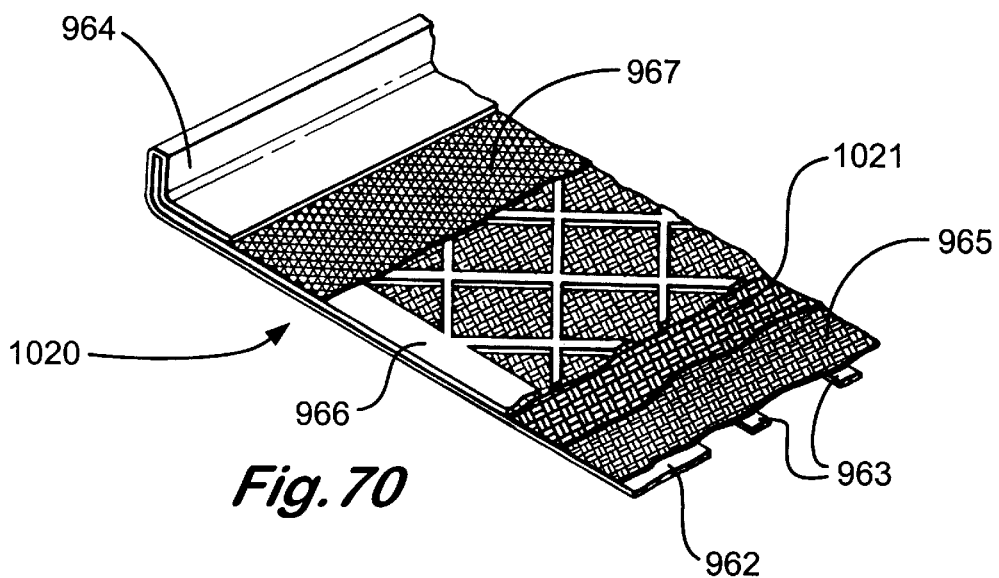
FIG. 70 is a perspective view of a screen assembly according to the present invention.

FIG. 70 shows a screen assembly 1020 like the screen assembly of FIG. 65A (like numerals indicate the same item or component), but with a second coarse mesh layer 1021 between the upper fine mesh or meshes and the lowermost coarse mesh. In one embodiment of a screen assembly 1020 the lower most coarse mesh 965 is a 12 mesh screen which is, optionally, calendared relatively flat, and/or with tops of ridges flat, or calendared no more than 30% of original height (original mesh thickness) and the mesh 1021 above the mesh 965 is a 30 mesh screen. The 30 mesh screen 1021 acts as a cushion between the lowermost coarse mesh 965 and the fine screen 967 or screens above the coarse mesh screen 1021. The mesh 1021 also is, preferably, flatter than the mesh 965 [and may be flatter than upper fine mesh screen(s)] and thereby inhibits injury to the upper fine screen (s) by the lowermost coarse mesh. Any screen or screen assembly disclosed herein can have a less coarse mesh interposed between a lower most coarser mesh and upper or fine screen or screens. Any two adjacent screens in any embodiment disclosed herein and/or any two screens with parts in contact may be sintered together at the points of contact instead of or in addition to any fusing with plastic described herein. Any screen or screen assembly disclosed herein may be used in a shaker or vibratory separator, e.g. but not limited to, as in FIGS. 14 and 63B.

The present invention, therefore, in some but not necessarily all embodiments, provides a screen assembly for a shaker or a vibratory separator, the screen assembly with at least one lower coarse screen member, at least one upper fine screen member above the at least one lower coarse screen member and fused with plastic to the at least one lower coarse screen member, and a strip member beneath and adhered to the at least one lower coarse screen member. Such a screen assembly may have one, some, or any possible combination of the following: wherein the at least one lower coarse screen member is two coarse screens, one on top of the other, either of the same mesh or of different mesh; wherein the strip member has a plurality of spaced-apart support strips of the same or of different width; wherein the support strips are made of a material from the group consisting of metal, plastic, fiberglass, rubber or cermet; wherein the strip member includes two spaced apart end pieces each at an angle to the plurality of spaced apart support strips, each of the plurality of spaced apart support strips having two spaced-apart ends terminating at, on, or in one of the two spaced-apart end pieces; wherein the at least one upper fine screen is two fine screens, one on top of the other of the same mesh or of different mesh; a fused plastic grid (made of plastic material, plastic pieces, or a single piece) fusing the at least one lower coarse screen member and the at least one upper fine screen member together, the fused plastic grid comprising a plurality of intersecting lines of plastic which intersect at a plurality of intersection areas; wherein a plurality of the intersection areas lie above one of a plurality of spaced-apart support strips which are included in the strip member; wherein each of the intersection areas lie above one of a plurality of spaced-apart support strips which are included in the strip member; wherein each intersection area on a particular support strip is connected to adjacent intersection areas above the particular support strip by an additional line of plastic; at least one secondary coarse screen or coarse screen portion disposed above the at least one upper fine screen member; wherein the at least one secondary coarse screen portion is two spaced-apart coarse screen portions; wherein the at least one secondary coarse screen portion is located at an area at which fluid to be treated is introduced onto the screen assembly; wherein the at least one secondary coarse screen portion is located at an area at which fluid to be treated exits from the screen assembly; wherein the at least one secondary coarse screen portion is defined by opposed spaced-apart edges, either both of which or at least one of which overlies a support strip of a plurality of spaced-apart support strips that are included in the strip member; wherein the at least one lower coarse screen member is at least partially sintered to the at least one upper fine screen member; wherein the at least one lower coarse screen member is sintered over substantially its entire area to the at least one upper fine screen member; and/or two spaced-apart hook strips (e.g. L shaped, C shaped, channel shaped–viewed on end) on opposite sides of the screen assembly.

In conclusion, therefore, it is seen that the present invention and the embodiments disclosed herein and those covered by the appended claims are well adapted to carry out the objectives and obtain the ends set forth. Certain changes can be made in the subject matter described, shown and claimed without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form its principles may be utilized.

What is claimed is:

1. A screen assembly for a vibratory separator, the screen assembly comprising
    at least one lower coarse screen member,
    at least one upper fine screen member above the at least one lower coarse screen member and fused with plastic to the at least one lower coarse screen member, and
    a strip member beneath and adhered to the at least one lower coarse screen member, the strip member having a first side and a second side, the second side spaced-apart from the first side, the strip member having a third side and a fourth side, the fourth side spaced-apart from the third side, the first and second sides spaced-apart from each other by the third and fourth sides, the first, second, third and fourth sides defining outer boundaries of the screen assembly, the strip member comprising a plurality of spaced-apart support strips, each support strip having two spaced apart ends comprising a first end and a second end, each first end connected to the first side of the strip member and each second end connected to the second side of the strip member, each support strip independent of and not connected to the other support strips between the first and second sides of the strip member.

2. The screen assembly of claim 1 wherein the at least one lower coarse screen member is two coarse screens, one on top of the other.

3. The screen assembly of claim 1 wherein the support strips are made of a material from the group consisting of metal, plastic, fiberglass, rubber or cermet.

4. The screen assembly of claim 1 wherein the strip member includes two spaced apart end pieces each at an angle to the plurality of spaced apart support strips, each of the plurality of spaced apart support strips having two spaced-apart ends terminating at, on, or in one of the two spaced-apart end pieces.

5. The screen assembly of claim 1 wherein the at least one upper fine screen is two fine screens, one on top of the other.

6. The screen assembly of claim 1 further comprising
    a fused plastic grid fusing the at least one lower coarse screen member and the at least one upper fine screen member together, the fused plastic grid comprising a plurality of intersecting lines of plastic which intersect at a plurality of intersection areas.

7. The screen assembly of claim 6 wherein a plurality of the intersection areas lie above one of the plurality of spaced-apart support strips which are included in the strip member.

8. The screen assembly of claim 7 wherein each intersection area on a particular support strip is connected to adjacent intersection areas above the particular support strip by an additional line of plastic.

9. The screen assembly of claim 6 wherein each of the intersection areas lies above one of a plurality of spaced-apart support strips which are included in the strip member.

10. The screen assembly of claim 1 further comprising
    at least one secondary coarse screen portion disposed above the at least one upper fine screen member.

11. The screen assembly of claim 10 wherein the at least one secondary coarse screen portion is two spaced-apart coarse screen portions.

12. The screen assembly of claim 10 wherein the at least one secondary coarse screen portion is located at an area at which fluid to be treated is introduced onto the screen assembly.

13. The screen assembly of claim 10 wherein the at least one secondary coarse screen portion is located at an area at which fluid to be treated exits from the screen assembly.

14. The screen assembly of claim 10 wherein the at least one secondary coarse screen portion is at least a first and a second portion, the first portion located at an area at which fluid to be treated is introduced onto the screen assembly and the second portion is located at an area at which fluid to be treated exits from the screen assembly.

15. The screen assembly of claim 10 wherein the at least one secondary coarse screen portion is defined by opposed spaced-apart edges, at least one of which overlies a support strip of a plurality of spaced-apart support strips that are included in the strip member.

16. The screen assembly of claim 1 wherein the at least one lower coarse screen member is at least partially sintered to the at least one upper fine screen member.

17. The screen assembly of claim 1 wherein the at least one lower coarse screen member is sintered over substantially its entire area to the at least one upper fine screen member.

18. The screen assembly of claim 1 further comprising two spaced-apart hook strips on opposite sides of the screen assembly.

\* \* \* \* \*